(12) United States Patent
Filippov et al.

(10) Patent No.: US 12,457,324 B2
(45) Date of Patent: Oct. 28, 2025

(54) VIDEO COMPRESSION USING BOUNDARY BASED TEMPLATE REFINEMENT

(71) Applicant: Comcast Cable Communications, LLC, Philadelphia, PA (US)

(72) Inventors: Alexey Konstantinovich Filippov, Khimki (RU); Vasily Alexeevich Rufitskiy, Vladimir (RU); Damian Ruiz Coll, Reston, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 197 days.

(21) Appl. No.: 18/150,603

(22) Filed: Jan. 5, 2023

(65) Prior Publication Data

US 2023/0217016 A1 Jul. 6, 2023

Related U.S. Application Data

(60) Provisional application No. 63/296,815, filed on Jan. 5, 2022.

(51) Int. Cl.
*H04N 19/105* (2014.01)
*H04N 19/132* (2014.01)
*H04N 19/159* (2014.01)
*H04N 19/176* (2014.01)

(52) U.S. Cl.
CPC ......... *H04N 19/105* (2014.11); *H04N 19/132* (2014.11); *H04N 19/159* (2014.11); *H04N 19/176* (2014.11)

(58) Field of Classification Search
CPC .... H04N 19/176; H04N 19/70; H04N 19/136; H04N 19/132; H04N 19/159; H04N 19/11; H04N 19/593; H04N 19/105; H04N 19/96
See application file for complete search history.

(56) References Cited

U.S. PATENT DOCUMENTS

| | | | |
|---|---|---|---|
| 10,904,561 B2 | 1/2021 | Lee et al. | |
| 11,595,687 B2* | 2/2023 | Zhang | H04N 19/186 |
| 2017/0353730 A1* | 12/2017 | Liu | H04N 19/159 |
| 2019/0174145 A1* | 6/2019 | Zhang | H04N 19/11 |
| 2021/0297656 A1* | 9/2021 | Ma | H04N 19/70 |

(Continued)

FOREIGN PATENT DOCUMENTS

| | | |
|---|---|---|
| EP | 3905674 A1 | 11/2021 |
| EP | 3965419 A1 | 3/2022 |

(Continued)

OTHER PUBLICATIONS

May 11, 2023—European Search Report—EP App. No. 23150490.3.

(Continued)

*Primary Examiner* — Tsion B Owens
(74) *Attorney, Agent, or Firm* — Banner & Witcoff, Ltd.

(57) ABSTRACT

Encoding and/or decoding a block of a video frame may be based on a template associated with the block. The length of the template may be determined based on at least one of: a position of the block relative to a boundary, available reference samples above the boundary, and/or the length of a second template of one or more other template derivation algorithms. The length may be adjusted to improve prediction efficiencies and accuracies of template-based predictions.

20 Claims, 25 Drawing Sheets

(56) References Cited

U.S. PATENT DOCUMENTS

| | | | |
|---|---|---|---|
| 2021/0297677 A1* | 9/2021 | Jang | H04N 19/70 |
| 2021/0368165 A1 | 11/2021 | Choi et al. | |
| 2021/0400298 A1 | 12/2021 | Zhao et al. | |
| 2022/0094973 A1 | 3/2022 | Chujoh et al. | |
| 2022/0329826 A1* | 10/2022 | Wang | H04N 19/159 |
| 2023/0085006 A1* | 3/2023 | Bae | H04N 19/11 |
| | | | 375/240.12 |
| 2024/0214580 A1* | 6/2024 | Jhu | H04N 19/197 |
| 2024/0223757 A1* | 7/2024 | Wang | H04N 19/11 |

FOREIGN PATENT DOCUMENTS

| | | | |
|---|---|---|---|
| WO | 2019/007490 A1 | 1/2019 | |
| WO | 2019/201232 A1 | 10/2019 | |
| WO | 2020/069667 A1 | 4/2020 | |

OTHER PUBLICATIONS

Pfaff, Jonathan et al., "Intra Prediction and Mode Coding in VVC", IEEE Transactions on Circuits and Systems for Video Technology, vol. 31, No. 10, Oct. 2021.

Joint Video Experts Team (JVET) of ITU-T SG 16 WP 3 and ISO/IEC JTC 1/SC 29, 22nd Meeting, by teleconference, Apr. 20-28, 2021, Source: Bytedance Inc., Title: EE2-related: Template-based intra mode derivation using MPMs, Document: JVET-V0098-v2.

Yang Wang, Li Zhang, Kai Zhang, Zhipin Deng, Na Zhang Bytedance Inc., JVET-V0098 EE2-related: Template-based intra mode derivation using MPMs PowerPoint.

Joint Video Experts Team (JVET) of ITU-T SG 16 WP 3 and ISO/IEC JTC 1/SC 29 25th Meeting, by teleconference, Jan. 12-21, 2022, Source: Ofinno, LLC, Title: EE2-related: On the LCU boundary processing by intra-prediction tools, Document: JVET-Y0140-v1.

Joint Video Experts Team (JVET) of ITU-T SG 16 WP 3 and ISO/IEC JTC 1/SC 29 23rd Meeting, by teleconference, Jul. 7-16, 2021, Source: Editors, Title: Algorithm description of Enhanced Compression Model 4 (ECM 4), Document: JVET-Y2025-v2.

* cited by examiner

The quick brown fox jumps over the lazy dog. The quick brown fox jumps over the lazy dog. The quick brown fox jumps over the lazy dog.

FIG. 16

VIDEO COMPRESSION USING BOUNDARY BASED TEMPLATE REFINEMENT

CROSS-REFERENCE TO RELATED APPLICATIONS

This application claims the benefit of U.S. Provisional Application No. 63/296,815, filed on Jan. 5, 2022. The above referenced application is hereby incorporated by reference in its entirety.

BACKGROUND

A computing device processes video for storage, transmission, reception, and/or display. Processing a video comprises encoding and decoding, for example, to reduce a data size associated with the video.

SUMMARY

The following summary presents a simplified summary of certain features. The summary is not an extensive overview and is not intended to identify key or critical elements.

A video may comprise a sequence of frames displayed consecutively. Template-based encoding and decoding may involve the use of information associated with reference samples to determine one or more prediction modes for encoding and/or decoding a current block. A length (e.g., a vertical length) of a template may be adjusted, for example, for a first intra mode derivation algorithm based on at least one of: a number/quantity of available reference lines (e.g., available lines of reconstructed reference samples above the current block), a position of the current block relative to a boundary between two coding tree units, and/or a length (e.g., a vertical length) of a second template associated with one or more second intra mode derivation algorithms. Access to reconstructed samples above a coding tree unit comprising the current block may be limited by the size of line buffer(s). At least some intra mode derivation algorithms may use a fixed template size and may require a size of line buffers that is larger than a threshold for proper operations. An intra mode derivation may be enhanced by adjusting a length of a template. An encoder and/or a decoder may determine a length of a template for template alignment among a plurality of intra mode derivation algorithms, for example, based on a length of a second template of one or more second intra mode derivation algorithms. An intra mode derivation capable of adjusting a template length may provide additional advantages such as reduced signaling overhead required for indicating one or more intra prediction modes, improved intra prediction performance, etc.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 16 shows an example of intra block copy (IBC) for encoding.

DETAILED DESCRIPTION

Figure 1:
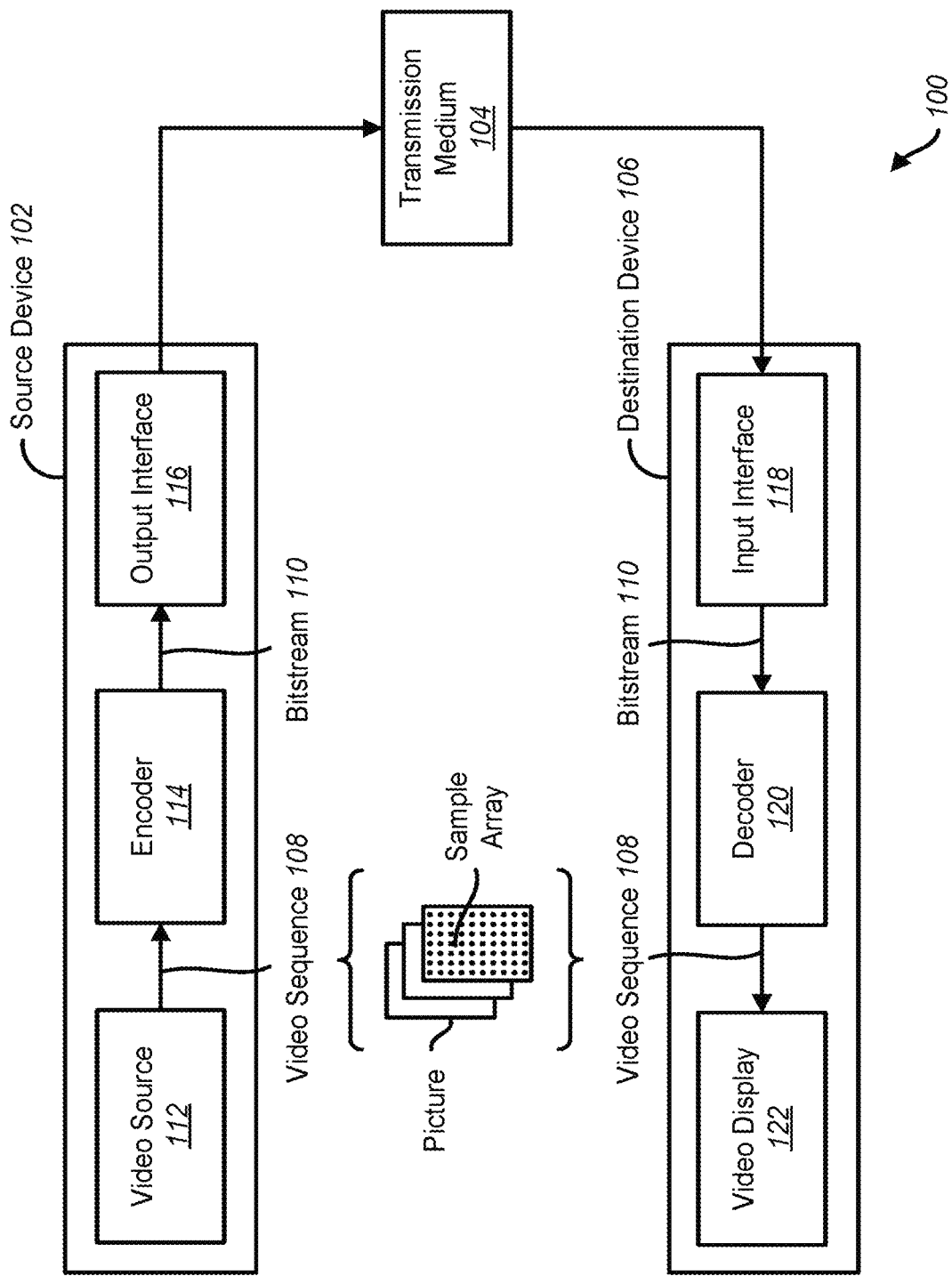
FIG. 1 shows an example video coding/decoding system.

The accompanying drawings and descriptions provide examples. It is to be understood that the examples shown in the drawings and/or described are non-exclusive, and that features shown and described may be practiced in other examples. Examples are provided for operation of video encoding and decoding systems, which may be used in the technical field of video data storage and/or transmission/reception. More particularly, the technology disclosed herein may relate to video compression as used in encoding and/or decoding devices and/or systems.

A video sequence, comprising multiple pictures/frames, may be represented in digital form for storage and/or transmission. Representing a video sequence in digital form may require a large quantity of bits. Large data sizes that may be associated with video sequences may require significant resources for storage and/or transmission. Video encoding may be used to compress a size of a video sequence for more efficient storage and/or transmission. Video decoding may be used to decompress a compressed video sequence for display and/or other forms of consumption.

FIG. 1 shows an example video coding/decoding system. Video coding/decoding system 100 may comprise a source device 102, a transmission medium 104, and a destination device 106. The source device 102 may encode a video sequence 108 into a bitstream 110 for more efficient storage and/or transmission. The source device 102 may store and/or send/transmit the bitstream 110 to the destination device 106 via the transmission medium 104. The destination device 106 may decode the bitstream 110 to display the video sequence 108. The destination device 106 may receive the bitstream 110 from the source device 102 via the transmission medium 104. The source device 102 and/or the destination device 106 may be any of a plurality of different devices (e.g., a desktop computer, laptop computer, tablet computer, smart phone, wearable device, television, camera, video gaming console, set-top box, video streaming device, etc.).

The source device 102 may comprise (e.g., for encoding the video sequence 108 into the bitstream 110) one or more of a video source 112, an encoder 114, and/or an output interface 116. The video source 112 may provide and/or generate the video sequence 108 based on a capture of a natural scene and/or a synthetically generated scene. A synthetically generated scene may be a scene comprising computer generated graphics and/or screen content. The video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A video sequence, such as video sequence 108, may comprise a series of pictures (also referred to as frames). A video sequence may achieve an impression of motion based on successive presentation of pictures of the video sequence using a constant time interval or variable time intervals between the pictures. A picture may comprise one or more sample arrays of intensity values. The intensity values may be taken (e.g., measured, determined, provided) at a series of regularly spaced locations within a picture. A color picture may comprise (e.g., typically comprises) a luminance sample array and two chrominance sample arrays. The luminance sample array may comprise intensity values representing the brightness (e.g., luma component, Y) of a picture. The chrominance sample arrays may comprise intensity values that respectively represent the blue and red components of a picture (e.g., chroma components, Cb and Cr) separate from the brightness. Other color picture sample arrays are possible based on different color schemes (e.g., a red, green, blue (RGB) color scheme). A pixel, in a color picture, may refer to/comprise/be associated with) all intensity values (e.g., luma component, chroma components), for a given location, in the sample arrays used to represent color pictures. A monochrome picture may comprise a single, luminance sample array. A pixel, in a monochrome picture, may refer to/comprise/be associated with the intensity value (e.g., luma component) at a given location in the single, luminance sample array used to represent monochrome pictures.

The encoder 114 may encode the video sequence 108 into the bitstream 110. The encoder 114 may apply/use (e.g., to encode the video sequence 108) one or more prediction techniques to reduce redundant information in the video sequence 108. Redundant information may comprise information that may be predicted at a decoder and need not be transmitted to the decoder for accurate decoding of the video sequence. For example, the encoder 114 may apply spatial prediction (e.g., intra-frame or intra prediction), temporal prediction (e.g., inter-frame prediction or inter prediction), inter-layer prediction, and/or other prediction techniques to reduce redundant information in the video sequence 108. The encoder 114 may partition pictures comprising the video sequence 108 into rectangular regions referred to as blocks, for example, prior to applying one or more prediction techniques. The encoder 114 may then encode a block using the one or more of the prediction techniques.

The encoder 114 may search for a block similar to the block being encoded in another picture (e.g., a reference picture) of the video sequence 108, for example, for temporal prediction. The block determined during the search (e.g., a prediction block) may then be used to predict the block being encoded. The encoder 114 may form a prediction block based on data from reconstructed neighboring samples of the block to be encoded within the same picture of the video sequence 108, for example, for spatial prediction. A reconstructed sample may be a sample that was encoded and then decoded. The encoder 114 may determine a prediction error (e.g., a residual) based on the difference between a block being encoded and a prediction block. The prediction error may represent non-redundant information that may be sent/transmitted to a decoder for accurate decoding of a video sequence.

The encoder 114 may apply a transform to the prediction error (e.g. using a discrete cosine transform (DCT), or any other transform) to generate transform coefficients. The encoder 114 may form the bitstream 110 based on the transform coefficients and other information used to determine prediction blocks (e.g., prediction types, motion vectors, and prediction modes). The encoder 114 may perform one or more of quantization and entropy coding of the transform coefficients and/or the other information used to determine prediction blocks before forming the bitstream 110. Quantization and/or entropy coding may further reduce the quantity of bits needed to store and/or transmit video sequence 108.

The output interface 116 may be configured to write and/or store the bitstream 110 onto the transmission medium 104 for transmission to the destination device 106. The output interface 116 may be configured to send/transmit, upload, and/or stream the bitstream 110 to the destination device 106 via transmission medium 104. The output interface 116 may comprise a wired and/or wireless transmitter configured to send/transmit, upload, and/or stream the bitstream 110 in accordance with one or more proprietary, open-source, and/or standardized communication protocols (e.g., Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, Wireless Application Protocol (WAP) standards, and/or any other communication protocol).

The transmission medium 104 may comprise wireless, wired, and/or computer readable medium. For example, the transmission medium 104 may comprise one or more wires, cables, air interfaces, optical discs, flash memory, and/or magnetic memory. The transmission medium 104 may comprise one more networks (e.g., the internet) or file servers configured to store and/or send/transmit encoded video data.

The destination device 108 may decode the bitstream 110 into the video sequence 108 for display. The destination device 106 may comprise one or more of an input interface 118, a decoder 120, and/or a video display 122. The input interface 118 may be configured to read the bitstream 110 stored on transmission medium 104 by the source device 102. The input interface 118 may be configured to receive, download, and/or stream the bitstream 110 from the source device 102 via the transmission medium 104. The input interface 118 may comprise a wired and/or a wireless receiver configured to receive, download, and/or stream the bitstream 110 according to one or more proprietary, open-source, standardized communication protocols, and/or any other communication protocol (e.g., such as referenced herein).

The decoder 120 may decode the video sequence 108 from the encoded bitstream 110. The decoder 120 may generate prediction blocks for pictures of the video sequence 108 in a similar manner as the encoder 114 and determine the prediction errors for the blocks, for example, to decode the video sequence. The decoder 120 may generate the prediction blocks using/based on prediction types, prediction modes, and/or motion vectors received in the bitstream 110. The decoder 120 may determine the prediction errors using transform coefficients received in the bitstream 110. The decoder 120 may determine the prediction errors by weighting transform basis functions using the transform coefficients. The decoder 120 may combine the prediction blocks and the prediction errors to decode the video sequence 108. A decoded video sequence at the destination device may be, or may not necessarily be, the same video sequence sent, such as the video sequence 108 as sent by the source device 102. For example, the decoder 120 may decode a video sequence that approximates the video sequence 108, for example, because of lossy compression of the video sequence 108 by the encoder 114 and/or errors introduced into the encoded bitstream 110 during transmission to the destination device 106.

The video display 122 may display the video sequence 108 to a user. The video display 122 may comprise a cathode rate tube (CRT) display, a liquid crystal display (LCD), a plasma display, a light emitting diode (LED) display, and/or any other display device suitable for displaying the video sequence 108.

The video encoding/decoding system 100 is merely an example and video encoding/decoding systems different from the video encoding/decoding system 100 and/or modified versions of the video encoding/decoding system 100 may perform the methods and processes as described herein. For example, the video encoding/decoding system 100 may comprise other components and/or arrangements. The video source 112 may be external to the source device 102. The video display device 122 may be external to the destination device 106 or omitted altogether (e.g., if the video sequence 108 is intended for consumption by a machine and/or storage device). The source device 102 may further comprise a video decoder and the destination device 104 may further comprise a video encoder. For example, the source device 102 may be configured to further receive an encoded bit stream from the destination device 106 to support two-way video transmission between the devices.

The encoder 114 and/or the decoder 120 may operate according to one or more proprietary or industry video coding standards. For example, the encoder 114 and/or the decoder 120 may operate according to one or more proprietary, open-source, and/or standardized protocols (e.g., International Telecommunications Union Telecommunication Standardization Sector (ITU-T) H.263, ITU-T H.264 and Moving Picture Expert Group (MPEG)-4 Visual (also known as Advanced Video Coding (AVC)), ITU-T H.265 and MPEG-H Part 2 (also known as High Efficiency Video Coding (HEVC), ITU-T H.265 and MPEG-I Part 3 (also known as Versatile Video Coding (VVC)), the WebM VP8 and VP9 codecs, and/or AOMedia Video 1 (AV1)), and/or any other communication protocol.

Figure 2:
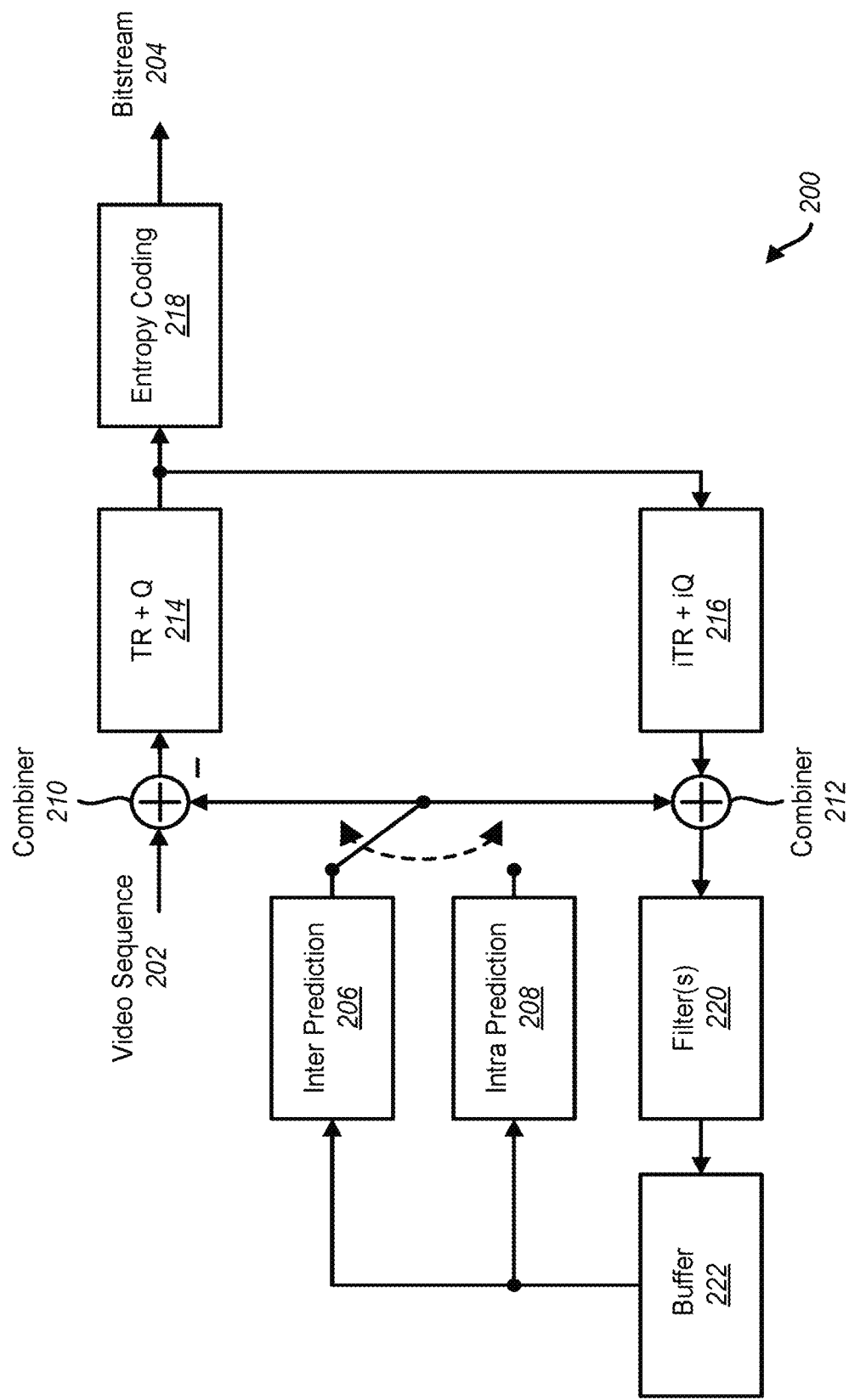
FIG. 2 shows an example encoder.

FIG. 2 shows an example encoder. The encoder 200 as shown in FIG. 2 may implement one or more processes described herein. The encoder 200 may encode a video sequence 202 into a bitstream 204 for more efficient storage and/or transmission. The encoder 200 may be implemented in the video coding/decoding system 100 as shown in FIG. 1 (e.g., as the encoder 114) or in any computing, communication, or electronic device (e.g., desktop computer, laptop computer, tablet computer, smart phone, wearable device, television, camera, video gaming console, set-top box, video streaming device, etc.). The encoder 200 may comprise one or more of an inter prediction unit 206, an intra prediction unit 208, combiners 210 and 212, a transform and quantization unit (TR+Q) unit 214, an inverse transform and quantization unit (iTR+iQ) 216, an entropy coding unit 218, one or more filters 220, and/or a buffer 222.

The encoder 200 may partition pictures (e.g., frames) of (e.g., comprising) the video sequence 202 into blocks and encode the video sequence 202 on a block-by-block basis. The encoder 200 may perform/apply a prediction technique on a block being encoded using either the inter prediction unit 206 or the intra prediction unit 208. The inter prediction unit 206 may perform inter prediction by searching for a block similar to the block being encoded in another, reconstructed picture (e.g., a reference picture) of the video sequence 202. A reconstructed picture may be a picture that was encoded and then decoded. The block determined during the search (e.g., a prediction block) may then be used to predict the block being encoded to remove redundant information. The inter prediction unit 206 may exploit temporal redundancy or similarities in scene content from picture to picture in the video sequence 202 to determine the prediction block. For example, scene content between pictures of video sequence 202 may be similar except for differences due to motion or affine transformation of the screen content over time.

The intra prediction unit 208 may perform intra prediction by forming a prediction block based on data from reconstructed neighboring samples of the block to be encoded within the same picture of the video sequence 202. A reconstructed sample may refer to a sample that was encoded and then decoded. The intra prediction unit 208 may exploit spatial redundancy or similarities in scene content within a picture of the video sequence 202 to determine the prediction block. For example, the texture of a region of scene content in a picture may be similar to the texture in the immediate surrounding area of the region of the scene content in the same picture.

The combiner 210 may determine a prediction error (e.g., a residual) based on the difference between the block being encoded and the prediction block. The prediction error may represent non-redundant information that may be sent/transmitted to a decoder for accurate decoding of a video sequence.

The transform and quantization unit 214 may transform and quantize the prediction error. The transform and quantization unit 214 may transform the prediction error into transform coefficients by applying, for example, a DCT to reduce correlated information in the prediction error. The transform and quantization unit 214 may quantize the coefficients by mapping data of the transform coefficients to a predefined set of representative values. The transform and quantization unit 214 may quantize the coefficients to reduce irrelevant information in the bitstream 204. The Irrelevant information may be information that may be removed from the coefficients without producing visible and/or perceptible distortion in the video sequence 202 after decoding (e.g., at a receiving device).

The entropy coding unit 218 may apply one or more entropy coding methods to the quantized transform coefficients to further reduce the bit rate. For example, the entropy coding unit 218 may apply context adaptive variable length coding (CAVLC), context adaptive binary arithmetic coding (CABAC), and/or syntax-based context-based binary arithmetic coding (SBAC). The entropy coded coefficients may be packed to form the bitstream 204.

The inverse transform and quantization unit 216 may inverse quantize and inverse transform the quantized transform coefficients to determine a reconstructed prediction error. The combiner 212 may combine the reconstructed prediction error with the prediction block to form a reconstructed block. The filter(s) 220 may filter the reconstructed block, for example, using a deblocking filter and/or a sample-adaptive offset (SAO) filter. The buffer 222 may store the reconstructed block for prediction of one or more other blocks in the same and/or different picture of video sequence 202.

The encoder 200 may further comprise an encoder control unit. The encoder control unit may be configured to control one or more of the units of encoder 200 shown in FIG. 2. The encoder control unit may control the one or more units of the encoder 200 such that the bitstream 204 may be generated in conformance with the requirements of one or more proprietary coding protocols, industry video coding standards, and/or any other communication protocol. For example, the encoder control unit may control the one or more units of the encoder 200 such that bitstream 204 is generated in conformance with one or more of ITU-T H.263, AVC, HEVC, VVC, VP8, VP9, AV1, and/or any other video coding standard/format.

The encoder control unit may attempt to minimize (or reduce) the bitrate of bitstream 204 and/or maximize (or increase) the reconstructed video quality (e.g., within the constraints of a proprietary coding protocol, industry video coding standard, and/or any other communication protocol). For example, the encoder control unit may attempt to minimize or reduce the bitrate of bitstream 204 such that the reconstructed video quality may not fall below a certain level/threshold, and/or may attempt to maximize or increase the reconstructed video quality such that the bit rate of bitstream 204 may not exceed a certain level/threshold. The encoder control unit may determine/control one or more of: partitioning of the pictures of video sequence 202 into blocks, whether a block is inter predicted by inter prediction unit 206 or intra predicted by intra prediction unit 208, a motion vector for inter prediction of a block, an intra prediction mode among a plurality of intra prediction modes for intra prediction of a block, filtering performed by the filter(s) 220, and/or one or more transform types and/or quantization parameters applied by the transform and quantization unit 214. The encoder control unit may determine/control one or more of the above based on a rate-distortion measure for a block or picture being encoded. The encoder control unit may determine/control one or more of the above to reduce the rate-distortion measure for a block or picture being encoded.

The prediction type used to encode a block (intra or inter prediction), prediction information of the block (intra prediction mode if intra predicted, motion vector, etc.), and/or transform and/or quantization parameters, may be sent to the entropy coding unit 218 to be further compressed (e.g., to reduce the bit rate). The prediction type, prediction information, and transform and/or quantization parameters may be packed with the prediction error to form bitstream 204.

The encoder 200 is merely an example and encoders different from the encoder 200 and/or modified versions of the encoder 200 may perform the methods and processes as described herein. For example, the encoder 200 may have other components and/or arrangements. One or more of the components shown in FIG. 2 may be optionally included in the encoder 200 (e.g., the entropy coding unit 218 and/or the filters(s) 220).

Figure 3:
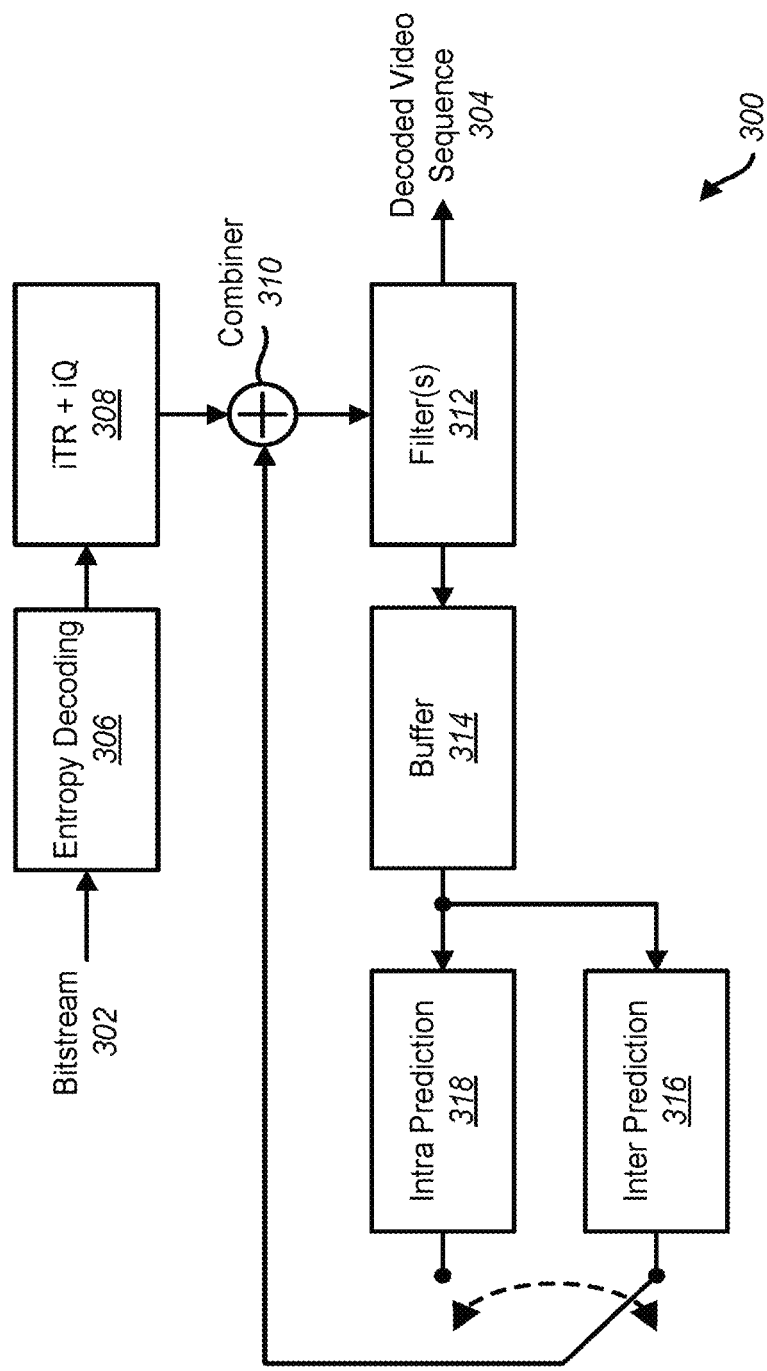
FIG. 3 shows an example decoder.

FIG. 3 shows an example decoder. A decoder 300 as shown in FIG. 3 may implement one or more processes described herein. The decoder 300 may decode a bitstream 302 into a decoded video sequence for display and/or some other form of consumption. The decoder 300 may be implemented in the video coding/decoding system 100 in FIG. 1 and/or in a computing, communication, or electronic device (e.g., desktop computer, laptop computer, tablet computer, smart phone, wearable device, television, camera, video gaming console, set-top box, and/or video streaming device). The decoder 300 may comprise an entropy decoding unit 306, an inverse transform and quantization (iTR+iQ) unit 308, a combiner 310, one or more filters 312, a buffer 314, an inter prediction unit 316, and/or an intra prediction unit 318.

The decoder 300 may comprise a decoder control unit configured to control one or more units of decoder 300. The decoder control unit may control the one or more units of decoder 300 such that the bitstream 302 is decoded in conformance with the requirements of one or more proprietary coding protocols, industry video coding standards, and/or any other communication protocol. For example, the decoder control unit may control the one or more units of decoder 300 such that the bitstream 302 is decoded in conformance with one or more of ITU-T H.263, AVC, HEVC, VVC, VP8, VP9, AV1, and/or any other video coding standard/format.

The decoder control unit may determine/control one or more of: whether a block is inter predicted by the inter prediction unit 316 or intra predicted by the intra prediction unit 318, a motion vector for inter prediction of a block, an intra prediction mode among a plurality of intra prediction modes for intra prediction of a block, filtering performed by the filter(s) 312, and/or one or more inverse transform types and/or inverse quantization parameters to be applied by the inverse transform and quantization unit 308. One or more of the control parameters used by the decoder control unit may be packed in bitstream 302.

The Entropy decoding unit 306 may entropy decode the bitstream 302. The inverse transform and quantization unit 308 may inverse quantize and/or inverse transform the quantized transform coefficients to determine a decoded prediction error. The combiner 310 may combine the decoded prediction error with a prediction block to form a decoded block. The prediction block may be generated by the inter prediction unit 318 or the inter prediction unit 316 (e.g., as described above with respect to encoder 200 in FIG. 2). The filter(s) 312 may filter the decoded block, for example, using a deblocking filter and/or a sample-adaptive offset (SAO) filter. The buffer 314 may store the decoded block for prediction of one or more other blocks in the same and/or different picture of the video sequence in the bitstream 302. The decoded video sequence 304 may be output from the filter(s) 312 as shown in FIG. 3.

Decoder 300 is merely an example and decoders different from the decoder 300 and/or modified versions of the decoder 300 may perform the methods and processes as described herein. For example, the decoder 300 may have other components and/or arrangements. One or more of the components shown in FIG. 3 may be optionally included in decoder 300 (e.g., the entropy decoding unit 306 and/or the filters(s) 312).

Although not shown in FIGS. 2 and 3, each of the encoder 200 and the decoder 300 may further comprise an intra block copy unit in addition to inter prediction and intra prediction units. The intra block copy unit may perform/operate similar to an inter prediction unit but may predict blocks within the same picture. For example, the intra block copy unit may exploit repeated patterns that appear in screen content. The screen content may include computer generated text, graphics, animation, etc.

Video encoding and/or decoding may be performed on a block-by-block basis. The process of partitioning a picture into blocks may be adaptive based on the content of the picture. For example, larger block partitions may be used in areas of a picture with higher levels of homogeneity to improve coding efficiency.

A picture (e.g., in HEVC, or any other coding standard/format) may be partitioned into non-overlapping square blocks, which may be referred to as coding tree blocks (CTBs). The CTBs may comprise samples of a sample array. A CTB may have a size of $2^n \times 2^n$ samples, where n may be specified by a parameter of the encoding system. For example, n may be 4, 5, 6, or any other value. A CTB may have any other size. A CTB may be further partitioned by a recursive quadtree partitioning into coding blocks (CBs) of half vertical and half horizontal size. The CTB may form the root of the quadtree. A CB that is not split further as part of the recursive quadtree partitioning may be referred to as a leaf CB of the quadtree, and otherwise may be referred to as a non-leaf CB of the quadtree. A CB may have a minimum size specified by a parameter of the encoding system. For example, a CB may have a minimum size of 4×4, 8×8, 16×16, 32×32, 64×64 samples, or any other minimum size. A CB may be further partitioned into one or more prediction blocks (PBs) for performing inter and intra prediction. A PB may be a rectangular block of samples on which the same prediction type/mode may be applied. For transformations, a CB may be partitioned into one or more transform blocks (TBs). A TB may be a rectangular block of samples that may determine/indicate an applied transform size.

Figure 4:
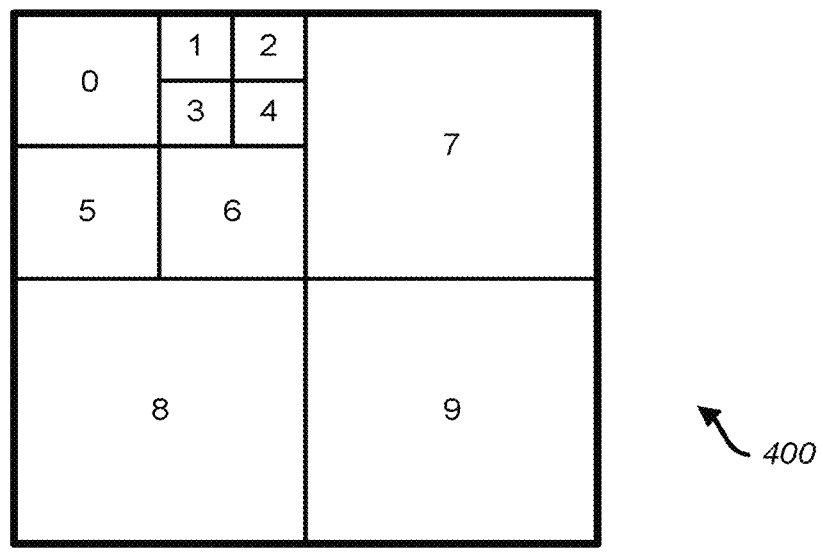
FIG. 4 shows an example quadtree partitioning of a coding tree block (CTB).
Figure 5:
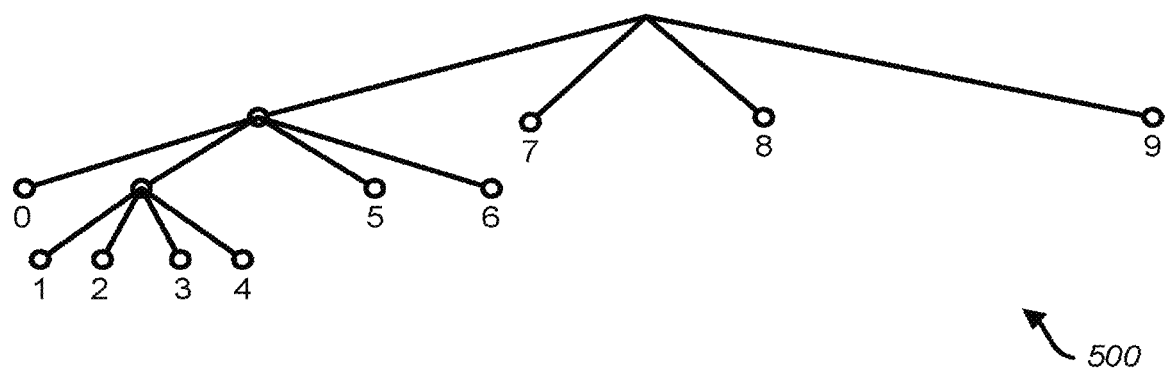
FIG. 5 shows an example quadtree corresponding to the example quadtree partitioning of the CTB in FIG. 4.

FIG. 4 shows an example quadtree partitioning of a CTB. FIG. 5 shows a quadtree corresponding to the example quadtree partitioning of the CTB 400 in FIG. 4. As shown in FIGS. 4 and 5, the CTB 400 may first be partitioned into four CBs of half vertical and half horizontal size. Three of the resulting CBs of the first level partitioning of CTB 400 may be leaf CBs. The three leaf CBs of the first level partitioning of CTB 400 are respectively labeled 7, 8, and 9 in FIGS. 4 and 5. The non-leaf CB of the first level partitioning of CTB 400 may be partitioned into four sub-CBs of half vertical and half horizontal size. Three of the resulting sub-CBs of the second level partitioning of CTB 400 may be leaf CBs. The three leaf CBs of the second level partitioning of CTB 400 are respectively labeled 0, 5, and 6 in FIGS. 4 and 5. The non-leaf CB of the second level partitioning of CTB 400 may be partitioned into four leaf CBs of half vertical and half horizontal size. The four leaf CBs may be respectively labeled 1, 2, 3, and 4 in FIGS. 4 and 5.

The CTB 400 of FIG. 4 may be partitioned into 10 leaf CBs respectively labeled 0-9, and/or any other quantity of leaf CBs. The 10 leaf CBs may correspond to 10 CB leaf nodes (e.g., as shown in FIG. 5). In other examples, a CTB may be partitioned into a different number of leaf CBs. The resulting quadtree partitioning of the CTB 400 may be scanned using a z-scan (e.g., left-to-right, top-to-bottom) to form the sequence order for encoding/decoding the CB leaf nodes. A numeric label (e.g., indicator, index) of each CB leaf node in FIGS. 4 and 5 may correspond to the sequence order for encoding/decoding. For example, CB leaf node 0 may be encoded/decoded first and CB leaf node 9 may be encoded/decoded last. Although not shown in FIGS. 4 and 5, each CB leaf node may comprise one or more PBs and/or TBs.

A picture, in VVC (or in any other coding standard/format), may be partitioned in a similar manner (such as in HEVC). A picture may be first partitioned into non-overlapping square CTBs. The CTBs may then be partitioned, using a recursive quadtree partitioning, into CBs of half vertical and half horizontal size. A quadtree leaf node (e.g., in VVC) may be further partitioned by a binary tree or ternary tree partitioning (or any other partitioning) into CBs of unequal sizes.

Figure 6:
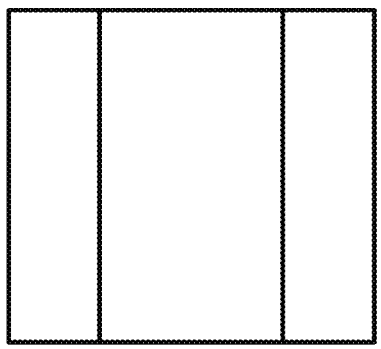
FIG. 6 shows example binary tree and ternary tree partitions.
Figure 6:
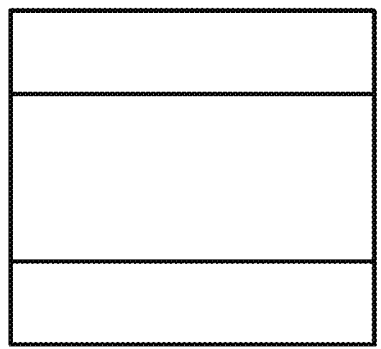
Figure 6:
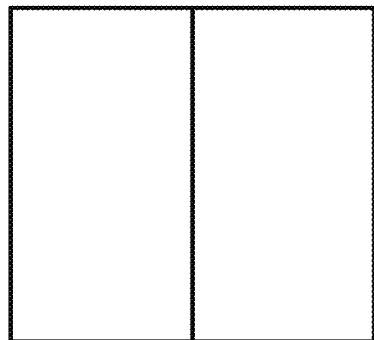
Figure 6:
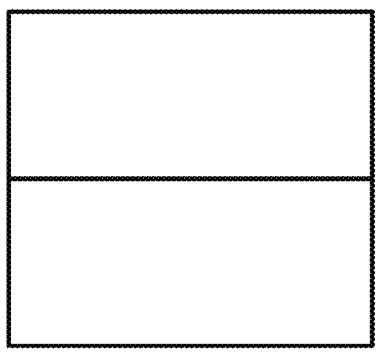

FIG. 6 shows example binary tree and ternary tree partitions. A binary tree partition may divide a parent block in half in either a vertical direction 602 or a horizontal direction 604. The resulting partitions may be half in size as compared to the parent block. The resulting partitions may correspond to sizes that are less than and/or greater than half of the parent block size. A ternary tree partition may divide a parent block into three parts in either the vertical direction 606 or horizontal direction 608. FIG. 6 shows an example in which the middle partition may be twice as large as the other two end partitions in the ternary tree partitions. In other examples, partitions may be of other sizes relative to each other and to the parent block. Binary and ternary tree partitions are examples of multi-type tree partitioning. Multi-type tree partitions may comprise partitioning a parent block into other quantities of smaller blocks. The block partitioning strategy (e.g., in VVC) may be referred to as quadtree+multi-type tree partitioning because of the addition of binary and/or ternary tree partitioning to quadtree partitioning.

Figure 7:
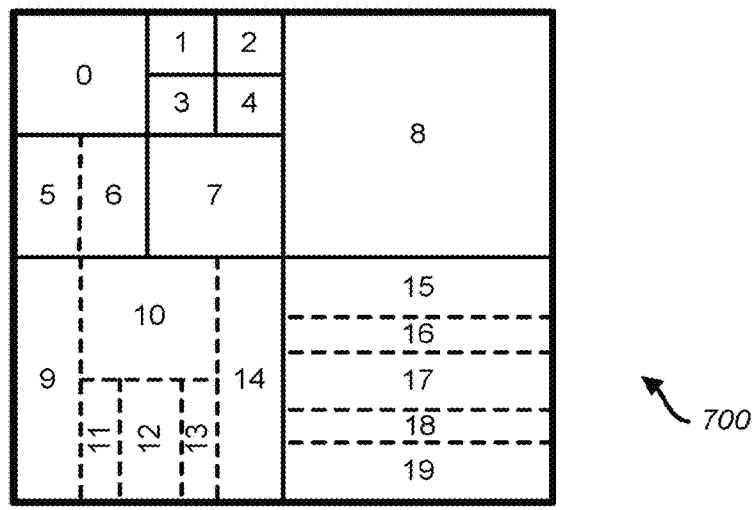
FIG. 7 shows an example of combined quadtree and multi-type tree partitioning of a CTB.
Figure 8:
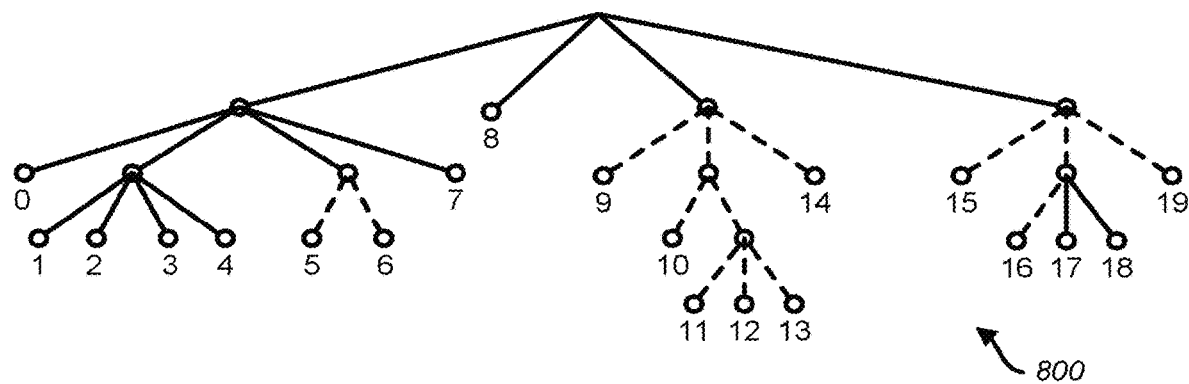
FIG. 8 shows a tree corresponding to the combined quadtree and multi-type tree partitioning of the CTB shown in FIG. 7.

FIG. 7 shows an example of combined quadtree and multi-type tree partitioning of a CTB. FIG. 8 shows a tree corresponding to the combined quadtree and multi-type tree partitioning of the CTB 700 shown in FIG. 7. In both FIGS. 7 and 8, quadtree splits are shown in solid lines and multi-type tree splits are shown in dashed lines. The CTB 700 is shown with the same quadtree partitioning as the CTB 400 described in FIG. 4, and a description of the quadtree partitioning of the CTB 700 is omitted. The quadtree partitioning of the CTB 700 is merely an example and a CTB may be quadtree partitioned in a manner different from the CTB 700. Additional multi-type tree partitions of the CTB 700 may be made relative to three leaf CBs shown in FIG. 4. The three leaf CBs in FIG. 4 that are shown in FIG. 7 as being further partitioned may be leaf CBs 5, 8, and 9. The three leaf CBs may be further partitioned using one or more binary and ternary tree partitions.

Leaf CB 5 of FIG. 4 may be partitioned into two CBs based on a vertical binary tree partitioning. The two resulting CBs may be leaf CBs respectively labeled 5 and 6 in FIGS. 7 and 8. Leaf CB 8 of FIG. 4 may be partitioned into three CBs based on a vertical ternary tree partition. Two of the three resulting CBs may be leaf CBs respectively labeled 9 and 14 in FIGS. 7 and 8. The remaining, non-leaf CB may be partitioned first into two CBs based on a horizontal binary tree partition. One of the two CBs may be a leaf CB labeled 10. The other of the two CBs may be further partitioned into three CBs based on a vertical ternary tree partition. The resulting three CBs may be leaf CBs respectively labeled 11, 12, and 13 in FIGS. 7 and 8. Leaf CB 9 of FIG. 4 may be partitioned into three CBs based on a horizontal ternary tree partition. Two of the three CBs may be leaf CBs respectively labeled 15 and 19 in FIGS. 7 and 8. The remaining, non-leaf CB may be partitioned into three CBs based on another horizontal ternary tree partition. The resulting three CBs may all be leaf CBs respectively labeled 16, 17, and 18 in FIGS. 7 and 8.

Altogether, CTB 700 may be partitioned into 20 leaf CBs respectively labeled 0-19. The resulting quadtree+multi-type tree partitioning of CTB 700 may be scanned using a z-scan (left-to-right, top-to-bottom) to form the sequence order for encoding/decoding the CB leaf nodes. A numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and/or TBs.

A coding standard/format (e.g., HEVC, VVC, or any other of coding standard/format) may define various units (e.g., in addition to specifying various blocks (e.g., CTBs, CBs, PBs, TBs). Blocks may comprise a rectangular area of samples in a sample array. Units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

A block may refer to any of a CTB, CB, PB, TB, CTU, CU, PU, and/or TU (e.g., in the context of HEVC, VVC, or any other coding format/standard). A block may be used to refer to similar data structures in the context of any video coding format/standard/protocol. For example, a block may refer to a macroblock in the AVC standard, a macroblock or sub-block in the VP8 coding format, a superblock or sub-block in the VP9 coding format, or a superblock or sub-block in the AV1 coding format.

Samples of a block to be encoded (e.g., a current block) may be predicted from samples of the column immediately adjacent to the left-most column of the current block and samples of the row immediately adjacent to the top-most row of the current block, such as in in intra prediction. The samples from the immediately adjacent column and row may be jointly referred to as reference samples. Each sample of the current block may be predicted (e.g., in an intra prediction mode) by projecting the position of the sample in the current block in a given direction to a point along the reference samples. The sample may be predicted by interpolating between the two closest reference samples of the projection point if the projection does not fall directly on a reference sample. A prediction error (e.g., a residual) may be determined for the current block based on differences between the predicted sample values and the original sample values of the current block.

Predicting samples and determining a prediction error based on a difference between the predicted samples and original samples may be performed (e.g., at an encoder) for a plurality of different intra prediction modes (e.g., including non-directional intra prediction modes). The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block, using the intra prediction mode indicated by the encoder, and/or combining predicted samples with a prediction error.

Figure 9:
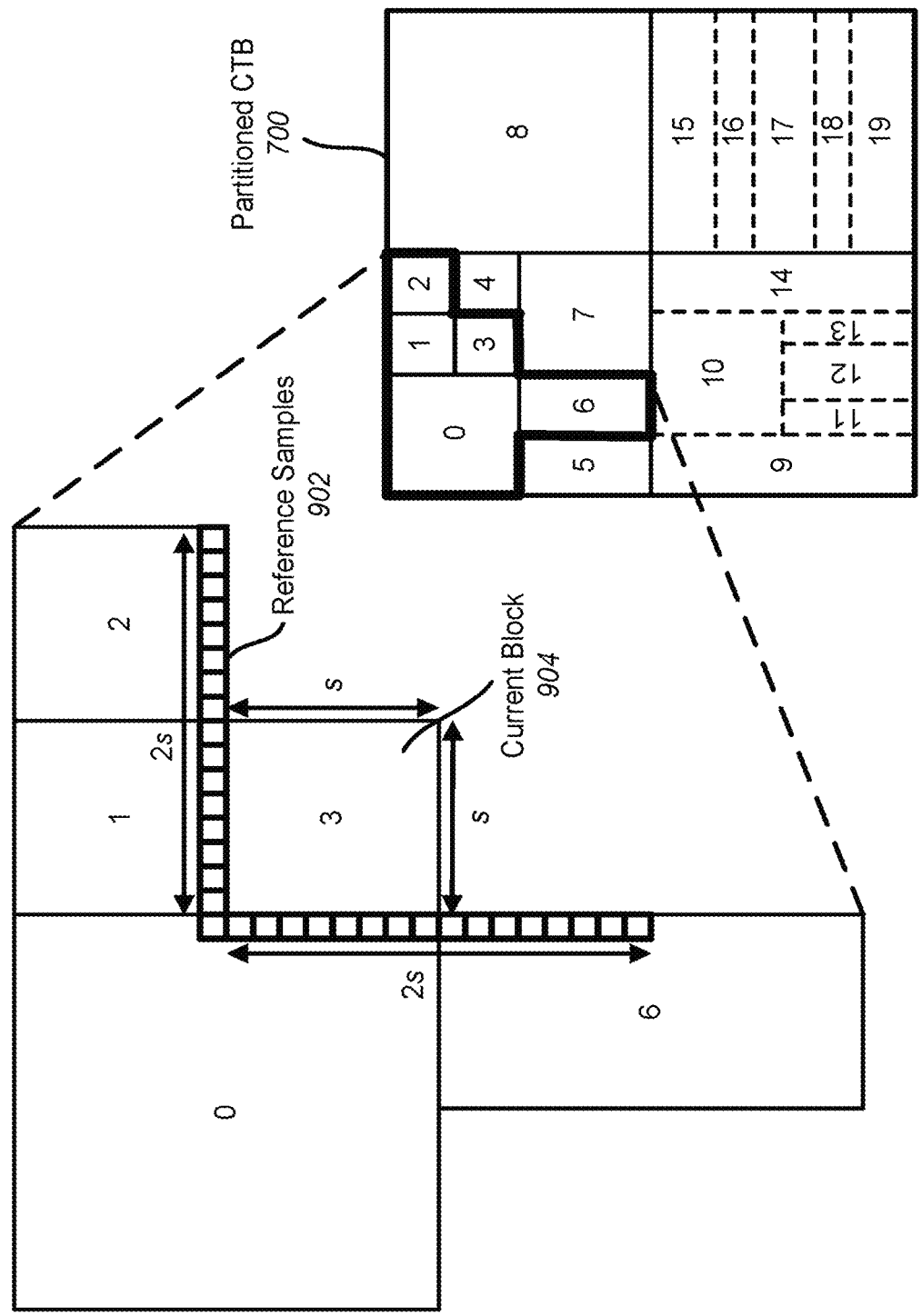
FIG. 9 shows an example set of reference samples determined for intra prediction of a current block.

FIG. 9 shows an example set of reference samples determined for intra prediction of a current block. The current block 904 may correspond to a block being encoded and/or decoded. The current block 904 may correspond to block 3 of the partitioned CTB 700 as shown in FIG. 7. As described herein, the numeric labels 0-19 of the blocks of partitioned CTB 700 may correspond to the sequence order for encoding/decoding the blocks and may be used as such in the example of FIG. 9.

The current block 904 may be w×h samples in size. The reference samples 902 may comprise: 2w samples (or any other quantity of samples) of the row immediately adjacent to the top-most row of the current block 904, 2h samples (or any other quantity of samples) of the column immediately adjacent to the left-most column of the current block 904, and the top left neighboring corner sample to current block 904. The current block 904 may be square, such that w=h=s. In other examples, a current block need not be square, such that w h. Available samples from neighboring blocks of the current block 904 may be used for constructing the set of reference samples 902. Samples may not be available for constructing the set of reference samples 902, for example, if the samples lie outside the picture of the current block, the samples are part of a different slice of the current block (e.g., if the concept of slices is used), and/or the samples belong to blocks that have been inter coded and constrained intra prediction is indicated. Intra prediction may not be dependent on inter predicted blocks, for example, if constrained intra prediction is indicated.

Samples that may not be available for constructing the set of reference samples 902 may comprise samples in blocks that have not already been encoded and reconstructed at an encoder and/or decoded at a decoder based on the sequence order for encoding/decoding. Restriction of such samples from inclusion in the set of reference samples may allow identical prediction results to be determined at both the encoder and decoder. Samples from neighboring blocks 0, 1, and 2 may be available to construct reference samples 902 given that these blocks are encoded and reconstructed at an encoder and decoded at a decoder prior to coding of current block 904. The samples from neighboring blocks 0, 1, and 2 may be available to construct reference samples 902, for example, if there are no other issues (e.g., as mentioned above) preventing the availability of the samples from the neighboring blocks 0, 1, and 2. The portion of reference samples 902 from the neighboring block 6 may not be available due to the sequence order for encoding/decoding (e.g., because block 6 may not have already been encoded and reconstructed at the encoder and/or decoded at the decoder based on the sequence order for encoding/decoding).

Unavailable samples from the reference samples 902 may be filled with one or more of available reference samples 902. For example, an unavailable reference sample may be filled with a nearest available reference sample. The nearest available reference sample may be determined by moving in a clock-wise direction through reference samples 902 from the position of the unavailable reference. Reference samples 902 may be filled with the mid-value of the dynamic range of the picture being coded, for example, if no reference samples are available.

The reference samples 902 may be filtered based on the size of current block 904 being coded and an applied intra prediction mode. FIG. 9 shows an exemplary determination of reference samples for intra prediction of a block. Reference samples may be determined in a different manner than described above. For example, multiple reference lines may be used in other instances (e.g., in VVC).

Samples of the current block 904 may be intra predicted based on the reference samples 902, for example, based on (e.g., after) determination and (optionally) filtration of the reference samples. At least some (e.g., most) encoders/decoders may support a plurality of intra prediction modes in accordance with one or more video coding standards. For example, HEVC supports 35 intra prediction modes, including a planar mode, a direct current (DC) mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture. Any quantity of intra prediction modes may be supported.

Figure 10A:
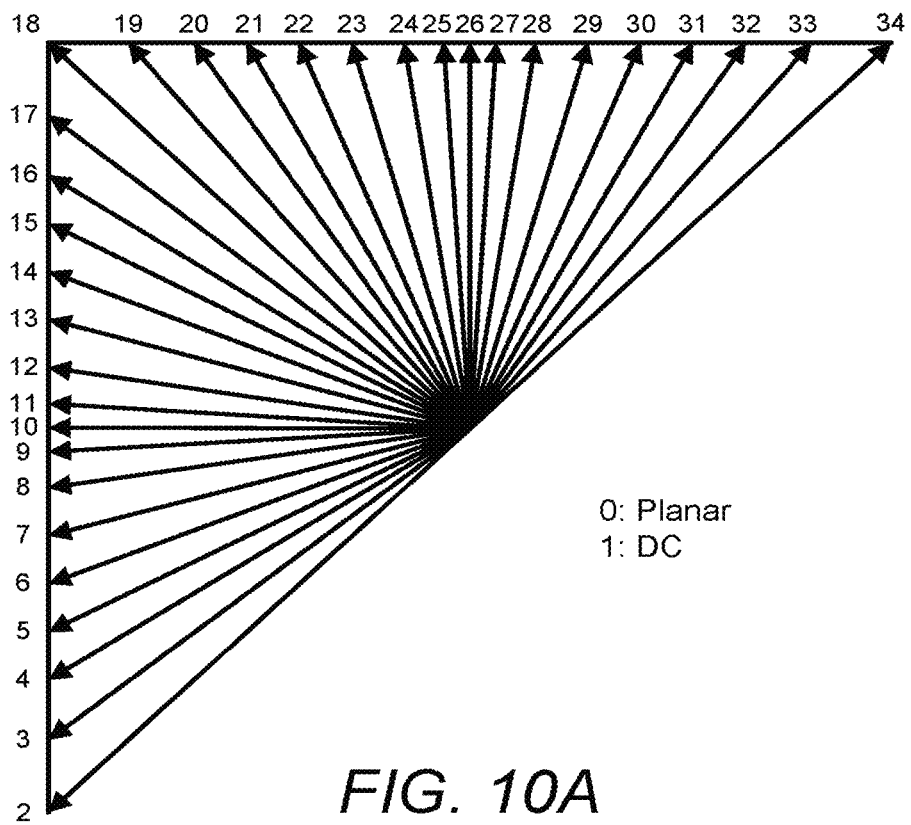
FIGS. 10A and 10B show example intra prediction modes.
Figure 10B:
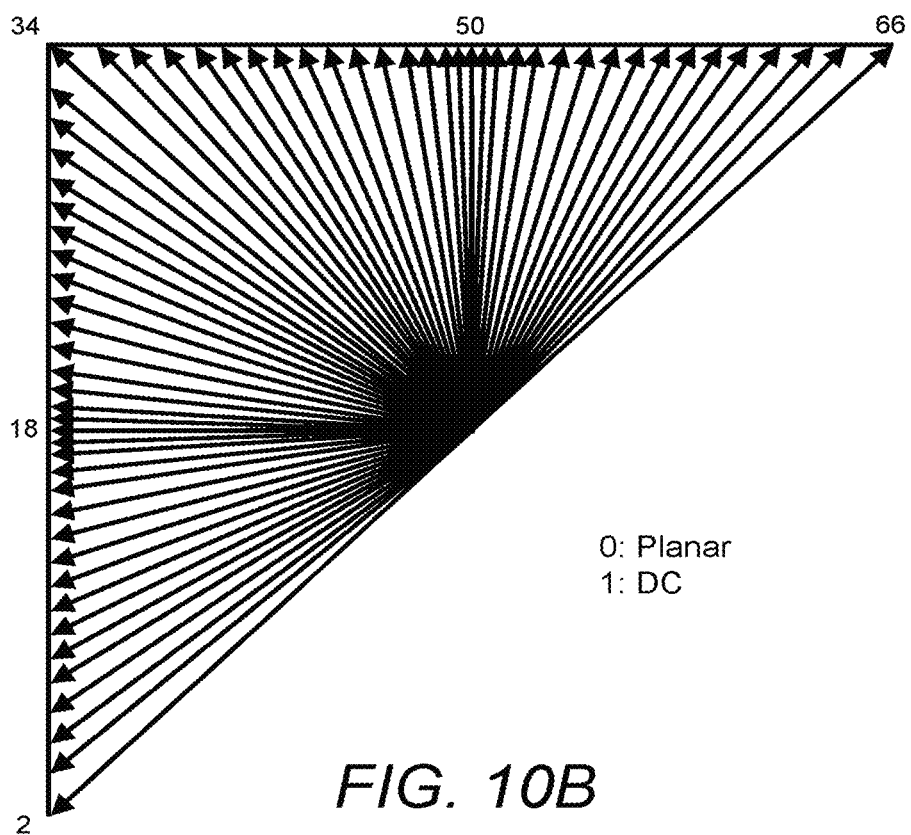

FIGS. 10A and 10B show example intra prediction modes. FIG. 10A shows 35 intra prediction modes, such as supported by HEVC. The 35 intra prediction modes may be indicated/identified by indices 0 to 34. Prediction mode 0 may correspond to planar mode. Prediction mode 1 may correspond to DC mode. Prediction modes 2-34 may correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

FIG. 10B shows 67 intra prediction modes, such as supported by VVC. The 67 intra prediction modes may be indicated/identified by indices 0 to 66. Prediction mode 0 may correspond to planar mode. Prediction mode 1 corresponds to DC mode. Prediction modes 2-66 may correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Some of the intra prediction modes illustrated in FIG. 10B may be adaptively replaced by wide-angle directions because blocks in VVC need not be squares.

Figure 11:
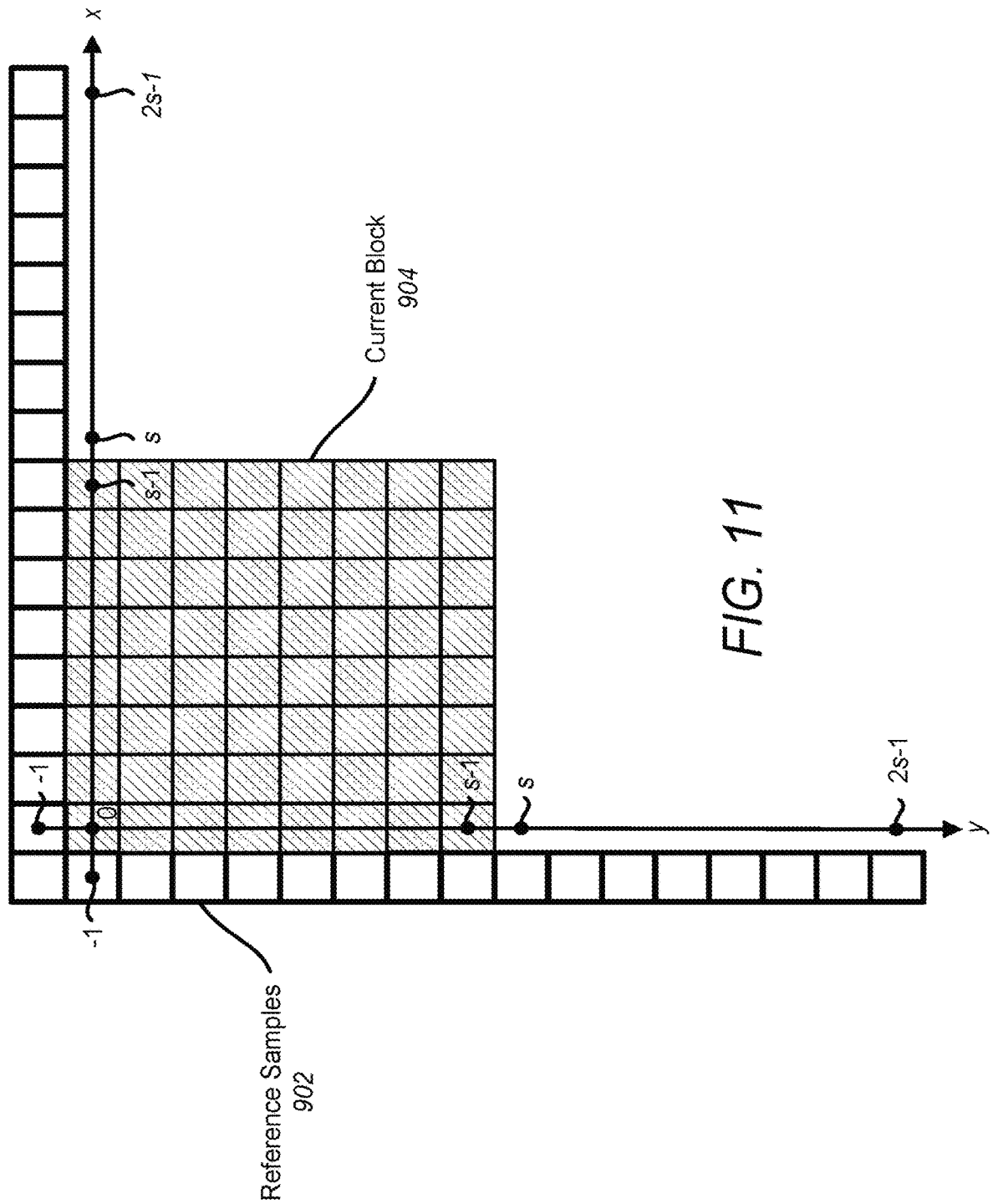
FIG. 11 shows a current block and corresponding reference samples.

FIG. 11 shows a current block and corresponding reference samples. In FIG. 11, a current block 904 and reference samples 902 from FIG. 9 are shown in a two-dimensional x, y plane, where a sample may be referenced as p[x][y]. In order to simplify the prediction process, the reference samples 902 may be placed in two, one-dimensional arrays.

The reference samples 902, above the current block 904, may be placed in the one-dimensional array $ref_1[x]$:

$$ref_1[x]=p[-1+x][-1], (x\geq 0) \quad (1)$$

Reference samples 902 to the left of current block 904 may be placed in the one-dimensional array $ref_2[y]$:

$$ref_2[y]=p[-1][-1+y], (y\geq 0) \quad (2)$$

The prediction process may comprise determination of a predicted sample p[x][y](e.g., a predicted value) at a location [x][y] in the current block 904. For planar mode, a sample at location [x][y] in the current block 904 may be predicted by determining/calculating the mean of two interpolated values. The first of the two interpolated values may be based on a horizontal linear interpolation at location [x][y] in the current block 904. The second of the two interpolated values may be based on a vertical linear interpolation at location [x][y] in current block 904. The predicted sample p[x][y] in current block 904 may be determined/calculated as:

$$p[x][y] = \frac{1}{2 \cdot s}(h[x][y] + v[x][y] + s) \quad (3)$$

where $$h[x][y]=(s-x-1)\cdot ref_2[y]+(x+1)\cdot ref_1[s] \quad (4)$$

may be the horizontal linear interpolation at location [x][y] in current block 904 and $$v[x][y]=(s-y-1)\cdot ref_1[x]+(y+1)\cdot ref_2[s] \quad (5)$$

may be the vertical linear interpolation at location [x][y] in current block 904. s may be equal to a length of a side (e.g., a number of samples on a side) of the current block 904.

A sample at location [x][y] in the current block 904 may be predicted by the mean of the reference samples 902, such as for a DC mode. The predicted sample p[x][y] in current block 904 may be determined/calculated as $$p[x][y] = \frac{1}{2 \cdot s}\left(\sum_{x=0}^{s-1}ref_1[x] + \sum_{y=0}^{s-1}ref_2[y]\right) \quad (6)$$

A sample at location [x][y] in the current block 904 may be predicted by projecting the location [x][y] in a direction specified by a given angular mode to a point on the horizontal or vertical line of samples comprising the reference samples 902, such as for an angular mode. The sample at the location [x][y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC). The direction specified by the angular mode may be given by an angle φ defined relative to the x-axis for horizontal prediction modes (e.g., modes 2-18 in HEVC and modes 2-34 in VVC).

Figure 12:
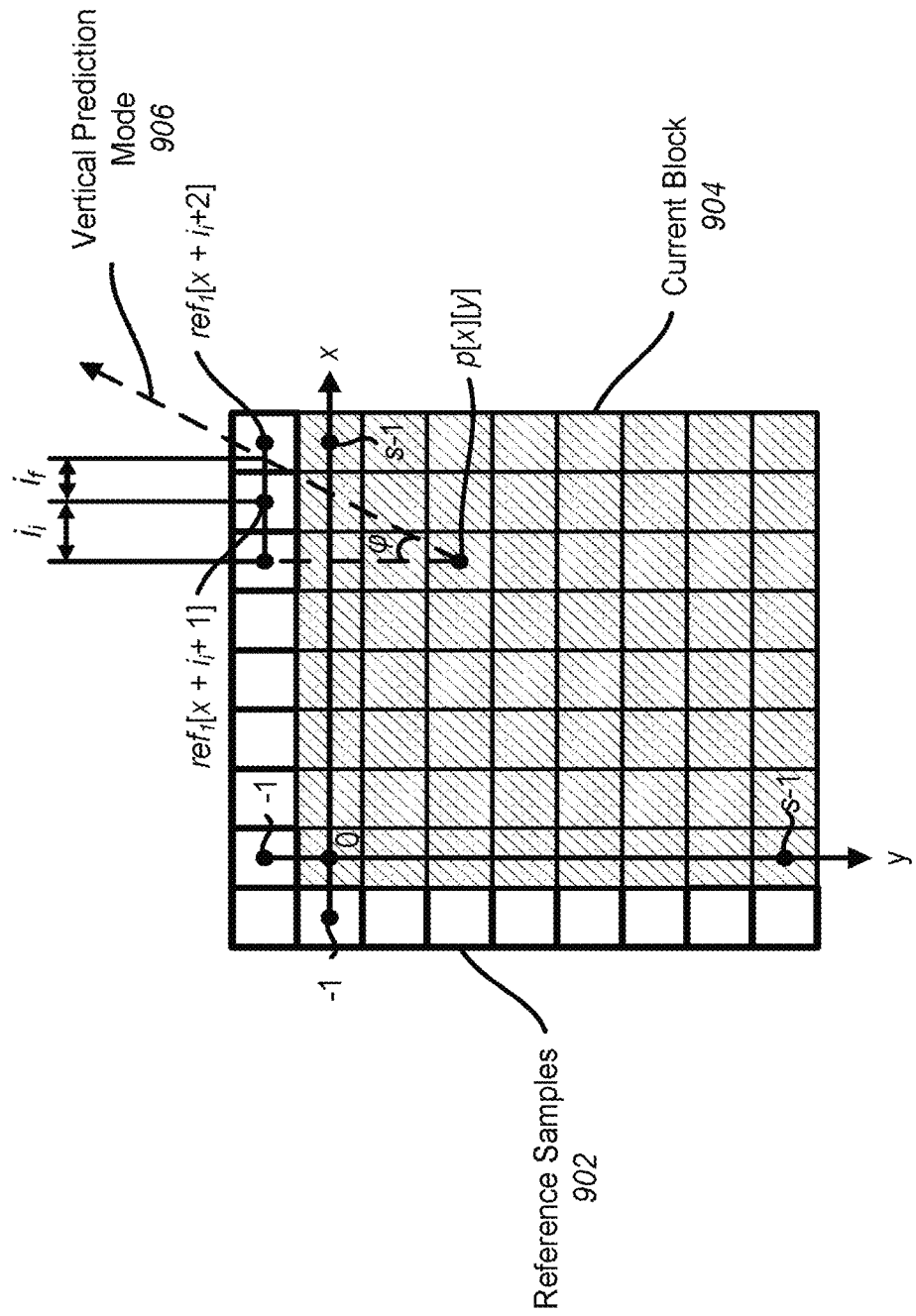
FIG. 12 shows application of an intra prediction mode for prediction of a current block.

FIG. 12 shows application of an intra prediction mode for prediction of a current block. FIG. 12 specifically shows prediction of a sample at a location [x][y] in the current block 904 for a vertical prediction mode 906. The vertical prediction mode 906 may be given by an angle φ with respect to a vertical axis. The location [x][y] in the current block 904, in vertical projection modes, may be projected to a point (e.g., a projection point) on the horizontal line of reference samples ref$_1$[x]. The reference samples 902 are only partially shown in FIG. 12 for ease of illustration. As seen in FIG. 12, the projection point on the horizontal line of reference samples ref$_1$[x] may not be exactly on a reference sample. The predicted sample p[x][y] in the current block 904 may be determined/calculated by linearly interpolating between the two reference samples, for example, if the projection point falls at a fractional sample position between two reference samples. A predicted sample p[x][y] may be determined as:

$$p[x][y]=(1-i_f)\cdot \text{ref}_1[x+i_i+1]+i_f\text{ref}_1[x+i_i+2]. \quad (7)$$

$i_i$ may be the integer part of the horizontal displacement of the projection point relative to the location [x][y]. $i_i$ may be determined/calculated as a function of the tangent of the angle φ of the vertical prediction mode 906 as:

$$i_i=\lfloor (y+1)\cdot \tan \varphi \rfloor \quad (8)$$

$i_f$ may be the fractional part of the horizontal displacement of the projection point relative to the location [x][y] and may be determined/calculated as $$i_f=((y+1)\cdot \tan \varphi)-\lfloor (y+1)\cdot \tan \varphi \rfloor \quad (9)$$

where $\lfloor \cdot \rfloor$ is the integer floor function.

The position [x][y] of a sample in the current block 904 may be projected onto the vertical line of reference samples ref$_2$[y], such as for horizontal prediction modes. A predicted sample p[x][y] for horizontal prediction modes may be determined/calculated as:

$$p[x][y]=(1-i_f)\cdot \text{ref}_2[y+i_i+1]+i_f\text{ref}_2[y+i_i+2]. \quad (10)$$

it may be the integer part of the vertical displacement of the projection point relative to the location [x][y]. $i_f$ may be determined/calculated as a function of the tangent of the angle φ of the horizontal prediction mode as:

$$i_i=\lfloor (x+1)\cdot \tan \varphi \rfloor. \quad (11)$$

$i_f$ may be the fractional part of the vertical displacement of the projection point relative to the location [x][y]. $i_f$ may be determined/calculated as $$i_f=((x+1)\cdot \tan \varphi)-\lfloor (x+1)\cdot \tan \varphi \rfloor, \quad (12)$$

where $\lfloor \cdot \rfloor$ is the integer floor.

The interpolation functions given by Equations (7) and (10) may be implemented by an encoder and/or decoder (e.g., the encoder 200 in FIG. 2 and/or the decoder 300 in FIG. 3). The interpolation functions may be implemented by finite impulse response (FIR) filters. For example, the interpolation functions may be implemented as a set of two-tap FIR filters. The coefficients of the two-tap FIR filters may be respectively given by (1−$i_f$) and $i_f$. The predicted sample p[x][y], in angular intra prediction, may be calculated with some predefined level of sample accuracy (e.g., 1/32 sample accuracy, or accuracy defined by any other metric). For 1/32 sample accuracy, the set of two-tap FIR interpolation filters may comprise up to 32 different two-tap FIR interpolation filters one for each of the 32 possible values of the fractional part of the projected displacement $i_f$. In other examples, different levels of sample accuracy may be used.

The FIR filters may be used for predicting chroma samples and/or luma samples. For example, the two-tap interpolation FIR filter may be used for predicting chroma samples and a same or a different interpolation technique/filter may be used for luma samples. For example, a four-tap FIR filter may be used to determine a predicted value of a luma sample. Coefficients of the four tap FIR filter may be determined based on $i_f$ (e.g., similar to the two-tap FIR filter). For 1/32 sample accuracy, a set of 32 different four-tap FIR filters may comprise up to 32 different four-tap FIR filters—one for each of the 32 possible values of the fractional part of the projected displacement $i_f$. In other examples, different levels of sample accuracy may be used. The set of four-tap FIR filters may be stored in a look-up table (LUT) and referenced based on $i_f$. A predicted sample p[x][y], for vertical prediction modes, may be determined based on the four-tap FIR filter as:

$$p[x][y] = \sum_{i=0}^{3} fT[i] \cdot ref_1[x + iIdx + i] \quad (13)$$

where fT[i], i=0 . . . 3, may be the filter coefficients, and Idx is integer displacement. The predicted sample p[x][y], for horizontal prediction modes, may be determined based on the four-tap FIR filter as:

$$p[x][y] = \sum_{i=0}^{3} fT[i] \cdot ref_2[y + iIdx + i]. \quad (14)$$

Supplementary reference samples may be determined/constructed if the position [x][y] of a sample in the current block 904 to be predicted is projected to a negative x coordinate. The position [x][y] of a sample may be projected to a negative x coordinate, for example, if negative vertical prediction angles φ are used. The supplementary reference samples may be determined/constructed by projecting the reference samples in ref$_2$[y] in the vertical line of reference samples 902 to the horizontal line of reference samples 902 using the negative vertical prediction angle φ. Supplementary reference samples may be similarly determined, for example, if the position [x][y] of a sample in the current block 904 to be predicted is projected to a negative y coordinate. The position [x][y] of a sample may be projected to a negative y coordinate, for example, if negative horizontal prediction angles φ are used. The supplementary reference samples may be determined/constructed by projecting the reference samples in ref$_1$[x] on the horizontal line of reference samples 902 to the vertical line of reference samples 902 using the negative horizontal prediction angle φ.

An encoder may determine/predict the samples of a current block being encoded (e.g., the current block 904) for a plurality of intra prediction modes (e.g., using one or more of the functions described herein). For example, the encoder may predict the samples of the current block for each of the 35 intra prediction modes in HEVC or 67 intra prediction modes in VVC. The encoder may determine, for each intra prediction mode applied, a corresponding prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may determine/select one of the intra prediction modes to encode the current block based on the determined prediction errors. For example, the encoder may select an intra prediction mode that results in the smallest prediction error for the current block. The encoder may select the intra prediction mode to encode the current block based on a rate-distortion measure (e.g., Lagrangian rate-distortion cost) determined using the prediction errors. The encoder may send an indication of the selected intra prediction mode and its corresponding prediction error (e.g., residual) to a decoder for decoding of the current block.

A decoder may determine/predict the samples of a current block being decoded (e.g., the current block 904) for an intra prediction mode. For example, the decoder may receive an indication of a prediction mode (e.g., an angular intra prediction mode) from an encoder for a block. The decoder may construct a set of reference samples and perform intra prediction based on the prediction mode indicated by the encoder for the block in a similar manner (e.g., as described above for the encoder). The decoder would add predicted values of the samples (e.g., determined based on intra prediction) of the block to a residual of the block to reconstruct the block. The decoder need not receive an indication of an angular intra prediction mode from an encoder for a block. The decoder may determine an intra prediction mode, for example, based on other criteria. While various examples herein correspond to intra prediction modes in HEVC and VVC, the methods, devices, and systems as described herein may be applied to/used for other intra prediction modes (e.g., as used in other video coding standards/formats, such as VP8, VP9, AV1, etc.).

Intra prediction may exploit correlations between spatially neighboring samples in the same picture of a video sequence to perform video compression. Inter prediction is another coding tool that may be used to perform video compression. Inter prediction may exploit correlations in the time domain between blocks of samples in different pictures of the video sequence. For example, an object may be seen across multiple pictures of a video sequence. The object may move (e.g., by some translation and/or affine motion) or remain stationary across the multiple pictures. A current block of samples in a current picture being encoded may have/be associated with a corresponding block of samples in a previously decoded picture. The corresponding block of samples may accurately predict the current block of samples. The corresponding block of samples may be displaced from the current block of samples, for example, due to movement of an object, represented in both blocks, across the respective pictures of the blocks. The previously decoded picture may be a reference picture. The corresponding block of samples in the reference picture may be a reference block for motion compensated prediction. An encoder may use a block matching technique to estimate the displacement (or motion) of the object and/or to determine the reference block in the reference picture.

An encoder may determine a difference between a current block and a prediction for the current block. An encoder may determine the difference, for example, based on/after determining/generating a prediction for the current block (e.g., using inter prediction). The difference may be referred to as a prediction error and/or as a residual. The encoder may then store and/or send (e.g., signal), in/via a bitstream, the prediction error and/or other related prediction information. The prediction error and/or other related prediction information may be used for decoding or other forms of consumption. A decoder may decode the current block by predicting the samples of the current block (e.g., by using the related prediction information) and combining the predicted samples with the prediction error.

Figure 13A:
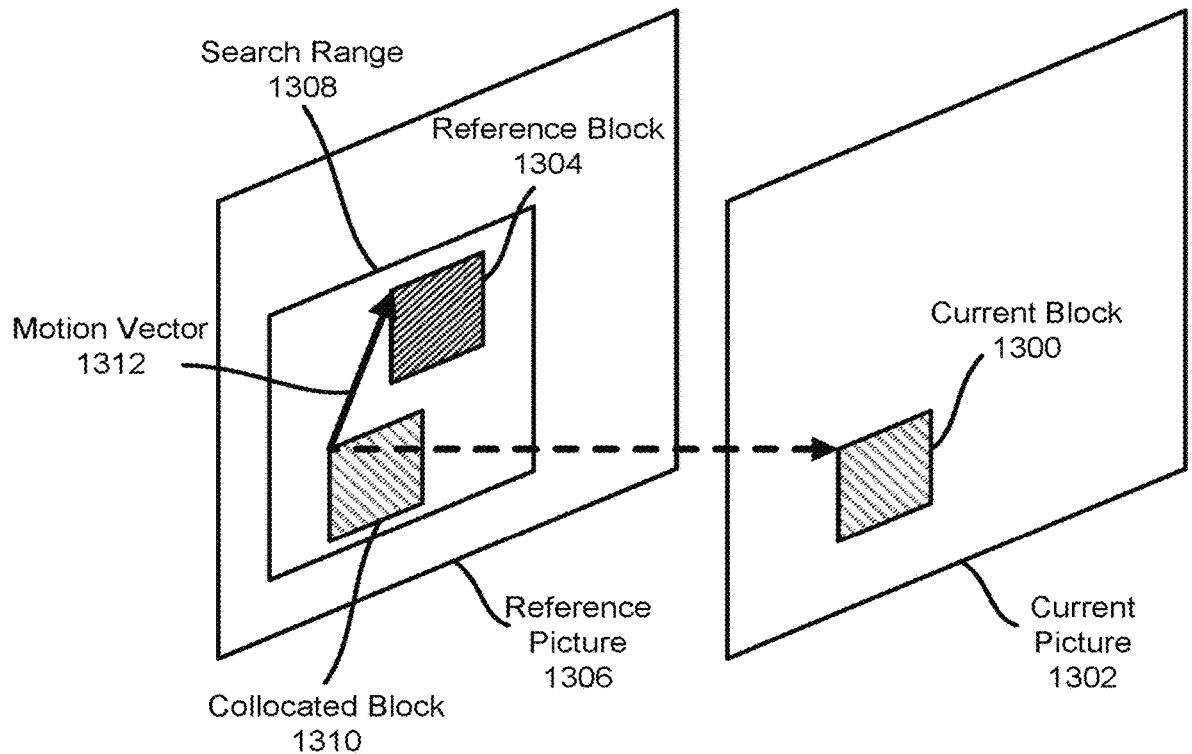
FIG. 13A shows an example of inter prediction.

FIG. 13A shows an example of inter prediction. The inter prediction may be performed for a current block 1300 in a current picture 1302 being encoded. An encoder (e.g., encoder 200 as shown in FIG. 2) may perform inter prediction to determine and/or generate a reference block 1304 in a reference picture 1306. The reference block 1304 may be used to predict a current block 1300. Reference pictures (e.g., the reference picture 1306) may be prior decoded pictures available at the encoder and decoder. Availability of a prior decoded picture may depend/be based on whether the prior decoded picture is available in a decoded picture buffer at the time current block 1300 is being encoded or decoded. The encoder may search one or more reference pictures for a reference block that is similar (or substantially similar) to current block 1300. The encoder may determine a best matching reference block from the blocks tested during the searching process. The best matching reference block may be the reference block 1304. The encoder may determine that the reference block 1304 is the best matching reference block based on one or more cost criteria. The one or more cost criteria may comprise a rate-distortion criterion (e.g., Lagrangian rate-distortion cost). The one or more cost criteria may be based on a difference (e.g., SSD, SAD, and/or SATD) between prediction samples of the reference block 1304 and the original samples of current block 1300.

The encoder may search for the reference block 1304 within a reference region (e.g., a search range) 1308. The reference region (e.g., a search range) 1308 may be positioned around a collocated position (or block) 1310, of current block 1300, in the reference picture 1306. The collocated block 1310 may have a same position in the reference picture 1306 as the current block 1300 in the current picture 1302. The reference region 1308 may at least partially extend outside of the reference picture 1306. Constant boundary extension may be used, for example, if the reference region 1308 extends outside of the reference picture 1306. The constant boundary extension may be used such that values of the samples in a row or a column of reference picture 1306, immediately adjacent to a portion of the reference region 1308 extending outside of the reference picture 1306, may be used for sample locations outside of the reference picture 1306. A subset of potential positions, or all potential positions, within the reference region 1308 may be searched for the reference block 1304. The encoder may utilize one or more search implementations to determine and/or generate the reference block 1304. For example, the encoder may determine a set of a candidate search positions based on motion information of neighboring blocks to the current block 1300.

One or more reference pictures may be searched by the encoder during inter prediction to determine and/or generate the best matching reference block. The reference pictures searched by the encoder may be included in (e.g., added to) one or more reference picture lists. For example, in HEVC and VVC (and/or in one or more other communication protocols), two reference picture lists may be used (e.g., a reference picture list 0 and a reference picture list 1). A reference picture list may include one or more pictures. The reference picture 1306 of the reference block 1304 may be indicated by a reference index pointing into a reference picture list comprising reference picture 1306.

Figure 13B:
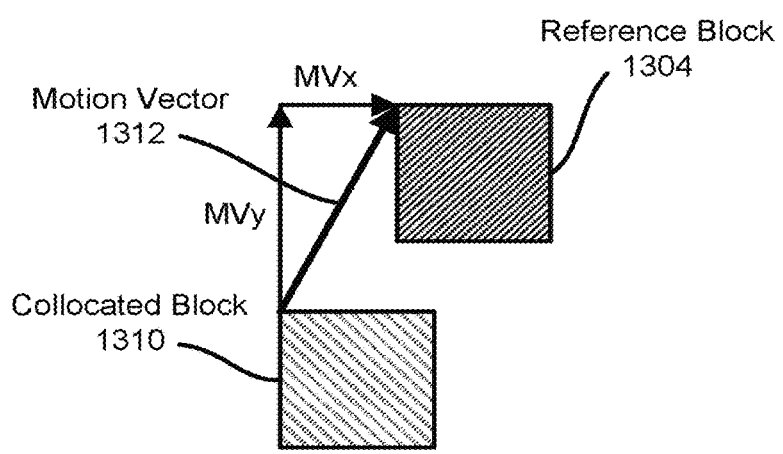
FIG. 13B shows an example motion vector.

FIG. 13B shows an example motion vector. A displacement between the reference block 1304 and the current block 1300 may be interpreted as an estimate of the motion between the reference block 1304 and the current block 1300 across their respective pictures. The displacement may be represented by a motion vector 1312. For example, the motion vector 1312 may be indicated by a horizontal component ($MV_x$) and a vertical component ($MV_y$) relative to the position of current block 1300. A motion vector (e.g., the motion vector 1312) may have fractional or integer resolution. A motion vector with fractional resolution may point between two samples in a reference picture to provide a better estimation of the motion of current block 1300. For example, a motion vector may have ½, ¼, ⅛, 1/16, 1/32, or any other fractional sample resolution. Interpolation between samples at integer positions may be used to generate the reference block and its corresponding samples at fractional positions, for example, if a motion vector points to a non-integer sample value in the reference picture. The interpolation may be performed by a filter with two or more taps.

The encoder may determine a difference (e.g., a corresponding sample-by-sample difference) between the reference block 1304 and the current block 1300. The encoder may determine the difference between the reference block 1304 and the current block 1300, for example, based on/after the reference block 1304 is determined and/or generated, using inter prediction, for the current block 1300. The difference may be referred to as a prediction error and/or a residual. The encoder may store and/or send (e.g., signal), in/via a bitstream, the prediction error and/or related motion information. The prediction error and/or related motion information may be used for decoding (e.g., decoding the current block 1300) and/or for other forms of consumption. The motion information may comprise the motion vector 1312 and/or a reference indicator/index. The reference indicator may indicate the reference picture 1306 in a reference picture list. The motion information may comprise an indication of the motion vector 1312 and/or an indication of the reference index. The reference index may indicate reference picture 1306 in the reference picture list. A decoder may decode the current block 1300 by determining and/or generating the reference block 1304. The decoder may determine and/or generate the reference block 1304, for example, based on the motion information. The reference block 1304 may correspond to/form (e.g., be considered as) a prediction of the current block 1300. The decoder may decode the current block 1300 based on combining the prediction with the prediction error.

Inter prediction, as shown in FIG. 13A, may be performed using one reference picture 1306 as the source of the prediction for current block 1300. Inter prediction based on a prediction of a current block using a single picture may be referred to as uni-prediction.

Figure 14:
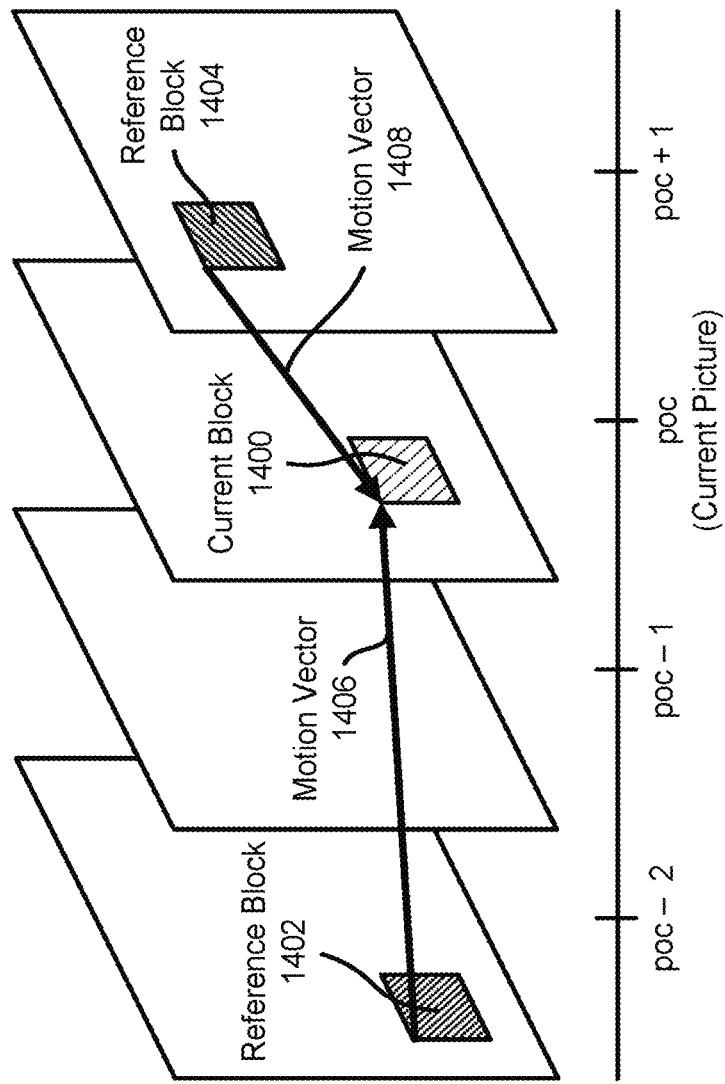
FIG. 14 shows an example of bi-prediction.

FIG. 14 shows an example of bi-prediction. Prediction, for a current block 1400, using bi-prediction, may be based on two pictures. Bi-prediction may be useful, for example, if a video sequence comprises fast motion, camera panning, zooming, and/or scene changes. Bi-prediction may be useful to capture fade outs of one scene or fade outs from one scene to another, where two pictures may effectively be displayed simultaneously with different levels of intensity.

One or both of uni-prediction and bi-prediction may be available/used for performing inter prediction (e.g., at an encoder and/or at a decoder). Performing a specific type of inter prediction (e.g., uniprediction and/or bi-prediction) may depend on a slice type of current block 1400. For example, for P slices, only uni-prediction may be available/used for performing inter prediction. For B slices, either uni-prediction or bi-prediction may be used for performing inter prediction. An encoder may determine and/or generate a reference block, for predicting a current block 1400, from reference picture list 0, for example, if the encoder is using uni-prediction. An encoder may determine and/or generate a first reference block for predicting a current block 1400 from a reference picture list 0 and determine and/or generate a second reference block for predicting the current block 1400 from a reference picture list 1, for example, if the encoder is using bi-prediction.

FIG. 14 shows an example of inter-prediction performed using bi-prediction. Two reference blocks 1402 and 1404 may be used to predict a current block 1400. The reference block 1402 may be in a reference picture of one of reference picture list 0 or reference picture list 1. The reference block 1404 may be in a reference picture of another one of reference picture list 0 or reference picture list 1. As shown in FIG. 14, reference block 1402 may be in a first picture that precedes (e.g., in time) the current picture of current block 1400, and reference block 1402 may be in a second picture that succeeds (e.g., in time) the current picture of current block 1400. The first picture may precede the current picture in terms of a picture order count (POC). The second picture may succeed the current picture in terms of the POC. The reference pictures may both precede or both succeed the current picture in terms of POC. POC may be/indicate an order in which pictures are output (e.g., from a decoded picture buffer). The POC may be/indicate an order in which pictures are generally intended to be displayed. Pictures that are output may not necessarily be displayed but may undergo different processing and/or consumption (e.g., transcoding). The two reference blocks determined and/or generated using/for bi-prediction may correspond to (e.g., be comprised in) a same reference picture. The reference picture may be included in both the reference picture list 0 and the reference picture list 1, for example, if the two reference blocks correspond to the same reference picture.

A configurable weight and/or offset value may be applied to the one or more inter prediction reference blocks. An encoder may enable the use of weighted prediction using a flag in a picture parameter set (PPS). The encoder may send/signal the weighting and/or offset parameters in a slice segment header for the current block 1400. Different weight and/or offset parameters may be signaled for luma and chroma components.

The encoder may determine and/or generate the reference blocks 1402 and 1404 for the current block 1400 using inter prediction. The encoder may determine a difference between the current block 1400 and each of reference blocks 1402 and 1404. The differences may be referred to as prediction errors or residuals. The encoder may store and/or send/signal, in/via a bitstream, the prediction errors and their respective related motion information. The prediction errors and their respective related motion information may be used for decoding or other forms of consumption. The motion information for the reference block 1402 may comprise a motion vector 1406 and a reference indicator/index. The reference indicator may indicate a reference picture, of the reference block 1402, in a reference picture list. The motion information for the reference block 1402 may comprise an indication of the motion vector 1406 and/or an indication of the reference index. The reference index may indicate the reference picture, of the reference block 1402, in the reference picture list.

The motion information for the reference block 1404 may comprise a motion vector 1408 and/or a reference index/indicator. The reference indicator may indicate a reference picture, of the reference block 1408, in a reference picture list. The motion information for reference block 1404 may comprise an indication of motion vector 1408 and/or an indication of the reference index. The reference index may indicate the reference picture, of the reference block 1404, in the reference picture list.

A decoder may decode the current block 1400 by determining and/or generating the reference blocks 1402 and 1404. The decoder may determine and/or generate the reference blocks 1402 and 1404, for example, based on the respective motion information for the reference blocks 1402 and 1404. The reference blocks 1402 and 1404 may correspond to/form (e.g., be considered as) the predictions of the current block 1400. The decoder may decode the current block based on combining the predictions with the prediction errors.

Motion information may be predictively coded, for example, before being stored and/or sent/signaled in/via a bit stream (e.g., in HEVC, VVC, and/or other video coding standards/formats/protocols). The motion information for a current block may be predictively coded based on motion information of one or more blocks neighboring the current block. The motion information of the neighboring block(s) may often correlate with the motion information of the current block because the motion of an object represented in the current block is often the same (or similar to) the motion of objects in the neighboring blocks. Motion information prediction techniques may comprise advanced motion vector prediction (AMVP) and inter prediction block merging.

An encoder (e.g., the encoder 200 as shown in FIG. 2), may code a motion vector. The encoder may code the motion vector (e.g., using AMVP) as a difference between a motion vector of a current block being coded and a motion vector predictor (MVP). An encoder may determine/select the MVP from a list of candidate MVPs. The candidate MVPs may be/correspond to previously decoded motion vectors of neighboring blocks in the current picture of the current block, or blocks at or near the collocated position of the current block in other reference pictures. The encoder and/or a decoder may generate and/or determine the list of candidate MVPs.

The encoder may determine/select an MVP from the list of candidate MVPs. The encoder may send/signal, in/via a bitstream, an indication of the selected MVP and a motion vector difference (MVD). The encoder may indicate the selected MVP in the bitstream using an index/indicator. The index may indicate the selected MVP in the list of candidate MVPs. The MVD may be determined/calculated based on a difference between the motion vector of the current block and the selected MVP. For example, for a motion vector that indicates a position (e.g., represented by a horizontal component ($MV_x$) and a vertical component ($MV_y$)) relative to a position of the current block being coded, the MVD may be represented by two components $MVD_x$ and $MVD_y$. $MVD_x$ and $MVD_y$ may be determined/calculated as:

$$MVD_x = MV_x - MVP_x \quad (15)$$

$$MVD_y = MV_y - MVP_y \quad (16)$$

$MVD_x$ and $MVD_y$ may respectively represent horizontal and vertical components of the MVD. $MVP_x$ and $MVP_y$ may respectively represent the horizontal and vertical components of the MVP. A decoder (e.g., the decoder 300 as shown in FIG. 3) may decode the motion vector by adding the MVD to the MVP indicated in the bitstream. The decoder may decode the current block by determining and/or generating the reference block. The decoder may determine and/or generate the reference block, for example, based on the decoded motion vector. The reference block may correspond to/form (e.g., be considered as) a prediction of the current block. The decoder may decode the current block by combining the prediction with the prediction error.

The list of candidate MVPs (e.g., in HEVC, VVC, and/or one or more other communication protocols), for AMVP, may comprise two or more candidates (e.g., candidates A and B). Candidates A and B may comprise: up to two spatial candidate MVPs determined/derived from five spatial neighboring blocks of the current block being coded; one temporal candidate MVP determined/derived from two temporal, co-located blocks (e.g., if both of the two spatial candidate MVPs are not available or are identical); or zero motion vector candidate MVPs (e.g., if one or both of the spatial candidate MVPs or temporal candidate MVPs are not available). Other quantities of spatial candidate MVPs, spatial neighboring blocks, temporal candidate MVPs, and/or temporal, co-located blocks may be used for the list of candidate MVPs.

Figure 15A:
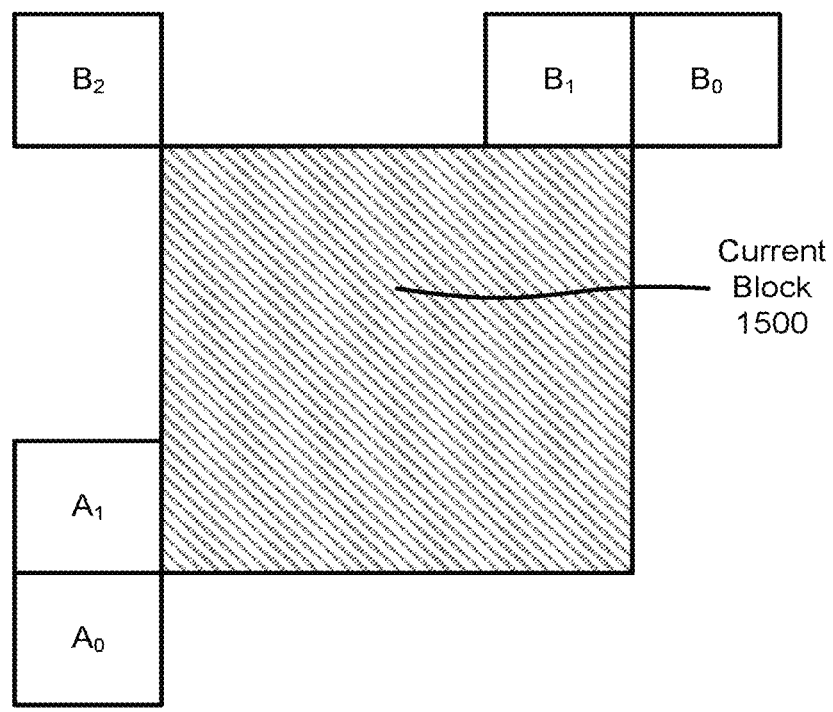
FIG. 15A shows example spatial candidate neighboring blocks for a current block.
Figure 15B:
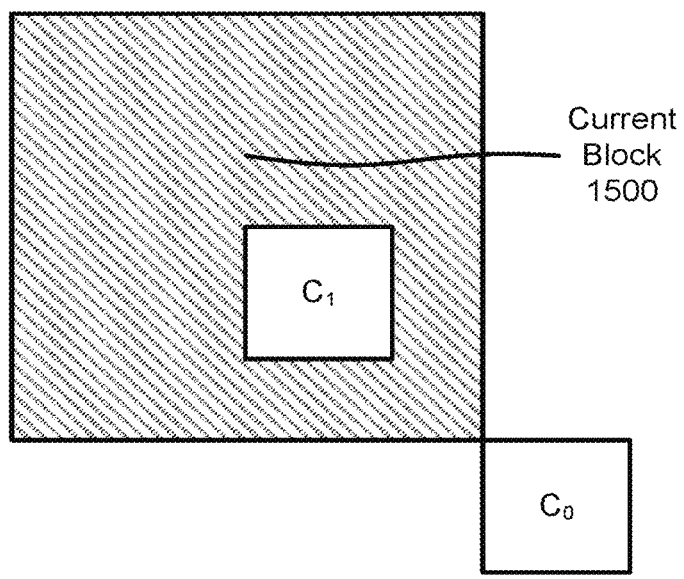
FIG. 15B shows example temporal, co-located blocks for a current block.

FIG. 15A shows spatial candidate neighboring blocks for a current block. For example, five (or any other quantity of) spatial candidate neighboring blocks may be located relative to a current block 1500 being encoded. The five spatial candidate neighboring blocks may be $A_0, A_1, B_0, B_1$, and $B_2$. FIG. 15B shows temporal, co-located blocks for the current block. For example, two (or any other quantity of) temporal, co-located blocks may be located relative to the current block 1500. The two temporal, co-located blocks may be $C_0$ and $C_1$. The two temporal, co-located blocks may be in one or more reference pictures that may be different from the current picture of current block 1500.

An encoder (e.g., the encoder 200 as shown in FIG. 2) may code a motion vector using inter prediction block merging (e.g., a merge mode). The encoder (e.g., using merge mode) may reuse a same motion information of a neighboring block (e.g., one of neighboring blocks $A_0, A_1, B_0, B_1$, and $B_2$) for inter prediction of a current block. The encoder (e.g., using merge mode) may reuse a same motion information of a temporal, co-located block (e.g., one of temporal, co-located blocks $C_0$ and $C_1$) for inter prediction of a current block. An MVD need not be sent (e.g., indicated, signaled) for the current block because the same motion information as that of a neighboring block or a temporal, co-located block may be used for the current block (e.g., at the encoder and/or decoder). A signaling overhead for sending/signaling the motion information of the current block may be reduced because the MVD need not be indicated for the current block. The encoder and/or the decoder (e.g., both the encoder and decoder) may generate a candidate list of motion information from neighboring blocks or temporal, co-located blocks of the current block (e.g., in a manner similar to AMVP). The encoder may determine to use (e.g., inherit) motion information, of one neighboring block or one temporal, co-located block in the candidate list, for predicting a motion information of the current block being coded. The encoder may signal/send, in/via the bit stream, an indication of the determined motion information from the candidate list. For example, the encoder may signal/send an indicator/index. The index may indicate the determined motion information in the list of candidate motion information. The encoder may signal/send the index to indicate the determined motion information.

A list of candidate motion information for merge mode (e.g., in HEVC, VVC, or any other coding format/standard/protocol) may comprise: up to four (or any other quantity of) spatial merge candidates derived/determined from five (or any other quantity of) spatial neighboring blocks (e.g., as shown in FIG. 15A); one (or any other quantity of) temporal merge candidate derived from two (or any other quantity of) temporal, co-located blocks (e.g., as shown in FIG. 15B); and/or additional merge candidates comprising bi-predictive candidates and zero motion vector candidates. The spatial neighboring blocks and the temporal, co-located blocks used for merge mode may the same as the spatial neighboring blocks and the temporal, co-located blocks used for AMVP.

Inter prediction may be performed in other ways and variants than those described herein. For example, motion information prediction techniques other than AMVP and merge mode may be used. While various examples herein correspond to inter prediction modes, such as used in HEVC and VVC, the methods, devices, and systems as described herein may be applied to/used for other inter prediction modes (e.g., as used for other video coding standards/formats such as VP8, VP9, AV1, etc.). History based motion vector prediction (HMVP), combined intra/inter prediction mode (CIIP), and/or merge mode with motion vector difference (MMVD) (e.g., as described in VVC) may be performed/used and are within the scope of the present disclosure.

Block matching may be used (e.g., in inter prediction) to determine a reference block in a different picture than the current block being encoded. Block matching may also be used to determine a reference block in a same picture as that of a current block being encoded. A reference block, in a same picture as the current block, as determined using block matching may often not accurately predict the current block (e.g., for camera captured videos). Prediction accuracy for screen video content may not be similarly impacted, for example, if a reference block in the same picture as the current block is used for encoding. Screen content video may comprise, for example, computer generated text, graphics, animation, etc. Screen video content may comprise (e.g., may often comprise) repeated patterns (e.g., repeated patterns of text and graphics) within the same picture. Using a reference block (e.g., as determined using block matching), in a same picture as a current block being encoded, may provide efficient compression for screen content video.

A prediction technique may be used (e.g., in HEVC, VVC, and/or any other coding standard/format/protocol) to exploit correlation between blocks of samples within a same picture (e.g., of a screen content video). The prediction technique may be referred to as intra block copy (IBC) or current picture referencing (CPR). An encoder may apply/use a block matching technique (e.g., similar to inter prediction) to determine a displacement vector (e.g., a block vector (BV)). The BV may indicate a relative position of a reference block (e.g., in accordance with intra block compensated prediction), that best matches the current block, from a position of the current block. For example, the relative position of the reference block may be a relative position of a top-left corner (or any other point/sample) of the reference block. The BV may indicate a relative displacement from the current block to the reference block that best matches the current block. The encoder may determine the best matching reference block from blocks tested during a searching process (e.g., in a manner similar to that used for inter prediction). The encoder may determine that a reference block is the best matching reference block based on one or more cost criteria. The one or more cost criteria may comprise a rate-distortion criterion (e.g., Lagrangian rate-distortion cost). The one or more cost criteria may be based on, for example, one or more differences (e.g., an SSD, an SAD, an SATD, and/or a difference determined based on a hash function) between the prediction samples of the reference block and the original samples of the current block. A reference block may correspond to/comprise prior decoded blocks of samples of the current picture. The reference block may comprise decoded blocks of samples of the current picture prior to being processed by in-loop filtering operations (e.g., deblocking and/or SAO filtering).

FIG. 16 shows an example of IBC for encoding. The example IBC shown in FIG. 16 may correspond to screen content. The rectangular portions/sections with arrows beginning at their boundaries may be the current blocks being encoded. The rectangular portions/sections that the arrows point to may be the reference blocks for predicting the current blocks.

A reference block may be determined and/or generated, for a current block, for IBC. The encoder may determine a difference (e.g., a corresponding sample-by-sample difference) between the reference block and the current block. The difference may be referred to as a prediction error or residual. The encoder may store and/or send/signal, in/via a bitstream the prediction error and/or the related prediction information. The prediction error and/or the related prediction information may be used for decoding and/or other forms of consumption. The prediction information may comprise a BV. The prediction information may comprise an indication of the BV. A decoder (e.g., the decoder 300 as shown in FIG. 3), may decode the current block by determining and/or generating the reference block. The decoder may determine and/or generate the current block, for example, based on the prediction information (e.g., the BV). The reference block may correspond to/form (e.g., be considered as) the prediction of the current block. The decoder may decode the current block by combining the prediction with the prediction error.

A BV may be predictively coded (e.g., in HEVC, VVC, and/or any other coding standard/format/protocol) before being stored and/or sent/signaled in/via a bit stream. The BV for a current block may be predictively coded based on the BV blocks neighboring the current block. For example, an encoder may predictively code a BV using the merge mode (e.g., in a manner similar to as described herein for inter prediction), AMVP (e.g., as described herein for inter prediction), or a technique similar to AMVP. The technique similar to AMVP may be BV prediction and difference coding (or AMVP for IBC).

An encoder (e.g., encoder 200 as shown in FIG. 2) performing BV prediction and coding may code a BV as a difference between the BV of a current block being coded and a BV predictor (BVP). An encoder may select/determine the BVP from a list of candidate BVPs. The candidate BVPs may comprise/correspond to previously decoded BVs of blocks neighboring the current block in the current picture. The encoder and/or decoder may generate or determine the list of candidate BVPs.

The encoder may send/signal, in/via a bitstream, an indication of the selected BVP and a BV difference (BVD). The encoder may indicate the selected BVP in the bitstream using an index/indicator. The index may indicate the selected BVP in the list of candidate BVPs. The BVD may be determined/calculated based on a difference between the BV of the current block and the selected BVP. For example, for a BV represented by a horizontal component ($BV_x$) and a vertical component ($BV_y$) relative to a position of the current block being coded, the BVD may represented by two components $BVD_x$ and $BVD_y$. $BVD_x$ and $BVD_y$ may be determined/calculated as:

$$BVD_x = BV_x - BVP_x \qquad (17)$$

$$BVD_y = BV_y - BVP_y \qquad (18)$$

$BVD_x$ and $BVD_y$ may respectively represent horizontal and vertical components of the BVD. $BVP_x$ and $BVP_y$ may respectively represent the horizontal and vertical components of the BVP. A decoder (e.g., the decoder 300 as shown in FIG. 3), may decode the BV by adding the BVD to the BVP indicated in/via the bitstream. The decoder may decode the current block by determining and/or generating the reference block. The decoder may determine and/or generate the reference block, for example, based on the decoded BV. The reference block may correspond to/form (e.g., be considered as) a prediction of the current block. The decoder may decode the current block by combining the prediction with the prediction error.

A same BV as that of a neighboring block may be used for the current block and a BVD need not be separately signaled/sent for the current block, such as in the merge mode. A BVP (in the candidate BVPs), which may correspond to a decoded BV of the neighboring block, may itself be used as a BV for the current block. Not sending the BVD may reduce the signaling overhead.

A list of candidate BVPs (e.g., in HEVC, VVC, and/or any other coding standard/format/protocol) may comprise two (or more) candidates. The candidates may comprise candidates A and B. Candidates A and B may comprise: up to two (or any other quantity of) spatial candidate BVPs determined/derived from five (or any other quantity of) spatial neighboring blocks of a current block being encoded; and/or one or more of last two (or any other quantity of) coded BVs (e.g., if spatial neighboring candidates are not available). Spatial neighboring candidates may not be available, for example, if neighboring blocks are encoded using intra prediction or inter prediction. Locations of the spatial candidate neighboring blocks, relative to a current block, being encoded using IBC may be illustrated in a manner similar to spatial candidate neighboring blocks used for coding motion vectors in inter prediction (e.g., as shown in FIG. 15A). For example, five spatial candidate neighboring blocks for IBC may be respectively denoted $A_0$, $A_1$, $B_0$, $B_1$, and $B_2$.

An encoder may signal an intra prediction mode selected to encode a block using a binarization of a mode index (e.g., a mode index of at least one intra prediction mode). For example, an encoder may signal the intra prediction mode selected among a plurality of intra prediction modes (e.g., the 35 intra prediction modes in HEVC or any other intra prediction modes) of one or more video coding schemes to encode a block, for example, using a fixed-length binarization of the mode index or truncated binary code of the mode index. With a plurality of different prediction modes (e.g., 35 different intra prediction modes) available, the fixed-length binarization or truncated binary code of the mode index may be up to a plurality of bits (e.g., 6-bits) in length. This signaling overhead may reduce the compression gain achieved by removing redundant information for a block based on the selected intra prediction mode. In newer video coding standards, the reduction in compression gain may be further reduced by providing a larger number of available intra prediction modes. For example, in VVC, the successor to HEVC, 67 intra prediction modes are supported. With 67 different intra prediction modes available, the fixed-length binarization of the mode index or truncated binary code of the mode index may require up to 7-bits. In some video coding standards, like HEVC and VVC, a smaller list of most probable modes (MPMs) may be constructed at an encoder and decoder to reduce intra prediction mode signaling overhead. If a selected intra prediction mode is within the MPM list, an encoder may signal the selected intra prediction mode using a smaller number of bits (e.g., 2 or 3 bits) based on the smaller size of the MPM list. However, even with the use of the MPM list, an encoder may often have to fall back to signaling a selected intra-prediction mode using a fixed-length binarization or truncated binary code of the mode index based on the selected mode not being in the MPM list.

A possible approach to avoid signaling a selected intra prediction mode may be to derive the intra prediction mode at both the encoder and decoder using previously encoded/decoded samples ("reconstructed samples"). For example, at least two techniques, a decoder-side intra mode derivation (DIMD) and a template-based intra mode derivation (TIMD), may be used for a video coding algorithm, such as an Enhanced Compression Model (ECM) software algorithm. ECM is currently under coordinated exploration study by the Joint Video Exploration Team (JVET) of ITU-T Video Coding Experts Group (VCEG) and ISO/IEC MPEG as a potential enhanced video coding technology beyond the capabilities of VVC. DIMD and TIMD may be used for deriving an intra prediction mode at both the encoder and decoder.

Different intra mode derivation algorithms may use different numbers/quantities of reconstructed samples as templates for deriving one or more intra prediction modes. Both DIMD and TIMD may utilize reconstructed reference samples above a current block being coded. For example, DIMD in an ECM test model may use three lines of reconstructed reference samples above a current block being coded to derive an intra prediction mode for the current block. TIMD in an ECM test model may use up to five lines of reconstructed reference samples above a current block being coded to derive an intra prediction mode for the current block. An encoder and/or a decoder may use one or more lines of reconstructed samples above a current block to perform DIMD and/or TIMD.

Different devices may have different available resources for retaining reconstructed samples. For example, the number/quantity of reconstructed reference samples may be retained differently based on different device capabilities (e.g., hardware capabilities, such as line buffers). Access to the reconstructed samples above a CTU comprising the current block may be limited by the size of the line buffer(s). The line buffer(s) may be a part of internal memory that stores reconstructed samples of an area above the CTU comprising the current block. Line buffers may be generally required to handle data dependencies between coding tree units (CTUs) in the vertical direction. Line buffers may be typically implemented with a size that is proportional to the width of a picture. Each tile row may need a separate line buffer, for example, if a picture is divided into multiple tile rows for parallel processing. In many implementations, line buffers may be implemented in static random access memory (SRAM) located on-chip with an encoder or a decoder. While fast, on-chip SRAM may be expensive in terms of its implementation size. A typical SRAM cell may use six or more transistors to store a single bit, whereas a slower dynamic RAM (DRAM) cell may utilize a single transistor. Because of the above considerations, an encoder and a decoder may have a limited number of line buffers available for handling data dependencies between CTUs in the vertical direction. More specifically, for a current block with a top row of samples that is directly adjacent to the top boundary of the CTU that the current block is located within, an encoder and a decoder may have access to a limited number of line buffers and, therefore, may have access to a limited number of lines of reconstructed samples above the current block for performing DIMD and TIMD.

Figure 19:
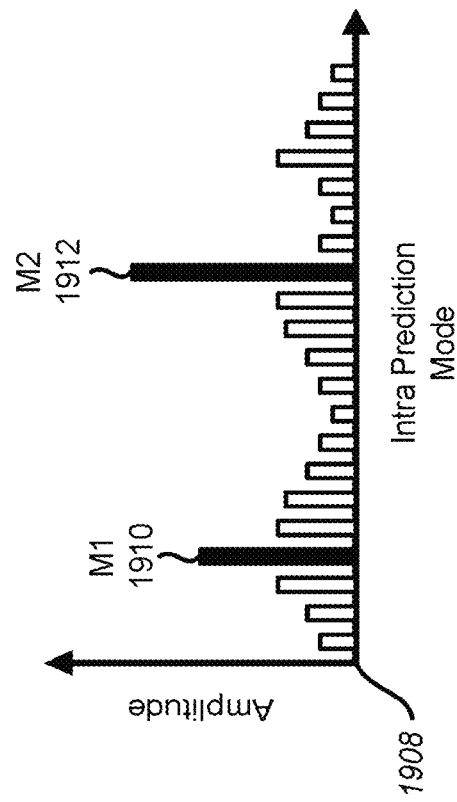
FIG. 19 shows an example implementation of decoder-side intra mode derivation (DIMD).
Figure 19:
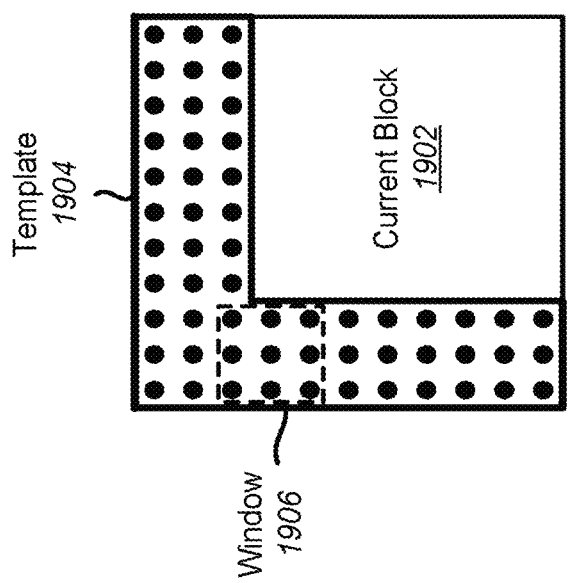

However, at least some encoder and decoder implementation models, such as ECM implementation models, may assume that the typically required number of lines of reconstructed samples for performing DIMD and TIMD are available even between CTUs in the vertical direction. For example, for certain intra mode derivation algorithms (e.g., a first type of intra mode derivation), the template size may not be adjustable. For example, at least some implementation of DIMD algorithms may have a fixed length of template size (e.g., template length equals to three lines with the window size of 3×3 for the window 1906 as shown in FIG. 19). At least some implementation of TIMD algorithms may have a fixed length of template size (e.g., template length L2 shown in FIG. 17 equals to four lines) and a fixed length of a reference line associated with the template (e.g., the length of the reference line 1706 shown in FIG. 17 equals to one line). In such implementations, the TIMD algorithms may not be available to use five lines of reconstructed samples for the template and the reference line associated with the template, for example, if the available size of line buffers is less than five lines. Similarly, the DIMD algorithms may not be available to use three lines of reconstructed samples for the template and the window, for example, if the available size of line buffers is less than three lines.

Various examples described herein provide improvements for intra prediction. For at least some intra mode derivation algorithms (e.g., a second type of intra mode derivation), the template size may be adjustable. For example, TIMD algorithms may be available to use three lines of reconstructed samples for the template and the reference line associated with the template, for example, by reducing the length (e.g., the length L2 shown in FIG. 17) of the template to two lines. TIMD algorithms may be available to use seven lines of reconstructed samples for the template and the reference line associated with the template, for example, by increasing the length (e.g., the length L2 shown in FIG. 17) of the template to six lines.

Figure 22:
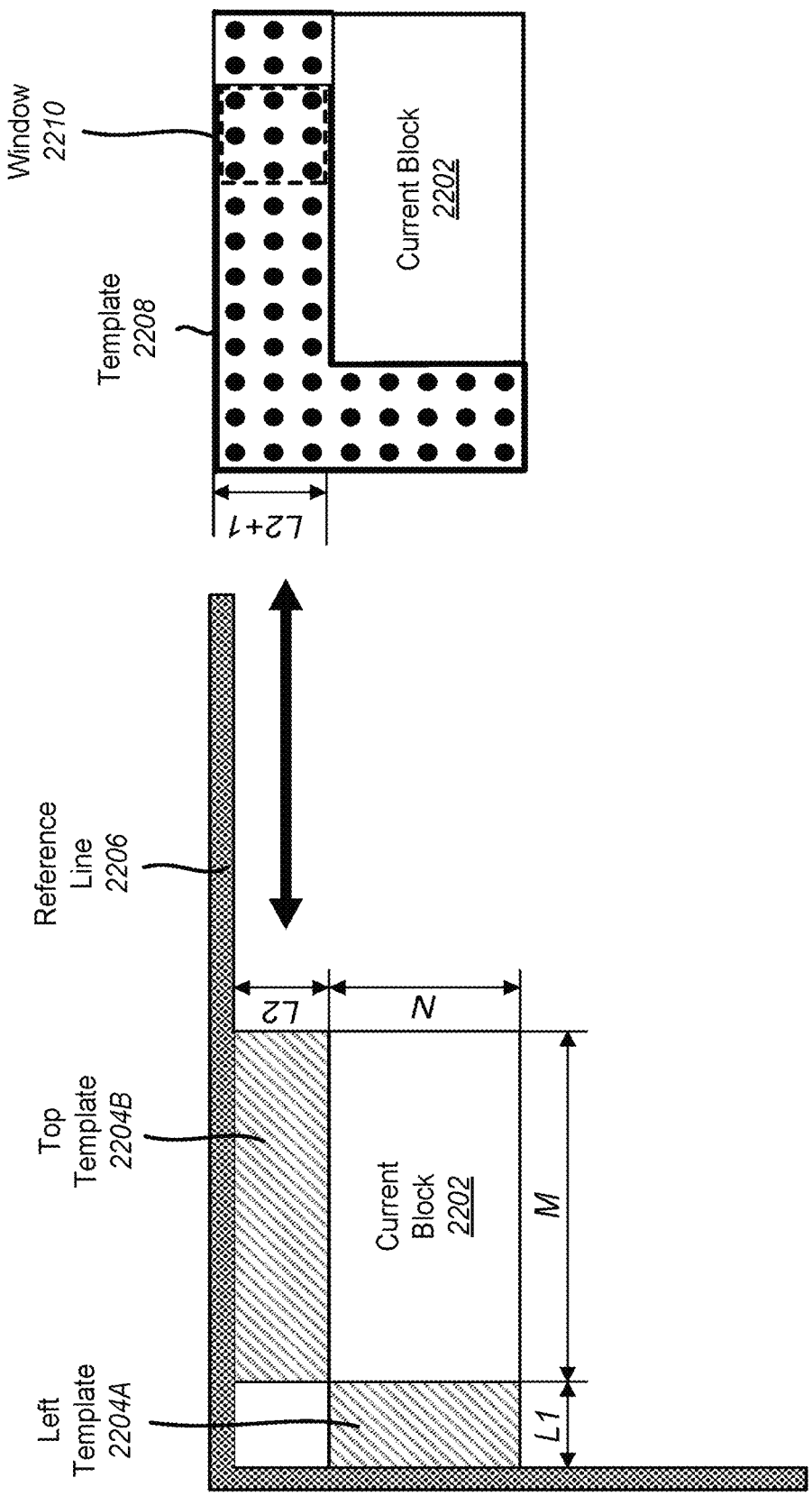
FIG. 22 shows an example of an aligned construction of a TIMD template and a DIMD template.

At least some intra mode derivation algorithms (e.g., the second type of intra mode derivation) may be used with other intra mode derivation algorithms (e.g., the first type of intra mode derivation and/or the second type of intra mode derivation). For example, TIMD algorithms may be available to use three lines of reconstructed samples for the template and the reference line associated with the template, for example, by reducing the length (e.g., the length L2 shown in FIG. 22) of the template to two lines. The TIMD algorithms may be used with DIMD algorithms, which use three lines of reconstructed samples as its template (e.g., template 2208 as shown in FIG. 22). Different intra mode derivation algorithms may be used together, for example, by aligning the number/quantity of reconstructed samples for deriving one or more intra prediction modes. The use of a plurality of intra mode derivation algorithms (e.g., both DIMD and TIMD) may provide improvements for the intra prediction. For example, the alignment of the template may improve the application of a plurality of different intra mode derivation algorithms. In some configurations, the alignment may reduce the size of internal on-chip memory, which may be costly, (e.g., if the overall size of reference samples is aligned according to the smaller number of reference lines used by an intra mode derivation algorithm). In some configurations, the alignment may provide more accurate prediction mode derivations (e.g., if the overall size of reference samples is aligned according to the greater number of reference lines used by an intra mode derivation algorithm). If accurate prediction mode(s) is/are derived by certain derivation algorithms (e.g., DIMD involving more reference samples in the DIMD derivation process), DIMD modes may be more frequently selected by an encoder and the number of bits for signaling a derived intra prediction modes may be reduced (e.g., as a DIMD mode requires a smaller number of bits for signaling in comparison with the required number of bits of a TIMID mode)

Apparatuses and methods may determine a length of a template (e.g., a template comprising reconstructed samples of a neighboring region above a current block), for example, based on a position of the current block relative to a CTU boundary between two CTUs. A device (e.g., an encoder, a decoder, a source device, a computing device, etc.) may determine the length of template to be equal to a predetermined value, for example, based on a top row of the current block being directly adjacent to the boundary of the CTU. By determining a length of template based on a position of the current block relative to a CTU boundary, DIMD and/or TIMD may be adapted. The DIMD and/or TIMD may be adapted when operating at a CTU boundary between two CTUs to use a smaller number of reference line(s) than typically used to perform DIMD and TIMD based on a number of lines of reconstructed reference samples available above the current block. An encoder or a decoder may use the template for performing DIMD and/or TIMD. For example, the device may generate, for each of a plurality of intra prediction modes, a prediction of the template based on a reference line. Based on the predictions of the template, the device may determine an intra prediction mode from among the plurality of intra prediction modes. For example, the size of line buffers that store the information of pixels in a line onto an internal memory may be reduced by allowing the adjustment of the template length of one or more intra prediction mode derivation algorithms, which may enable chip designers to design the line buffer size of various chips more flexibly. These and other features of the present disclosure are described further below.

Figure 17:
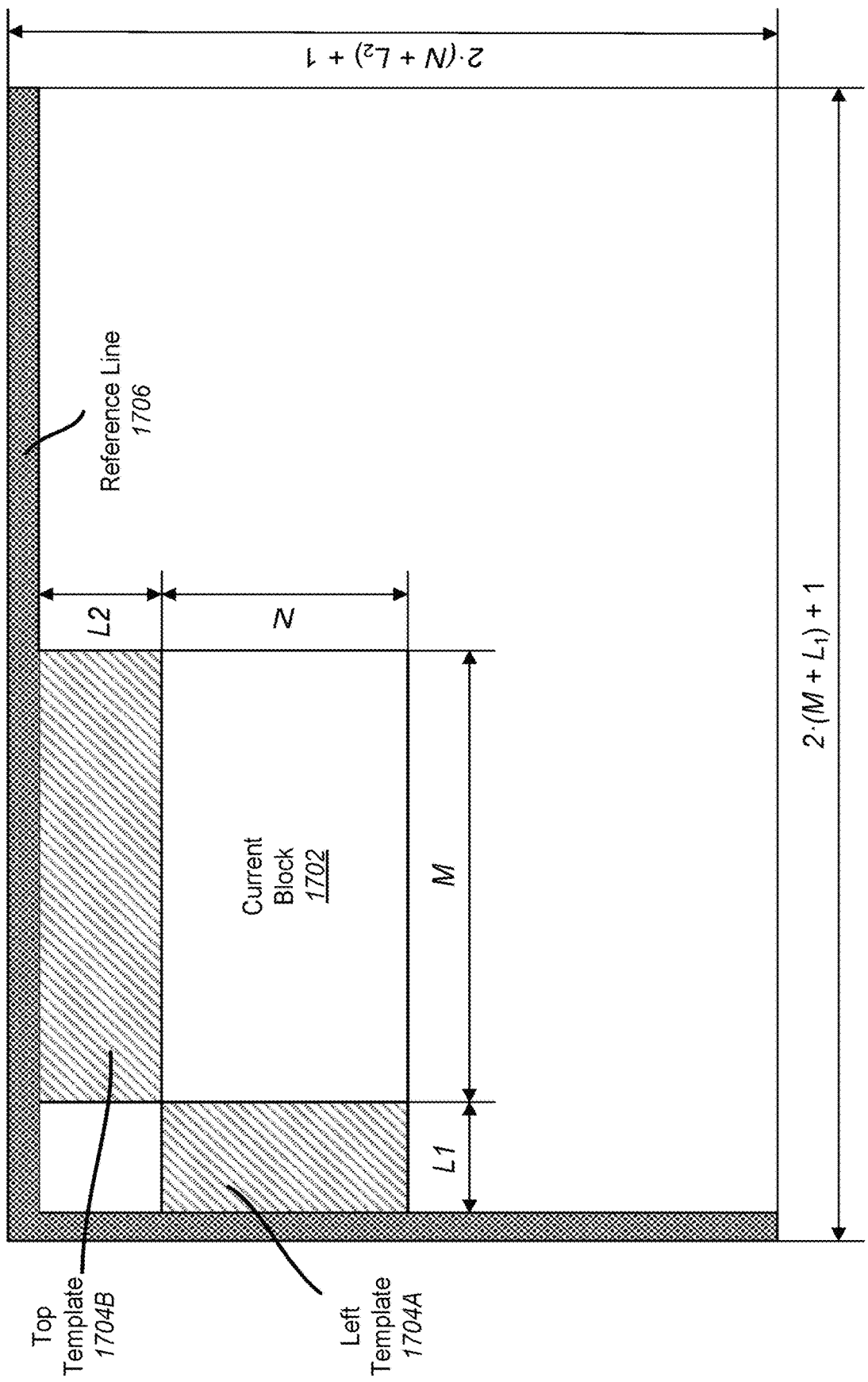
FIG. 17 shows an example implementation of template-based intra mode derivation (TIMD).

FIG. 17 shows an example implementation of TIMD. The TIMD may be implemented at both an encoder and a decoder, such as the encoder 200 shown in FIG. 2 and the decoder 300 shown in FIG. 3, respectively.

The encoder and/or the decoder may derive an intra prediction mode for a current block 1702 using TIMD. The current block 1702 may be a block within a picture or frame. For example, the current block 1702 may be a coding unit (CU) within a CTU of a picture. To derive the intra prediction mode for the current block 1702, TIMD may determine a template comprising reconstructed neighboring samples of the current block 1702. The template may comprise a left template 1704A and a top template 1704B that respectively extend to the left and above the current block 1702 by L1 and L2 samples, respectively. For example, the left and top templates 1704A and 1704B may have lengths L1=L2=2 for the current block 1702 of size 4×4 or 8×8 and lengths L1=L2=4 for the current block 1702 of size 16×16 or larger.

The encoder and/or the decoder may determine a reference line 1706 of the left and top templates 1704A and 1704B. The reference line 1706 may comprise neighboring samples above and to the left of the current block 1702. The samples in the reference line 1706 may not always come from reconstructed samples. Instead, a reference sample substitution algorithm may be used to determine unavailable samples in the reference line 1706 from available reference samples.

For each of a plurality of intra prediction modes, the encoder and/or the decoder may generate a prediction of the left and top templates 1704A and 1704B from the reference line 1706. For example, the encoder and/or the decoder may generate a prediction of the left and top templates 1704A and 1704B from the reference line 1706 in a same or similar manner as the reference samples 902 were used to generate a prediction of the current block 904 as described above with respect to FIGS. 11 and 12 above. The plurality of intra prediction modes for which the encoder and/or the decoder generate a prediction of the left and top templates 1704A and 1704B from the reference line 1706 may comprise only intra prediction modes that are included in one or more MPM lists constructed for an intra prediction of the current block 1702. The one or more MPM lists may be adaptively generated for the current block 1702, for example, based on the availability and indices of the intra prediction modes of the top and left neighboring blocks of the current block 1702 and/or other sources, such as an index of a DIMD intra prediction mode as will be explained further below. The one or more MPM lists may be constructed in accordance with HEVC, VVC, ECM or any other video coding standard or algorithm.

TIMD may be configured to generate a prediction of the left and top templates 1704A and 1704B from the reference line 1706 for a greater number of angular intra prediction modes than the number of angular intra prediction modes provided by the precision of entries in the one or more MPM lists permits. For example, TIMD may be configured to generate a prediction of the left and top templates 1704A and 1704B from the reference line 1706 for 129 angular intra prediction modes, and the precision of entries in the one or more MPM lists may only permit an indication of one of the 65 angular intra prediction mode described in the VVC standard. The encoder and/or the decoder may generate multiple predictions of the left and top templates 1704A and 1704B from the reference line 1706 for each intra prediction mode (or some subset) indicated in the one or more MPM lists at the lower precision. For example, for each intra prediction mode (or some subset) indicated in the one or more MPM lists, the encoder and/or the decoder may generate a prediction of the left and top templates 1704A and 1704B from the reference line 1706 for the intra prediction mode indicated in the one or more MPM lists as well as a prediction of the left and top templates 1704A and 1704B from the reference line 1706 for one or more neighboring intra prediction modes to the intra prediction mode in the MPM list. The one or more neighboring intra prediction modes may correspond to intra prediction modes not indicated or not included in the one or more MPM lists due to the precision limitation of entries in the one or more MPM list.

For each generated prediction, the encoder and/or the decoder may determine a prediction error, for example, based on a difference (e.g., sum of squared differences (SSD), sum of absolute differences (SAD), or sum of absolute transformed differences (SATD)) between the prediction samples determined for the intra prediction mode and the reconstructed samples of the left and top templates 1704A and 1704B. The encoder and/or the decoder may select an intra prediction mode from the applied intra prediction modes, for example, based on the determined prediction errors. For example, the encoder and/or the decoder may select an intra prediction mode from the applied intra prediction modes that results in the smallest prediction error for the left and top templates 1704A and 1704B. The selected intra prediction mode may be referred to as the "TIMD intra prediction mode" and may be selected from the larger set of intra prediction modes (e.g., the set of 129 angular intra prediction modes) available for TIMD. In one or more implementations, other selection criteria may be used to select an intra prediction mode from the applied intra prediction modes. In one or more implementations, the encoder and/or the decoder may select two intra prediction modes, from the applied intra prediction modes, that respectively result in the first and second smallest predictions errors for the left and top templates 1704A and 1704B in a process referred to as a "TIMD fusion." The encoder and/or the decoder may use the two intra prediction modes by predicting the current block 1702 using each of the two intra prediction modes and computing a final predictor based on a weighted average of each prediction determined using the two intra prediction modes. The weights applied to each prediction may be determined based on a cost factor corresponding to the intra prediction mode used to determine the prediction.

The encoder may compare a rate-distortion (RD) cost of the encoding current block 1702 with the TIMD intra prediction mode and other intra prediction modes and may select an appropriate intra prediction mode to encode the current block 1702 (e.g., the intra prediction mode with a lowest RD cost). Based on the encoder selecting the TIMD intra prediction mode to encode the current block 1702, the encoder may signal a TIMD flag indicating that the TIMD intra prediction mode as the intra prediction mode used to encode the current block 1702. Based on sending the TIMD flag, the encoder may not transmit other syntax elements used to code the intra prediction of the current block 1702, such as an MPM flag, an MPM index, or a truncated binary code for a non-MPM intra prediction mode. The decoder may parse the TIMD flag in a bitstream received from the encoder. Based on the TIMD flag indicating the TIMD intra prediction mode as the selected intra prediction mode used to encode the current block 1702, the decoder may perform TIMD as discussed above to independently derive the TIMD intra prediction mode and predict the current block 1702.

Figure 18:
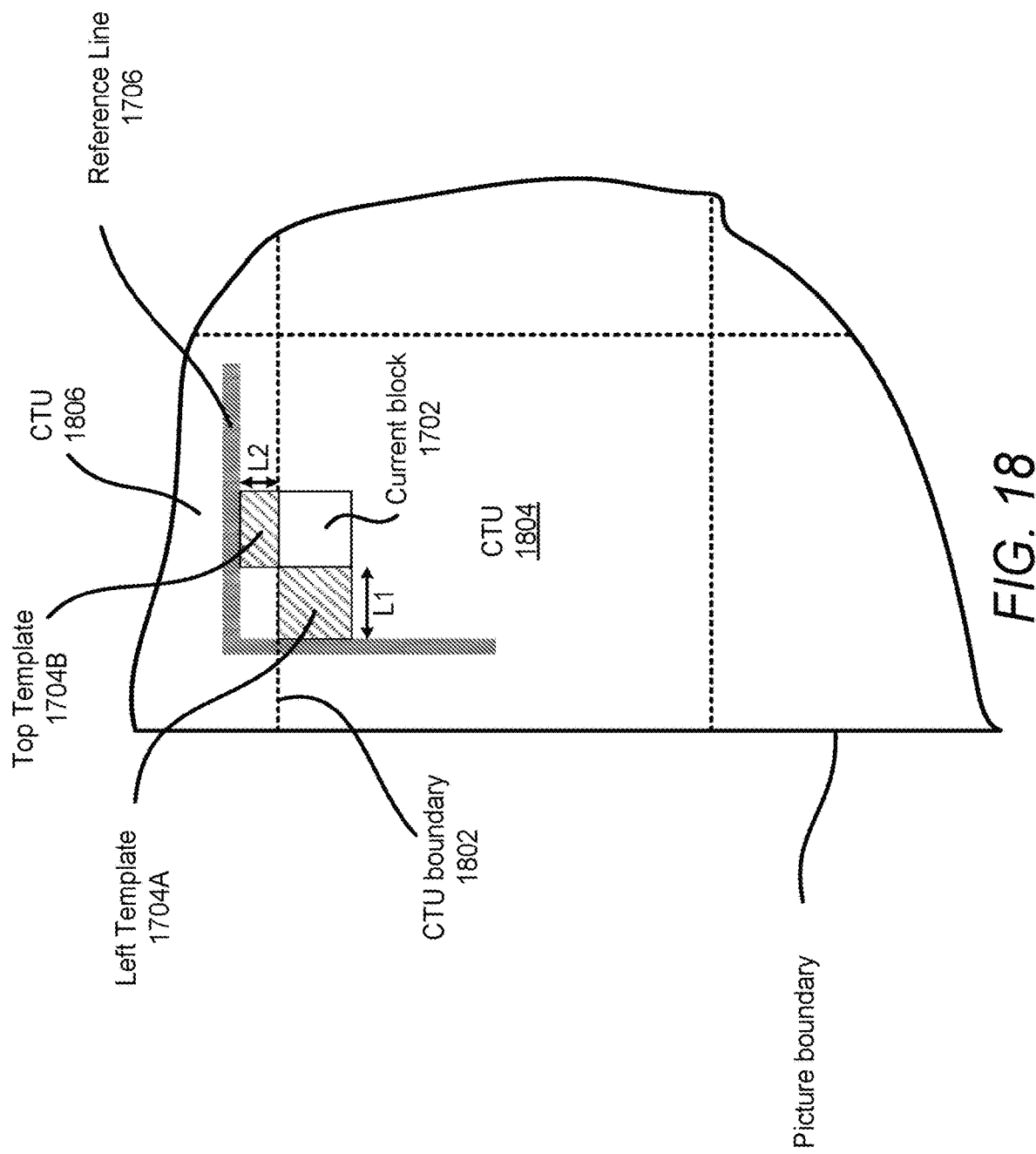
FIG. 18 shows an example adjustment to TIMD based on a position of current block relative to a boundary between two coding tree units (CTUs).

FIG. 18 shows an example adjustment to TIMD based on a position of current block relative to a boundary between two coding tree units (CTUs). In an example, FIG. 18 shows an example adjustment to TIMD, as described above with respect to FIG. 17, based on a position of the current block 1702 relative to a CTU boundary 1802 between two CTUs 1804 and 1806. As shown in FIG. 18, the current block 1702 is located within the CTU 1804 below the CTU boundary 1802. The top row of samples of the current block 1702 is directly adjacent to the CTU boundary 1802.

An encoder and/or the decoder may perform TIMD utilizing reconstructed reference samples above the current block 1702 being coded. As explained above with respect to FIG. 17, the encoder and/or the decoder may perform TIMD for the current block 1702, for example, based on the top template 1704B and the portion of the reference line 1706 above the current block 1702. The encoder and/or the decoder may use one or more lines of the reconstructed reference samples above the current block 1702 to perform TIMD.

Line buffers may be provided to handle data dependencies between CTUs in the vertical direction. Line buffers may be implemented with a size that is proportional to the width of a picture. Each tile row may need a separate line buffer, for example, if a picture is divided into multiple tile rows for parallel processing. In some implementations, line buffers may be implemented in static random access memory (SRAM) located on-chip with the encoder and/or the decoder. While fast, on-chip SRAM may be expensive in terms of its implementation size, cost, power, reliability, etc. For comparison, an SRAM cell may use six or more transistors to store a single bit, whereas a slower dynamic RAM (DRAM) cell may utilize a single transistor.

Because of the above considerations, the encoder and/or decoder may have a limited number of line buffers available for handling data dependencies between the CTUs 1804 and 1806 in the vertical direction. For example, for the current block 1702 with a top row of samples that is directly adjacent to the CTU boundary 1802, the encoder and/or the decoder may have access to a limited number of line buffers, and/or to a limited number of lines of reconstructed reference samples, above the current block 1702 for performing TIMD. At least some encoder and decoder implementation models, such as ECM implementation models, may assume that the typically required number of reference lines for performing TIMD are available even between CTUs in the vertical direction. If the number of reference lines provided for an intra mode derivation algorithm is set (or assumed) as a fixed value, an encoder and/or a decoder may need to maintain more line buffers to guarantee the availability of all the reference lines stored in an internal memory, which may be inflexible and may cause inefficiencies in configuring hardware components (e.g., memory, line buffers) and/or encoding/decoding performances.

The length (e.g., a vertical length) of a template may be adjusted, for example, based on a position of a current block relative to a top boundary of a CTU comprising the current block and/or if at least a portion of the template is comprised in a neighboring CTU. The encoder and/or the decoder may determine the length L2 of the top template 1704B (e.g., a template comprising reconstructed samples of a neighboring region above the current block 1702), for example, based on a position of the current block 1702 relative to a CTU boundary 1802 between the two CTUs.

For example, the encoder and/or the decoder may determine the length L2 of the top template 1704B, based on a top row of the current block 1702 being directly adjacent to the CTU boundary 1802, to be equal to the number of lines of the reconstructed reference samples above the current block 1702 that are available for coding the current block 1702.

In another example, the encoder and/or the decoder may determine the length L2 of the top template 1704B, based on a top row of the current block 1702 being directly adjacent to the CTU boundary 1802, to be equal to one less than the number of lines of the reconstructed reference samples above the current block 1702 that are available for coding the current block 1702. For example, assuming the number of lines of the reconstructed reference samples above the current block 1702 that are available for coding current block 1702 is three, the predetermined value (the length L2) may be one less than three (i.e., two: 3−1=2). In another example, assuming the number of lines of the reconstructed reference samples above the current block 1702 that are available for coding the current block 1702 is one, the predetermined value may be one less than one (i.e., zero: 1−1=0). In such a case where the predetermined value is zero, the encoder and/or decoder may only use the reference line 1706 and the left template 1704A to perform TIMD. The length L2 of the top template 1704B may be determined to be one less than the number of lines of the reconstructed reference samples above the current block 1702 that are available for coding the current block 1702 to accommodate the reference line 1706. The length L1 of the left template 1704 may be set equal to the length L2 of the top template 1704B or may be determined according to a size of the current block 1702 as explained above with respect to FIG. 17 (in which case L1 may not equal L2 as shown in FIG. 18).

In another example, the encoder and/or decoder may determine the length L2 of the top template 1704B, based on a top row of the current block 1702 being directly adjacent to the CTU boundary 1802, to be equal to the minimum of: one less than the number of lines of the reconstructed reference samples above the current block 1702 that are available for coding the current block 1702; and a value determined based on a length of a side of the current block 1702. The value may be equal to 2 based on a length of a side of the current block 1702 being 4 or 8 samples. The value may be equal to 4 based on a length of a side of the current block 1702 being 16 samples or larger. Thus, for example, the length L2 of the top template 1704B may be determined to be equal to two based on: the number of lines of the reconstructed reference samples above the current block 1702 that are available for coding current block 1702 being equal to three; and a length of a side of the current block 1702 being 4 or 8 samples. In some implementations, the length L1 of the left template 1704 may be set to be equal to the length L2 of the top template 1704B or may be determined according to a size (or length of one side) of the current block 1702 as explained above with respect to FIG. 17 (in which case L1 may not equal L2 as shown in FIG. 18).

In another example, the encoder and/or the decoder may determine the length L2 of the top template 1704B, based on a top row of the current block 1702 not being directly adjacent to the CTU boundary 1802, to be equal to a value determined based on a size of the current block 1702. For example, the left and top templates 1704A and 1704B may have lengths L1=L2=2 for the current block 1702 of size 4×4 or 8×8 and may have lengths L1=L2=4 for the current block 1702 of size 16×16 or larger.

The number of lines of the reconstructed reference samples that are above the current block 1702 and are available for the coding current block 1702 may be determined based on the number of line buffers configured to handle data dependencies between CTUs in the vertical direction.

The encoder and/or the decoder may perform TIMD in the same manner as discussed above with respect to FIG. 17, for example, after or in response to determining the length L2 of top template 1704B. For example, the encoder and/or the decoder may generate, for each or a plurality of intra prediction modes (e.g., in an MPM list or determined based on an MPM list), a prediction of one or both of the left and top templates 1704A and 1704B based on the reference line 1706. The encoder and/or the decoder may determine, based on the predictions of one or both of the left and top templates 1704A and 1704B, an intra prediction mode from among the plurality of intra prediction modes. The encoder may signal, in a bitstream to the decoder, the intra prediction mode as the selected intra prediction mode used to encode the current block. For example, the encoder may signal the intra prediction mode in the bitstream to the decoder via the TIMD flag as discussed above with respect to FIG. 17. The decoder may generate a prediction of the current block 1702 based on the selected intra prediction mode.

FIG. 19 shows an example of an improved implementation of DIMD. DIMD (e.g., as shown in FIG. 19) may be implemented at both an encoder and a decoder, such as the encoder 200 shown in FIG. 2 and the decoder 300 shown in FIG. 3, respectively. The encoder and the decoder may derive an intra prediction mode for a current block 1902 being coded using DIMD. The current block 1902 may be a block within a picture. For example, the current block 1902 may be a CU within a CTU of a picture.

To derive the intra prediction mode for the current block 1902, DIMD may perform a gradient analysis on samples (e.g., luma samples) of a template 1904 comprising neighboring samples of the current block 1902. The template 1904 may be L-shaped and may have a width of 3 samples. In some implementations, the template 1904 may have a different shape and/or a different sample width. The encoder and the decoder may perform the gradient analysis to determine an angular direction for template 1904. For example, the encoder and the decoder may apply a 3×3 Sobel gradient filter to one or more positions of a 3×3 window of samples 1906 centered on a sample within template 1904. The 3×3 Sobel gradient filter may be defined as follows:

$$M_x = \begin{bmatrix} -1 & -2 & -1 \\ 0 & 0 & 0 \\ 1 & 2 & 1 \end{bmatrix} \quad (19)$$

$$M_y = \begin{bmatrix} 1 & 0 & -1 \\ 2 & 0 & -2 \\ 1 & 0 & -1 \end{bmatrix} \quad (20)$$

In some implementations, a different gradient filter and/or a different window may be used.

The encoder and the decoder may apply the matrices of (19) and (20) to a position of the 3×3 window of samples 1906 centered on a sample within the template 1904 to determine a horizontal gradient Gx and a vertical gradient Gy, respectively. In some implementations, the encoder and the decoder may not apply the matrices of (19) and (20) to the 3×3 window of samples 1906 centered on a sample in the template 1904 that is directly adjacent to the current block 1902 due to a lack of neighboring samples either on the right-side of the sample or below the sample. In some implementations, the encoder and the decoder may apply modified versions of the matrices of (19) and (20) to the 3×3 window of samples 1906 centered on a sample in the template 1904 that is directly adjacent to the current block 1902. For example, the matrices of (19) and (20) may be replaced with 3×2 matrices for the 3×3 window of samples 1906 centered on a sample in the column of the template 1904 immediately to the left of the current block 1902 and with 2×3 matrices for the 3×3 window of samples 1906 centered on a sample in the row immediately above the current block 1902. For 3×3 window of samples 1906 centered on the top-left sample directly neighboring the current block 1902, a 3×2 matrix may be used to determine the vertical gradient Gy and a 2×3 matrix may be used to determine the horizontal gradient Gx. In some implementations, the encoder and the decoder may not apply the matrices of (19) and (20) to the 3×3 window of samples 1906 centered on a sample in the template 1904 that is outside of the current picture of the current block 1902 or located on the boundaries of the current picture of the current block 1902 due to a lack of neighboring samples. In some implementations, the encoder and the decoder may not apply the matrices of (19) and (20) to the 3×3 window of samples 1906 centered on a sample in the template 1904 that is located one line above a current CTU of the current block 1902 to avoid the potential need for additional line buffers.

The encoder and the decoder may determine an intra direction corresponding to each set of the determined horizontal gradient Gx and the determined vertical gradient Gy. For example, the encoder and the decoder may determine the intra direction corresponding to a set of the horizontal and vertical gradients Gx and Gy as follows:

$$\text{angle} = \arctan(G_x/G_y) \quad (21)$$

The encoder and/or the decoder may convert the angle into one of a subset of intra prediction modes available to the DIMD techniques at the encoder and/or the decoder, such as one of the 67 intra prediction modes defined in the VVC standard. The encoder and/or the decoder may further determine an amplitude (and/or gradient intensity) corresponding to the intra prediction mode determined according to (21) as follows:

$$\text{amplitude} = |G_x| + |G_y| \quad (22)$$

The encoder and/or the decoder may use the intra prediction mode as an index to a histogram of gradients (HoG) 1908 (e.g., as shown in FIG. 19). The value in HoG 1908 at that index corresponding to the intra prediction direction may be increased based on the amplitude of the equation (22). Once all positions (or some subset of all positions) of the 3×3 window of samples 1906 for the template 1906 have been processed by the encoder and/or the decoder, the histogram may contain cumulative values of the gradient intensities for multiple intra prediction modes.

The encoder and/or the decoder may determine the intra prediction mode derived using DIMD (also referred to as the "DIMD intra prediction mode") for the current block 1902 as the intra prediction mode that shows the first highest peak in HoG 1908. In the example of FIG. 19, the encoder and/or the decoder may determine the intra prediction mode for the current block 1902 derived using DIMD as intra prediction mode M2 1912, which corresponds to the highest peak in HoG 1908. In some implementations, the encoder and/or the decoder may not use a single intra prediction mode as the DIMD intra prediction mode. Instead, the encoder and decoder may use multiple intra prediction modes as the DIMD intra prediction mode for the current block 1902 in a process referred to as a "DIMD fusion." For example, the encoder and/or the decoder may use the intra prediction modes corresponding to two or more of the highest peaks in HoG 1908. The encoder and/or the decoder may use multiple intra prediction modes by predicting the current block 1902 using each of the multiple intra prediction modes and computing a final predictor based on a weighted average of each prediction determined using the multiple intra prediction modes. The weight applied to each prediction may be determined in proportion to the amplitude of the spike in HoG 1908 corresponding to the intra prediction mode used to determine the prediction. In some implementations, one of the multiple intra prediction modes may be a planar mode determined independent of HoG 1908.

The encoder may compare a rate-distortion (RD) cost of encoding the current block 1902 with the DIMD intra prediction mode and other intra prediction modes and may select an appropriate intra prediction mode to encode the current block 1902 (e.g., the intra prediction mode with a lowest RD cost). Based on the encoder selecting the DIMD intra prediction mode to encode the current block 1902, the encoder may signal a DIMD flag indicating that the DIMD intra prediction mode as the intra prediction mode used to encode the current block 1902. Based on sending the DIMD flag, the encoder may not transmit other syntax elements used to code the intra prediction of the current block 1902, such as an MPM flag, an MPM index, a TIMD flag, or a truncated binary code for a non-MPM intra prediction mode. The decoder may parse the DIMD flag in a bitstream received from the encoder. Based on the DIMD flag indicating the DIMD intra prediction mode as the selected intra prediction mode used to encode the current block 1902, the decoder may perform DIMD as discussed above to independently derive the DIMD intra prediction mode and predict the current block 1902.

Figure 20:
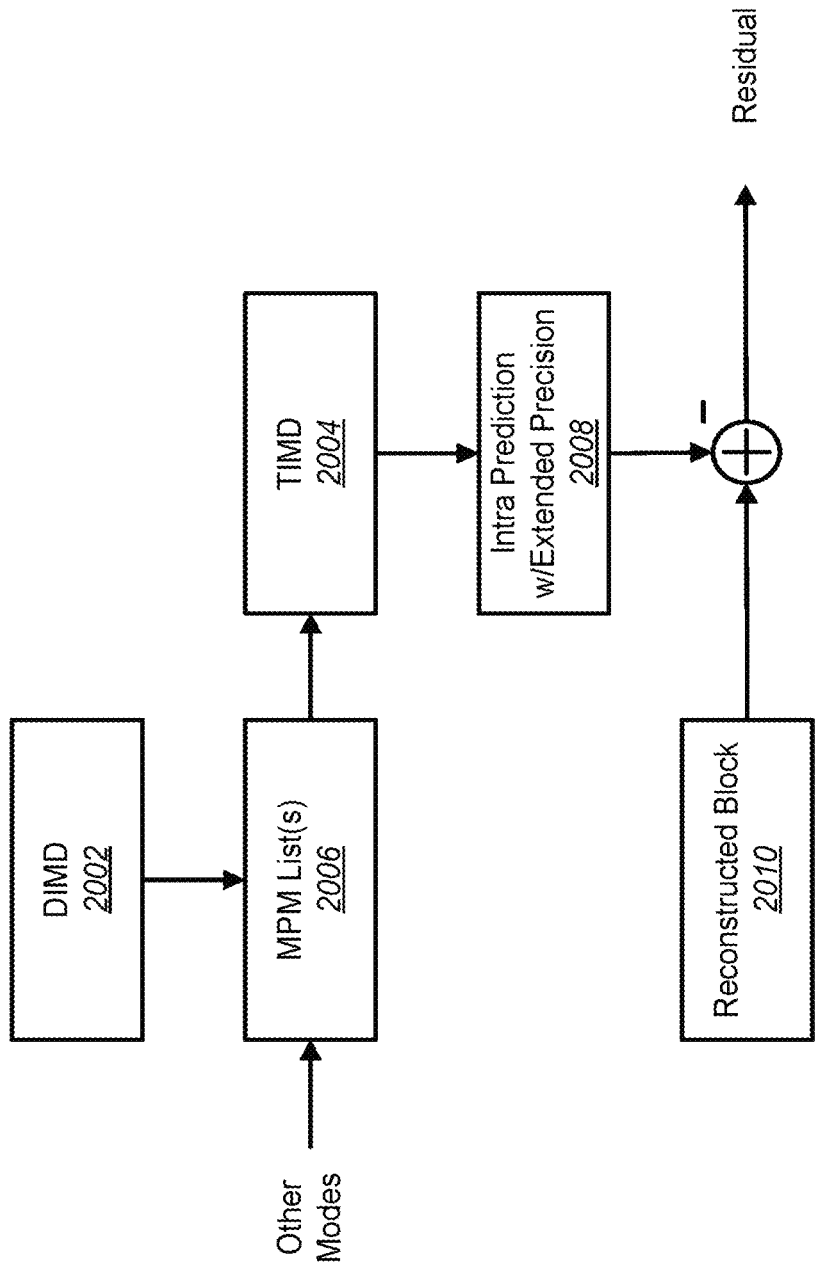
FIG. 20 shows an example implementation of a DIMD technique in conjunction with a TIMD technique.

FIG. 20 shows an example approach for using the DIMD technique in conjunction with the TIMD technique. The approach shown in FIG. 20 may be implemented at an encoder, such as the encoder 200 shown in FIG. 2.

The encoder may perform DIMD 2002 (e.g., an improved DIMD operation), for example, as described above with respect to FIG. 19. Assuming that the intra prediction mode determined using the DIMD 2002 is not selected by the encoder (e.g., based on a RD cost) for encoding a current block, the intra prediction mode of one or more highest peaks in the HoG determined by the DIMD 2002 may be processed by TIMD 2004. For example, the encoder may construct one or more MPM lists 2006. The one or more MPM lists 2006 may be constructed to include the intra prediction mode of each of one or more highest peaks in the HoG determined by the DIMD 2002 and one or more other modes. For example, the one or more MPM lists may be constructed to include the respective intra prediction modes of the two highest peaks in the HoG determined by the DIMD 2002 and one or more other modes.

After the encoder constructs one or more MPM lists 2006, the encoder may perform TIMD 2004 as discussed above with respect to FIGS. 17 and 18 for each (or a subset) of the intra prediction modes in the one or more MPM lists to determine a TIMD intra prediction mode. Assuming the encoder selects the TIMD intra prediction mode to encode the current block (e.g., based on a RD cost), the encoder may signal a TIMD flag, indicating that the TIMD intra prediction mode as the intra prediction mode used to encode the current block, in a bitstream to the decoder. The encoder may further perform an intra prediction 2008 of the current block being encoded based on the TIMD intra prediction mode or modes (e.g., based on TIMD fusion) determined or selected by the TIMD 2004. The encoder may determine a residual based on a difference between the prediction determined by the intra prediction 2008 and a reconstruction 2010 of the current block. The encoder may signal the residual in the bitstream to the decoder.

Figure 21:
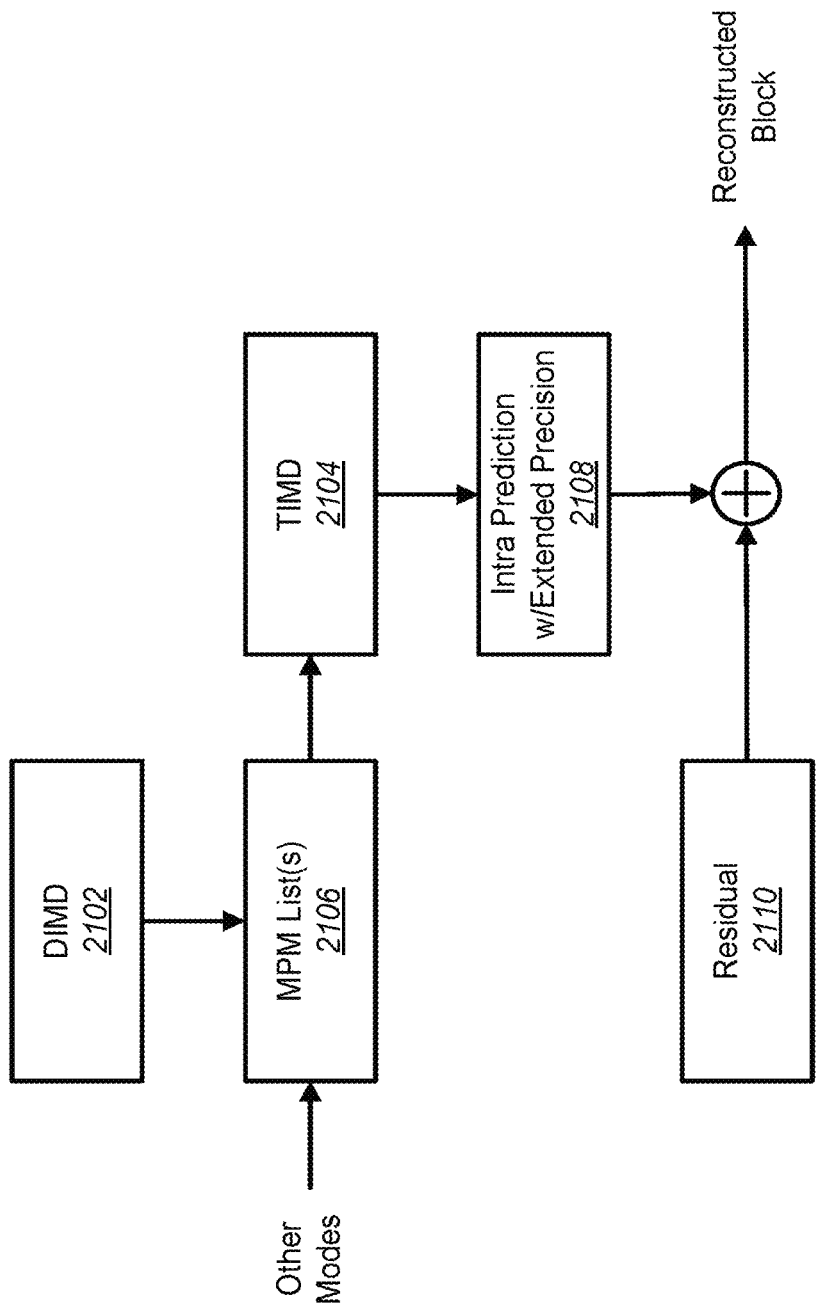
FIG. 21 shows an example implementation of a DIMD technique in conjunction with a TIMD technique.

FIG. 21 shows an example approach for using the DIMD technique in conjunction with the TIMD technique. The approach illustrated in FIG. 21 may be implemented at a decoder, such as the decoder 300 in FIG. 3.

The decoder may perform DIMD 2102 for a current block being encoded as discussed above with respect to FIG. 19. Assuming that the decoder receives a flag from an encoder indicating TIMD is used to encode the current block, the intra prediction mode of one or more highest peaks in the HoG determined by the DIMD 2102 may be processed by TIMD 2104. For example, the decoder may construct one or more MPM lists 2106. The one or more MPM lists 2106 may be constructed to include the intra prediction mode of each of one or more highest peaks in the HoG determined by the DIMD 2102 and one or more other modes. For example, the one or more MPM lists may be constructed to include the respective intra prediction modes of the two highest peaks in the HoG determined by the DIMD 2102 and one or more other modes.

After the decoder constructs one or MPM lists 2106, the decoder may perform the TIMD 2104 as discussed above with respect to FIGS. 17 and 18 for each (or a subset) of the intra prediction modes in the one or more MPM list(s) to determine a TIMD intra prediction mode. The decoder may perform an intra prediction 2108 of the current block being encoded based on the intra prediction mode or modes (e.g., based on the TIMD fusion) determined by the TIMD 2104. The decoder may determine a reconstruction of the current block based on an addition of the prediction determined by the intra prediction 2108 and a residual 2110 of the current block. The decoder may receive the residual 2110 in the bitstream from the encoder.

As mentioned above with respect to FIG. 17, the TIMD 2104 may be configured to generate a prediction for a greater number of angular intra prediction modes than the number of prediction modes of the precision of entries in the one or more MPM lists 2106 permits. For example, the TIMD 2104 may be configured to generate a prediction of a template from a reference line (as shown in FIG. 17) for 129 angular intra prediction modes and the precision of entries in the one or more MPM lists may only permit an indication of one of the 65 angular intra prediction modes (e.g., described in the VVC standard). As further mentioned above with respect to FIG. 17, the intra prediction mode or modes selected by the TIMD 2104 may be selected from the increased set of intra prediction modes available for the TIMD 2104.

An encoder and/or a decoder may perform both DIMD and TIMD utilizing reconstructed reference samples above a current block being coded. For example, as explained above with respect to FIG. 17, an encoder and/or a decoder may perform TIMD for a current a block based on a top template and a portion of the reference line above the current block being encoded. Similarly, as explained above with respect to FIG. 19, the encoder and/or the decoder may perform DIMD for a current block based on an L-shaped template, a portion of which is above the current block as shown in FIG. 19. The encoder and/or the decoder may use one or more lines of reconstructed reference samples above the current block being encoded to perform both DIMD and TIMD.

As discussed above, line buffers may be generally required to handle data dependencies between CTUs in the vertical direction. Line buffers may be typically implemented with a size that is proportional to the width of a picture. Each tile row may need a separate line buffer, for example, if a picture is divided into multiple tile rows for parallel processing. In some implementations, line buffers may be implemented in static random access memory (SRAM) located on-chip with the encoder or the decoder. While fast, on-chip SRAM may be expensive in terms of its implementation size. A typical SRAM cell may use six or more transistors to store a single bit, whereas a slower dynamic RAM (DRAM) cell may utilize a single transistor.

Because of the above considerations and/or configurations, it may be desirable to limit the number of line buffers available for the encoder and/or the decoder for handling data dependencies between CTUs in the vertical direction to reduce the complexity of the encoder implementation and/or the decoder implementation. For example, for a current block with a top row of samples that is directly adjacent to a CTU boundary between CTUs, it may be desirable to limit the number of line buffers and to limit the number of lines of reconstructed reference samples above the current block for performing both DIMD and TIMD. However, at least some encoder and decoder implementation models, such as ECM implementation models, use different numbers of lines of reconstructed reference samples for DIMD and TIMD. More particularly, the encoder and decoder implementation models, such as ECM implementation models, may use up to five lines of reconstructed reference samples above a current block with a top row of samples directly adjacent to a CTU boundary between CTUs for performing TIMD and three lines of reconstructed reference samples above a current block with a top row of samples directly adjacent to a CTU boundary between CTUs for performing DIMD.

It may be disadvantageous from a complexity versus compression gain tradeoff to support two extra lines of reconstructed reference samples above a CTU boundary between two CTUs solely for the single TIMD tool. Rather, it may be advantageous to align the TIMD and DIMD tools to use the same number of lines of reconstructed reference samples above a CTU boundary between two CTUs. FIG. 22 shows an example of an aligned construction of a TIMD template and a DIMD template. As shown in FIG. 22, TIMD and DIMD are being performed for a current block 2202 being coded.

DIMD is shown the right side of FIG. 22 and may be performed by an encoder and a decoder as explained above with respect to FIGS. 19-21. For example, a template 2208 and a window 2210 may be determined and used in the same manner as described above.

TIMD is shown on the left side of FIG. 22 and may be performed by an encoder and a decoder as explained above with respect to FIGS. 17 and 20-21. For example, a left template 2204A, a top template 2204B, and a reference line 2206 may be determined and used in the same manner as described above with respect to FIGS. 17 and 20-21 except that a length L2 of top template 2204B may be determined in a different manner. More specifically, instead of the length L2 of the top template 2204B being determined simply based on the size of current block 2202 as described above with respect to FIG. 17, the length L2 of the top template 2204B may be determined based on a position of the current block 2202 relative to a CTU boundary between the two CTUs (e.g., a first CTU comprising the current block 2202 and a second CTU comprising the top template 2204B). For example, based on the top row of samples of the current block 2202 being directly adjacent to a CTU boundary between the two CTUs, the length L2 of the top template 2204B may be determined to be equal to one sample less than the length of the portion of the template 2208 that is above the current block 2202. For example, the length of the portion of the template 2208 above the current block 2202 may have a length of three samples (which correspond to three lines). Based on the top row of samples of the current block 2202 being directly adjacent to a CTU boundary between the two CTUs, the length L2 of the top template 2204B may be determined to be equal to one sample less than three (i.e., the length of the portion of the template 2208 above the current block 2202) or, equivalently, two. The length of the reference line 2206 may be one. The sum of the length of the reference line 2206 and the length L2 of the top template 2204B may be three. In this way, the number of lines of reconstructed reference samples utilized by DIMD and TIMD may be aligned (e.g., three lines) to reduce a number of line buffers needed for implementation.

Figure 23:
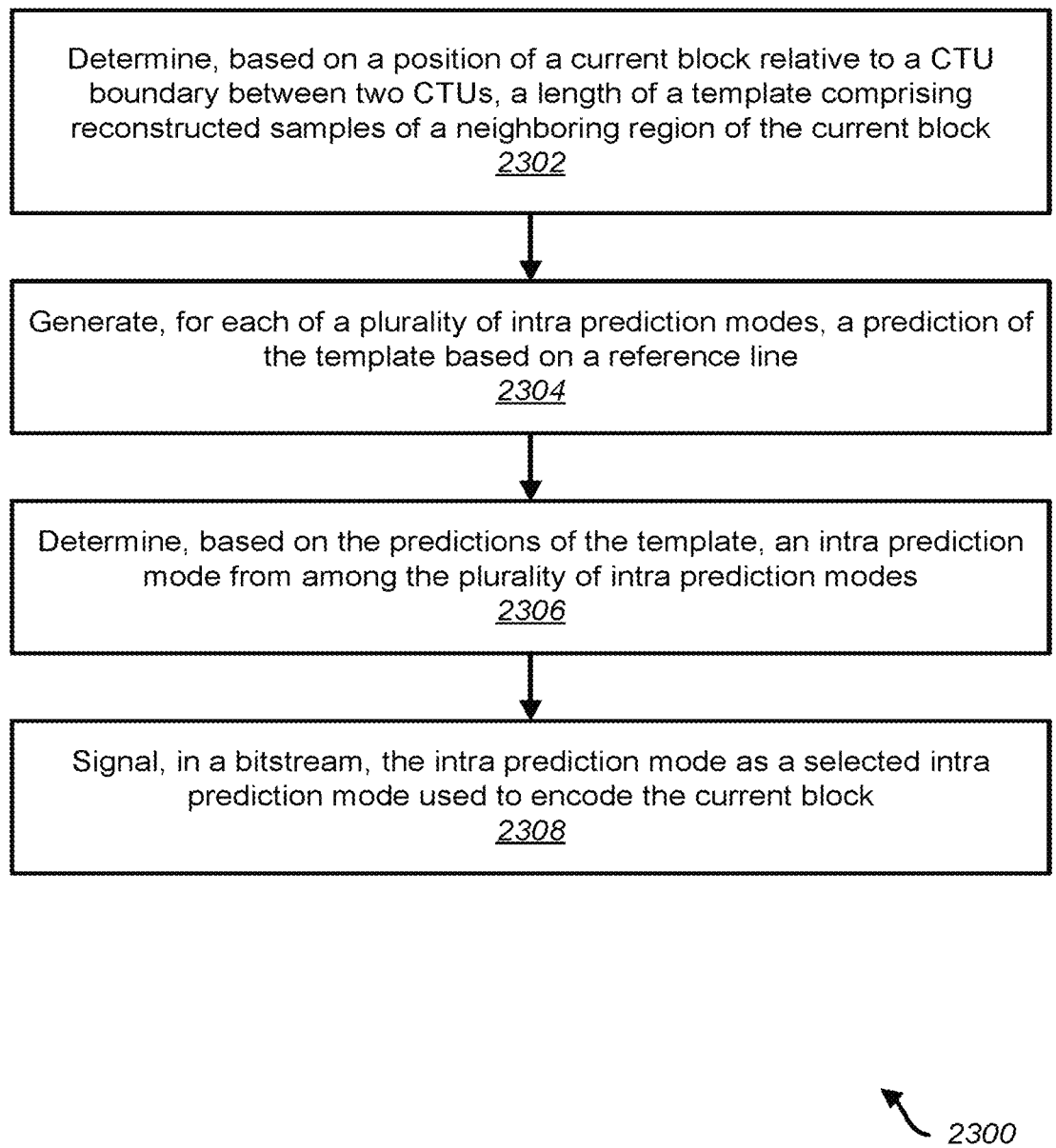
FIG. 23 shows an example method for performing intra prediction using TIMD.

FIG. 23 shows an example method for performing intra prediction using TIMD. The method 2300 may be implemented by an encoder, such as the encoder 200 shown in FIG. 2.

At 2302, a length of a template comprising reconstructed samples of a neighboring region of the current block may be determined based on a position of a current block relative to a CTU boundary between two CTUs. The current block may be located within a first CTU, of the two CTUs, below the boundary. The boundary may be a top boundary of the first CTU.

The length of the template may be determined to be equal to a number/quantity of lines of reconstructed reference samples above the current block that are available for coding the current block based on the top row of the current block being directly adjacent to the boundary (e.g., for DIMD, etc.).

The length of the template may be determined to be equal to one less than the number/quantity of lines of reconstructed reference samples above the current block that are available for coding the current block based on the top row of the current block being directly adjacent to the boundary. The length of the template may be determined to be equal to two or zero (e.g., for TIMD, DIMD, etc.).

The length of the template may be determined to be equal to a minimum of: one less than the number/quantity of lines of reconstructed reference samples above the current block that are available for coding the current block; and a value determined based on a length of a side of the current block. For example, the length of the template may be determined to be equal to two based on either: the number/quantity of lines of reconstructed reference samples above the current block being equal to three; or the length of the side of the current block being less than eight. The number/quantity of lines of reconstructed reference samples above the current block that are available for coding the current block may be determined based on the number/quantity of line buffers configured to handle data dependencies between CTUs in the vertical direction.

A width of the template may be equal to a width of the current block. For example, the width of the top template (e.g., the top template 2204B) may be equal to the width of the current block.

At 2304, a prediction of the template based on a reference line may be generated for each of a plurality of intra prediction modes. The reference line may be reference line associated with the template (e.g., the top template 2204B and/or the left template 2204A). A horizontal line of the reference line may correspond to one line and may be adjacent to the top boundary of the top template (e.g., the top template 2204B). The reference line may comprise reconstructed samples. The plurality of intra prediction modes may be determined based on a MPM list of the current block. The plurality of intra prediction modes may be determined based on a MPM list of the current block and one or more neighboring intra prediction modes of the intra prediction mode in the MPM list.

At 2306, an intra prediction mode from among the plurality of intra prediction modes may be determined based on the predictions of the template.

At 2308, the intra prediction mode may be signaled (e.g., via the TIMD flag) in a bitstream as a selected intra prediction mode to be used to encode the current block.

Figure 24:
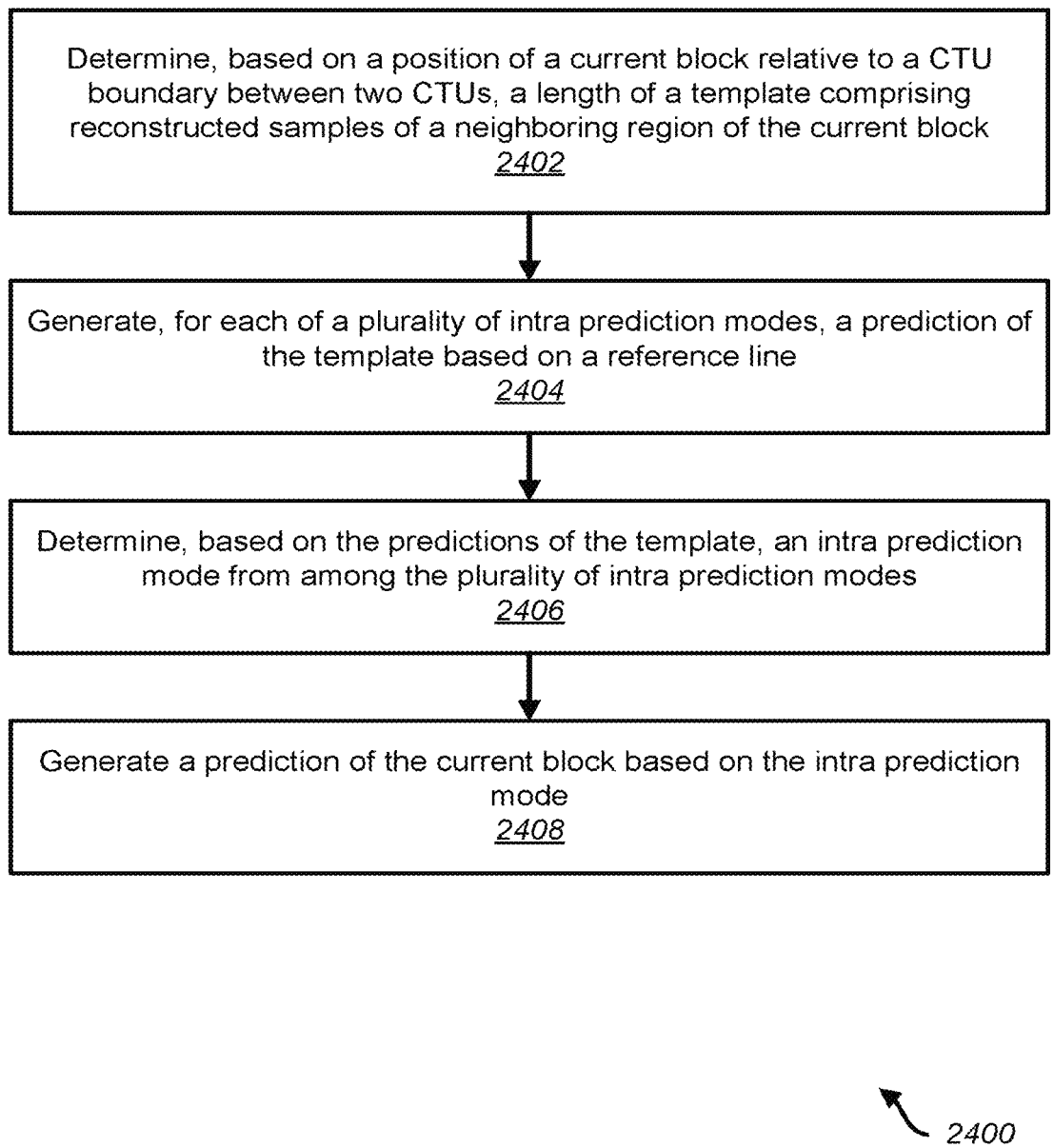
FIG. 24 shows an example method for performing intra prediction using TIMD.

FIG. 24 shows an example method for performing intra prediction using TIMD. The method 2400 may be implemented by a decoder, such as the decoder 300 shown in FIG. 3.

At 2402, a length of a template comprising reconstructed samples of a neighboring region of the current block may be determined based on a position of a current block relative to a CTU boundary between two CTUs. The current block may be located with a CTU, of the two CTUs, below the boundary. The boundary may be a top boundary of the CTU.

The length of the template is determined to be equal to a number/quantity of lines of reconstructed reference samples above the current block that are available for coding the current block, for example, based on the top row of the current block being directly adjacent to the boundary.

The length of the template may be determined to be equal to one less than the number/quantity of lines of reconstructed reference samples above the current block that are available for coding the current block, for example, based on the top row of the current block being directly adjacent to the boundary. The length of the template may be determined to be equal to two or zero.

The length of the template may be determined to be equal to a minimum of: one less than the number/quantity of lines of reconstructed reference samples above the current block that are available for coding the current block; and a value determined based on a length of a side of the current block. For example, the length of the template may be determined to be equal to two based on either: the number/quantity of lines of reconstructed reference samples above the current block being equal to three; or the length of the side of the current block being less than eight. The number/quantity of lines of reconstructed reference samples above the current block that are available for coding the current block may be determined based on the number/quantity of line buffers configured to handle data dependencies between CTUs in the vertical direction.

A width of the template may be equal to a width of the current block.

At 2404, a prediction of the template based on a reference line associated with the template may be generated for each of a plurality of intra prediction modes. The reference line associated with the template may comprise reconstructed samples. The plurality of intra prediction modes may be determined based on a MPM list of the current block. The plurality of intra prediction modes may be determined based on a MPM list of the current block and one or more neighboring intra prediction modes of the intra prediction mode in the MPM list.

At 2406, an intra prediction mode from among the plurality of intra prediction modes may be determined, for example, based on the predictions of the template. The predictions of the template may be performed based on one or more intra mode derivation algorithms (e.g., the DIMD, the TIMD, etc.)

At 2408, a prediction of the current block based on the determined intra prediction mode may be generated. The prediction of the currently block may be performed based on reference samples (e.g., as described above with respect to FIG. 9).

Figure 25:
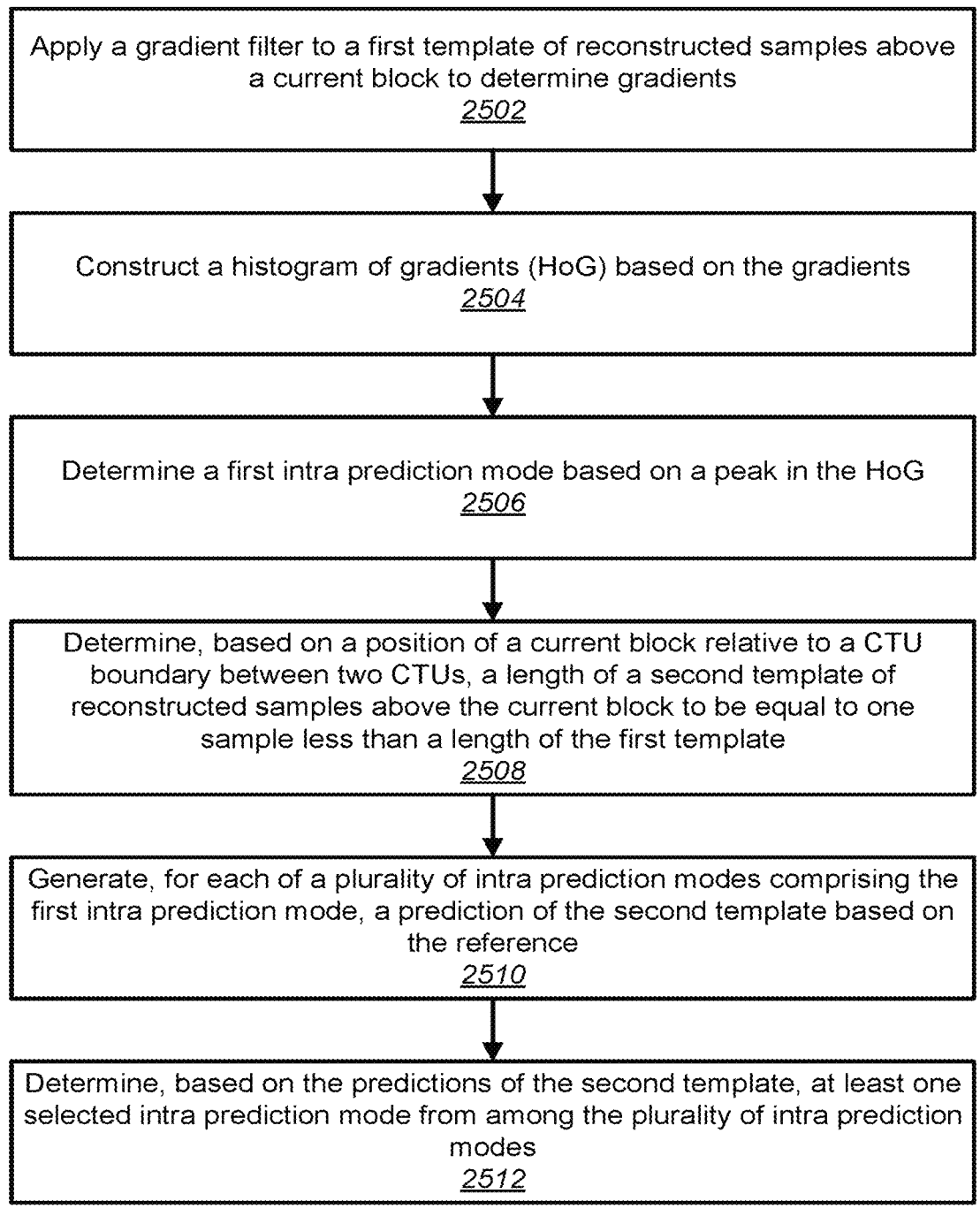
FIG. 25 shows an example method for performing intra prediction using DIMD in conjunction with TIMID.

FIG. 25 shows an example method for performing intra prediction using DIMD and TIMD. The method 2500 may be implemented by an encoder or a decoder, such as the encoder 200 in FIG. 2 or the decoder 300 in FIG. 3.

At 2502, a gradient filter may be applied to a first template of reconstructed samples above a current block to determine gradients.

At 2504, a histogram of gradients (HoG) may be constructed based on the gradients. The HoG may be constructed, for example, as explained above with respect to FIG. 19.

At 2506, a first intra prediction mode may be determined based on a peak in the HoG.

At 2508, a length of a second template of reconstructed samples above the current block may be determined to be equal to one sample less than a length of the first template.

At 2510, a prediction of the second template may be generated, for each of a plurality of intra prediction modes comprising the first intra prediction mode, based on the reference.

At 2512, at least one selected intra prediction mode, among the plurality of intra prediction modes, may be determined based on the predictions of the second template.

Various examples herein may be implemented in hardware (e.g., using analog and/or digital circuits), in software (e.g., through execution of stored/received instructions by one or more general purpose or special-purpose processors), and/or as a combination of hardware and software. Various examples herein may be implemented in an environment comprising a computer system or other processing system.

Figure 26:
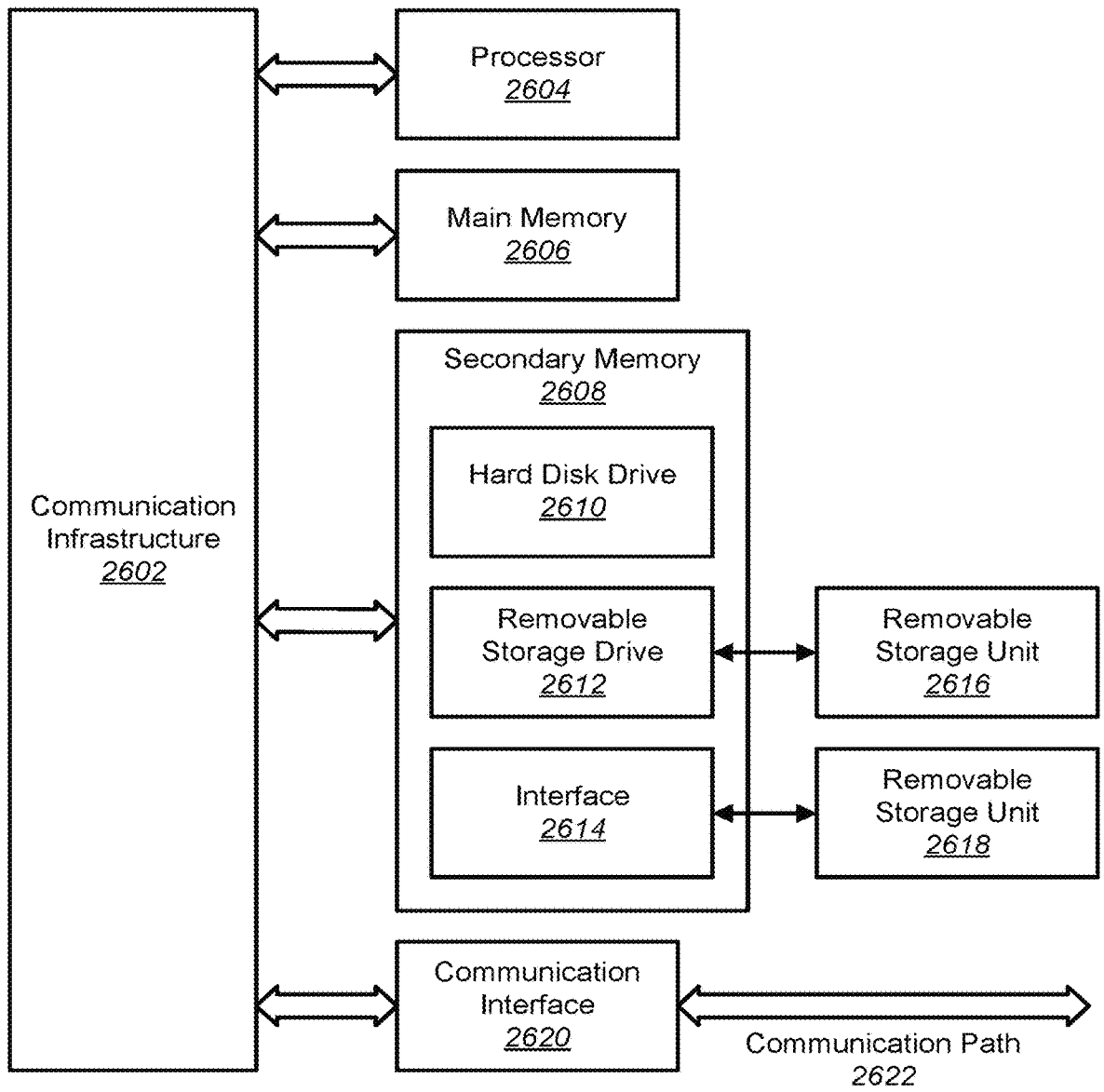
FIG. 26 shows an example computer system that may be used any of the examples described herein.

FIG. 26 shows an example computer system that may be used any of the examples described herein. For example, the example computer system 2600 shown in FIG. 26 may implement one or more of the methods described herein. For example, various devices and/or systems described herein (e.g., in FIGS. 1, 2, and 3) may be implemented in the form of one or more computer systems 2600. Furthermore, each of the steps of the flowcharts depicted in this disclosure may be implemented on one or more computer systems 2600.

The computer system 2600 may comprise one or more processors, such as a processor 2604. The processor 2604 may be a special purpose processor, a general purpose processor, a microprocessor, and/or a digital signal processor. The processor 2604 may be connected to a communication infrastructure 2602 (for example, a bus or network). The computer system 2600 may also comprise a main memory 2606 (e.g., a random access memory (RAM)), and/or a secondary memory 2608.

The secondary memory 2608 may comprise a hard disk drive 2610 and/or a removable storage drive 2612 (e.g., a magnetic tape drive, an optical disk drive, and/or the like). The removable storage drive 2612 may read from and/or write to a removable storage unit 2616. The removable storage unit 2616 may comprise a magnetic tape, optical disk, and/or the like. The removable storage unit 2616 may be read by and/or may be written to the removable storage drive 2612. The removable storage unit 2616 may comprise a computer usable storage medium having stored therein computer software and/or data.

The secondary memory 2608 may comprise other similar means for allowing computer programs or other instructions to be loaded into the computer system 2600. Such means may include a removable storage unit 2618 and/or an interface 2614. Examples of such means may comprise a program cartridge and/or cartridge interface (such as in video game devices), a removable memory chip (such as an erasable programmable read-only memory (EPROM) or a programmable read-only memory (PROM)) and associated socket, a thumb drive and USB port, and/or other removable storage units 2618 and interfaces 2614 which may allow software and/or data to be transferred from the removable storage unit 2618 to the computer system 2600.

The computer system 2600 may also comprise a communications interface 2620. The communications interface 2620 may allow software and data to be transferred between the computer system 2600 and external devices. Examples of the communications interface 2620 may include a modem, a network interface (e.g., an Ethernet card), a communications port, etc. Software and/or data transferred via the communications interface 2620 may be in the form of signals which may be electronic, electromagnetic, optical, and/or other signals capable of being received by the communications interface 2620. The signals may be provided to the communications interface 2620 via a communications path 2622. The communications path 2622 may carry signals and may be implemented using wire or cable, fiber optics, a phone line, a cellular phone link, an RF link, and/or any other communications channel(s).

A computer program medium and/or a computer readable medium may be used to refer to tangible storage media, such as removable storage units 2616 and 2618 or a hard disk installed in the hard disk drive 2610. The computer program products may be means for providing software to the computer system 2600. The computer programs (which may also be called computer control logic) may be stored in the main memory 2606 and/or the secondary memory 2608. The computer programs may be received via the communications interface 2620. Such computer programs, when executed, may enable the computer system 2600 to implement the present disclosure as discussed herein. In particular, the computer programs, when executed, may enable the processor 2604 to implement the processes of the present disclosure, such as any of the methods described herein. Accordingly, such computer programs may represent controllers of the computer system 2600.

Figure 27:
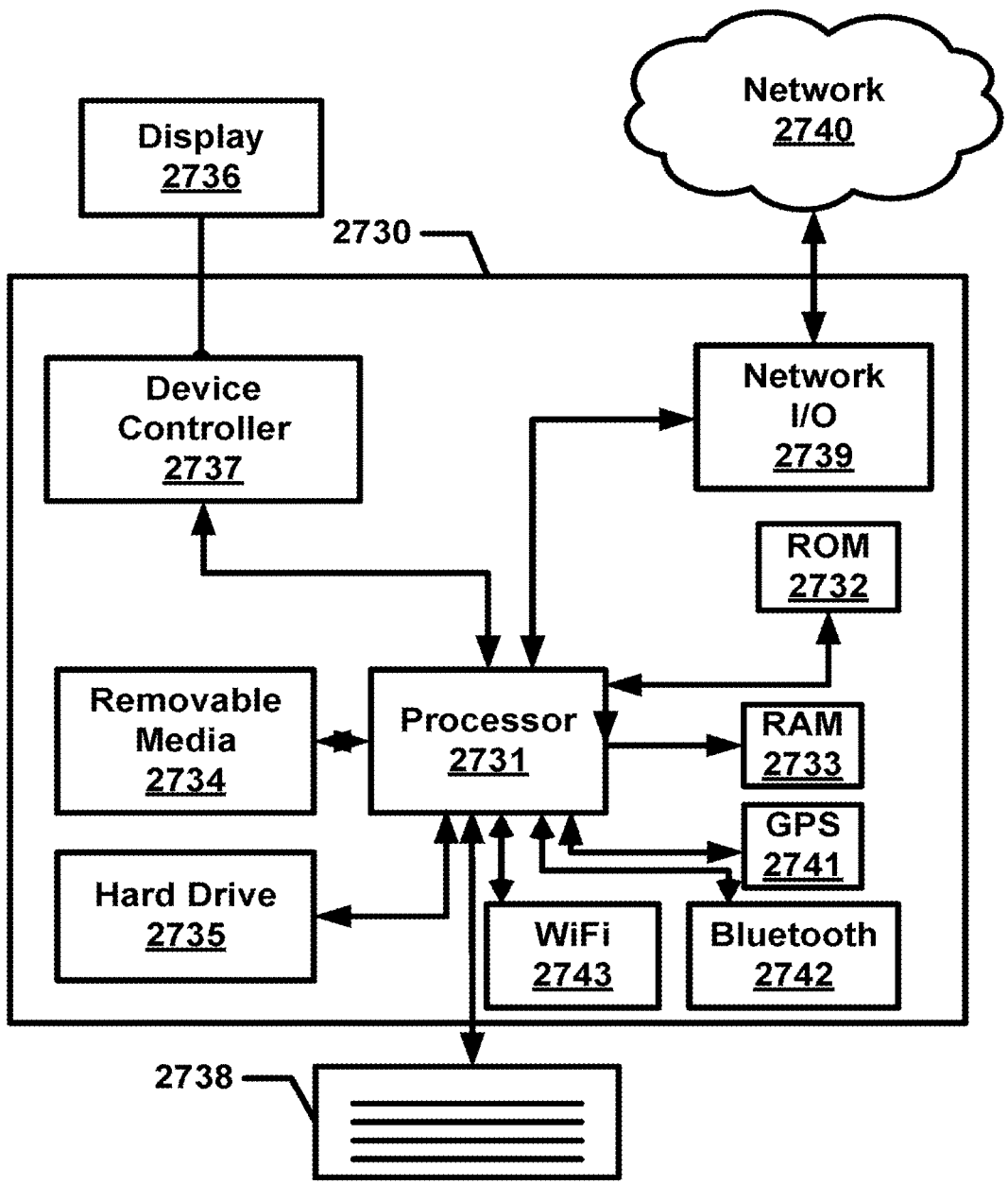
FIG. 27 shows example elements of a computing device that may be used to implement any of the various devices described herein.

FIG. 27 shows example elements of a computing device that may be used to implement any of the various devices described herein, including, for example, a source device (e.g., 102), an encoder (e.g., 200), a destination device (e.g., 106), a decoder (e.g., 300), and/or any computing device described herein. The computing device 2730 may include one or more processors 2731, which may execute instructions stored in the random-access memory (RAM) 2733, the removable media 2734 (such as a Universal Serial Bus (USB) drive, compact disk (CD) or digital versatile disk (DVD), or floppy disk drive), or any other desired storage medium. Instructions may also be stored in an attached (or internal) hard drive 2735. The computing device 2730 may also include a security processor (not shown), which may execute instructions of one or more computer programs to monitor the processes executing on the processor 2731 and any process that requests access to any hardware and/or software components of the computing device 2730 (e.g., ROM 2732, RAM 2733, the removable media 2734, the hard drive 2735, the device controller 2737, a network interface 2739, a GPS 2741, a Bluetooth interface 2742, a WiFi interface 2743, etc.). The computing device 2730 may include one or more output devices, such as the display 2736 (e.g., a screen, a display device, a monitor, a television, etc.), and may include one or more output device controllers 2737, such as a video processor. There may also be one or more user input devices 2738, such as a remote control, keyboard, mouse, touch screen, microphone, etc. The computing device 2730 may also include one or more network interfaces, such as a network interface 2739, which may be a wired interface, a wireless interface, or a combination of the two. The network interface 2739 may provide an interface for the computing device 2730 to communicate with a network 2740 (e.g., a RAN, or any other network). The network interface 2739 may include a modem (e.g., a cable modem), and the external network 2740 may include communication links, an external network, an in-home network, a provider's wireless, coaxial, fiber, or hybrid fiber/coaxial distribution system (e.g., a DOCSIS network), or any other desired network. Additionally, the computing device 2730 may include a location-detecting device, such as a global positioning system (GPS) microprocessor 2741, which may be configured to receive and process global positioning signals and determine, with possible assistance from an external server and antenna, a geographic position of the computing device 2730.

The example in FIG. 27 may be a hardware configuration, although the components shown may be implemented as software as well. Modifications may be made to add, remove, combine, divide, etc. components of the computing device 2730 as desired. Additionally, the components may be implemented using basic computing devices and components, and the same components (e.g., processor 2731, ROM storage 2732, display 2736, etc.) may be used to implement any of the other computing devices and components described herein. For example, the various components described herein may be implemented using computing devices having components such as a processor executing computer-executable instructions stored on a computer-readable medium, as shown in FIG. 27. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. The computing device may determine, based on a quantity of reference samples above a current block of a video, a length of a template above the current block and a reference line associated with the template. The computing device may determine, based on the reference line associated with the template, a plurality of predictions of the template respectively associated with a plurality of intra prediction modes. The computing device may determine, based on the plurality of predictions of the template, at least one selected intra prediction mode of the plurality of intra prediction modes. The computing device may generate, based on the at least one selected intra prediction mode of the plurality of intra prediction modes, a signal for an intra prediction associated with the current block. The computing device may determine the length of the template and the reference line associated with the template for a first intra mode derivation and further based on at least one of: a position of the current block relative to a boundary between two coding tree units (CTUs) or a length of a second template associated with a second intra mode derivation. A first coding tree unit (CTU) of the two CTUs may comprise the current block. The boundary may be a top boundary of the first CTU and may be a bottom boundary of a second CTU of the two CTUs. The quantity of reference samples above a current block may correspond to a quantity of lines of reconstructed reference samples above the current block that are available for coding the current block. At least a portion of the lines of reconstructed reference samples may be above a top boundary of a coding tree unit that comprises the current block. The computing device may send, via a bitstream and based on the plurality of predictions of the template, an indication of the at least one selected intra prediction mode of the plurality of intra prediction modes. The computing device may generate, based on the at least one selected intra prediction mode of the plurality of intra prediction modes, a prediction of the current block. The quantity of reference samples above the current block may be determined based on a quantity of hardware line buffers configured to store reference lines from an upper coding tree unit (CTU). A lower CTU may comprise the current block and may be positioned below the upper CTU. The computing device may determine the length of the template by determining, based on a size of the current block satisfying a threshold, the length of the template as four lines or determining, based on the size of the current block not satisfying the threshold, the length of the template as two lines. A width of the template may correspond to a width of the current block. The computing device may determine, based on a most probable mode (MPM) list associated with the current block, the plurality of intra prediction modes. The computing device may encode or decode, based on the at least one selected intra prediction mode of the plurality of intra prediction modes and based on reference samples associated with the template, the current block. The plurality of intra prediction modes may be determined further based on at least one neighboring intra prediction mode associated with the MPM list. The template may be associated with a first intra mode derivation algorithm. The computing device may determine, based on a second template associated with a second intra mode derivation algorithm, at least one second intra prediction mode associated with the second intra mode derivation algorithm. The computing device may determine the length of the template and the reference line associated with the template further based on a length of the second template. The plurality of intra prediction modes may comprise the at least one second intra prediction mode associated with the second intra mode derivation algorithm. The plurality of intra prediction modes may be used as candidate intra prediction modes for the first intra mode derivation algorithm. The computing device may send, via a bitstream, an indication that the at least one selected intra prediction mode of the plurality of intra prediction modes is to be used for encoding the current block. The length of the template may be determined to correspond to two lines based on at least one of: the quantity of reference samples above the current block corresponding to three lines; or a length of a side of the current block being less than eight lines. The length of the template may correspond to four lines based on a size of the current block being 16×16 samples or larger. The length of the template may correspond to two lines based on a size of the current block being less than 16×16 samples. A length of a left template of the current block may correspond to four lines based on a width of the current block being 16 samples or larger. The length of the template above the current block may correspond to four lines based on a height of the current block being 16 samples or larger. A length of a left template of the current block may correspond to two lines based on a width of the current block being 8 samples or smaller. The length of the template above the current block may correspond to two lines based on a height of the current block being 8 samples or smaller. The reference line associated with the template may comprise first reference samples corresponding to one line. The template may comprise second reference samples corresponding to a plurality of lines. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the current block based on the determined length of the template. A computer-readable medium may store instructions that, when executed, cause performance of the described method, additional operations and/or include the additional elements.

A computing device may perform a method comprising multiple operations. The computing device may determine, based on a position of a current block relative to a boundary between two coding tree units (CTUs), a length of a template comprising reconstructed samples above the current block. The computing device may determine, based on a reference line associated with the template, a plurality of predictions of the template respectively associated with a plurality of intra prediction modes. The computing device may send, via a bitstream and based on the plurality of predictions of the template, an indication of at least one selected intra prediction mode of the plurality of intra prediction modes. A first CTU of the two CTUs may comprise the current block. The boundary may be a top boundary of the first CTU. The boundary may be a bottom boundary of a second CTU of the two CTUs. The determining the length of the template may be based on: a top row of the current block being adjacent to the boundary; and a quantity of lines of reconstructed reference samples above the current block that are available for coding the current block. The length of the template may correspond to: the quantity of lines of reconstructed reference samples above the current block that are available for coding the current block; or one less than the quantity of lines of reconstructed reference samples above the current block that are available for coding the current block. The determining the length of the template may comprise determining, based on a top row of the current block being adjacent to the boundary, a vertical length of the template to be equal to two or zero. The determining the length of the template may comprise determining, based on a top row of the current block being adjacent to the boundary, the length of the template to be equal to a minimum of: one less than a quantity of lines of reconstructed reference samples above the current block that are available for coding the current block; and a value determined based on a length of a left side of the current block. The quantity of lines of reconstructed reference samples above the current block that are available for coding the current block may be determined based on a quantity of line buffers configured to handle data dependencies between the two CTUs in a vertical direction. The determining the length of the template may be based on: a top row of the current block not being adjacent to the boundary; and a size of the current block. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the current block based on the determined length of the template. A computer-readable medium may store instructions that, when executed, cause performance of the described method, additional operations and/or include the additional elements.

A computing device may perform a method comprising multiple operations. The computing device may determine, based on a position of a current block relative to a boundary between two coding tree units (CTUs), a length of a template comprising reconstructed samples above the current block. The computing device may determine, based on a reference line associated with the template, a plurality of predictions of the template respectively associated with a plurality of intra prediction modes. The computing device may determine, based on the plurality of predictions of the template, at least one intra prediction mode of the plurality of intra prediction modes. The computing device may generate, based on the at least one intra prediction mode, a prediction of the current block. A first CTU of the two CTUs may comprise the current block. The boundary may be a top boundary of the first CTU and may be a bottom boundary of a second CTU of the two CTUs. The determining the length of the template may be based on: a top row of the current block being adjacent to the boundary; and a quantity of lines of reconstructed reference samples above the current block that are available for coding the current block. The length of the template may correspond to: the quantity of lines of reconstructed reference samples above the current block that are available for coding the current block; or one less than the quantity of lines of reconstructed reference samples above the current block that are available for coding the current block. The determining the length of the template may comprise determining, based on a top row of the current block being adjacent to the boundary, a vertical length of the template to be equal to two or zero. The determining the length of the template may comprise determining, based on a top row of the current block being adjacent to the boundary, the length of the template to be equal to a minimum of: one less than a quantity of lines of reconstructed reference samples above the current block that are available for coding the current block; and a value determined based on a length of a left side of the current block. The computing device may comprise one or more processors; and memory storing instructions that, when executed by the one or more processors, cause the computing device to perform the described method, additional operations and/or include the additional elements. A system may comprise a first computing device configured to perform the described method, additional operations and/or include the additional elements; and a second computing device configured to encode or decode the current block based on the determined length of the template. A computer-readable medium may store instructions that, when executed, cause performance of the described method, additional operations and/or include the additional elements.

One or more examples herein may be described as a process which may be depicted as a flowchart, a flow diagram, a data flow diagram, a structure diagram, and/or a block diagram. Although a flowchart may describe operations as a sequential process, one or more of the operations may be performed in parallel or concurrently. The order of the operations shown may be re-arranged. A process may be terminated when its operations are completed, but could have additional steps not shown in a figure. A process may correspond to a method, a function, a procedure, a subroutine, a subprogram, etc. If a process corresponds to a function, its termination may correspond to a return of the function to the calling function or the main function.

Operations described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks. Features of the disclosure may be implemented in hardware using, for example, hardware components such as application-specific integrated circuits (ASICs) and gate arrays. Implementation of a hardware state machine to perform the functions described herein will also be apparent to persons skilled in the art.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein. Computer-readable medium may comprise, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

A non-transitory tangible computer readable media may comprise instructions executable by one or more processors configured to cause operations described herein. An article of manufacture may comprise a non-transitory tangible computer readable machine-accessible medium having instructions encoded thereon for enabling programmable hardware to cause a device (e.g., an encoder, a decoder, a transmitter, a receiver, and the like) to allow operations described herein. The device, or one or more devices such as in a system, may include one or more processors, memory, interfaces, and/or the like.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more of the operations described herein may be conditional. For example, one or more operations may be performed if certain criteria are met, such as in computing device, a communication device, an encoder, a decoder, a network, a combination of the above, and/or the like. Example criteria may be based on one or more conditions such as device configurations, traffic load, initial system set up, packet sizes, traffic characteristics, a combination of the above, and/or the like. If the one or more criteria are met, various examples may be used. It may be possible to implement any portion of the examples described herein in any order and based on any condition.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
    determining, by a computing device and based on a quantity of lines of reference samples above a current block of a video, a vertical length of a template above the current block and a reference line for prediction of the template;
    determining, based on the reference line determined for prediction of the template, a plurality of predictions of the template respectively associated with a plurality of intra prediction modes;
    determining, based on the plurality of predictions of the template, at least one selected intra prediction mode of the plurality of intra prediction modes; and
    generating, based on the at least one selected intra prediction mode of the plurality of intra prediction modes, a signal indicating the at least one selected intra prediction mode for an intra prediction associated with the current block.
2. The method of claim 1, wherein:
    the determining the vertical length of the template and the reference line determined for prediction of the template is for a first intra mode derivation and is further based on at least one of:
        a position of the current block relative to a boundary between two coding tree units (CTUs); or
        a length of a second template associated with a second intra mode derivation;
    a first coding tree unit (CTU), of the two CTUs, comprising the current block; and
    the boundary being a top boundary of the first CTU and being a bottom boundary of a second CTU of the two CTUs.
3. The method of claim 1, wherein the quantity of line of reference samples above a current block corresponds to a quantity of lines of reconstructed reference samples above the current block that are available for coding the current block, and
    wherein at least a portion of the lines of reconstructed reference samples is above a top boundary of a coding tree unit that comprises the current block.
4. The method of claim 1, further comprising:
    sending, via a bitstream and based on the plurality of predictions of the template, an indication of the at least one selected intra prediction mode of the plurality of intra prediction modes.
5. The method of claim 1, further comprising:
    encoding or decoding, based on the at least one selected intra prediction mode of the plurality of intra prediction modes and based on reference samples associated with the template, the current block.
6. The method of claim 1, wherein the quantity of lines of reference samples above the current block is determined based on a quantity of hardware line buffers configured to store reference lines from an upper coding tree unit (CTU), and wherein a lower CTU comprises the current block and is positioned below the upper CTU.
7. A method comprising: determining, by a computing device and based on a position of a current block relative to a boundary between two coding tree units (CTUs), a length of a template comprising reconstructed samples above the current block; determining, based on a reference line associated with the template, a plurality of predictions of the template respectively associated with a plurality of intra prediction modes; and sending, via a bitstream and based on the plurality of predictions of the template, an indication of at least one selected intra prediction mode of the plurality of intra prediction modes.
8. The method of claim 7, wherein: a first CTU of the two CTUs comprises the current block; and the boundary is a top boundary of the first CTU and is a bottom boundary of a second CTU of the two CTUs.
9. The method of claim 7, wherein the determining the length of the template is based on: a top row of the current block being adjacent to the boundary; and a quantity of lines of reconstructed reference samples above the current block that are available for coding the current block.
10. The method of claim 9, wherein the length of the template corresponds to: the quantity of lines of reconstructed reference samples above the current block that are available for coding the current block; or one less than the quantity of lines of reconstructed reference samples above the current block that are available for coding the current block.
11. The method of claim 7, wherein the determining the length of the template comprises determining, based on a top row of the current block being adjacent to the boundary, a vertical length of the template to be equal to two or zero.
12. The method of claim 7, wherein the determining the length of the template comprises determining, based on a top row of the current block being adjacent to the boundary, the length of the template to be equal to a minimum of: one less than a quantity of lines of reconstructed reference samples above the current block that are available for coding the current block; and a value determined based on a length of a left side of the current block.

13. The method of claim 9, wherein the quantity of lines of reconstructed reference samples above the current block that are available for coding the current block is determined based on a quantity of line buffers configured to handle data dependencies between the two CTUs in a vertical direction.

14. The method of claim 7, wherein the determining the length of the template is based on a top row of the current block not being adjacent to the boundary; and a size of the current block.

15. A method comprising: determining, by a computing device and based on a position of a current block relative to a boundary between two coding tree units (CTUs), a length of a template comprising reconstructed samples above the current block; determining, based on a reference line associated with the template, a plurality of predictions of the template respectively associated with a plurality of intra prediction modes determining, based on the plurality of predictions of the template, at least one intra prediction mode of the plurality of intra prediction modes; and generating, based on the at least one intra prediction mode, a prediction of the current block.

16. The method of claim 15, wherein a first CTU of the two CTUs comprises the current block; and the boundary is a top boundary of the first CTU and is a bottom boundary of a second CTU of the two CTUs.

17. The method of claim 15, wherein the determining the length of the template is based on: a top row of the current block being adjacent to the boundary; and a quantity of lines of reconstructed reference samples above the current block that are available for coding the current block.

18. The method of claim 17, wherein the length of the template corresponds to: the quantity of lines of reconstructed reference samples above the current block that are available for coding the current block; or one less than the quantity of lines of reconstructed reference samples above the current block that are available for coding the current block.

19. The method of claim 15, wherein the determining the length of the template comprises determining, based on a top row of the current block being adjacent to the boundary, a vertical length of the template to be equal to two or zero.

20. The method of claim 15, wherein the determining the length of the template comprises determining, based on a top row of the current block being adjacent to the boundary, the length of the template to be equal to a minimum of: one less than a quantity of lines of reconstructed reference samples above the current block that are available for coding the current block; and a value determined based on a length of a left side of the current block.

* * * * *